US 9,377,880 B2

(12) United States Patent
Fukushima et al.

(10) Patent No.: US 9,377,880 B2
(45) Date of Patent: Jun. 28, 2016

(54) POSITION INDICATOR

(71) Applicant: Wacom Co., Ltd., Saitama (JP)

(72) Inventors: Yasuyuki Fukushima, Saitama (JP); Hiroyuki Fujitsuka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 45 days.

(21) Appl. No.: 14/191,232

(22) Filed: Feb. 26, 2014

(65) Prior Publication Data

US 2014/0306940 A1    Oct. 16, 2014

(30) Foreign Application Priority Data

Apr. 10, 2013    (JP) ................ 2013-082204

(51) Int. Cl.
*G06F 3/0354*    (2013.01)
*G06F 1/16*    (2006.01)
*G06F 3/046*    (2006.01)

(52) U.S. Cl.
CPC .......... *G06F 3/03545* (2013.01); *G06F 1/1626* (2013.01); *G06F 3/046* (2013.01); *G06F 2200/1632* (2013.01)

(58) Field of Classification Search
CPC .................................................. G06F 3/03545
See application file for complete search history.

(56) References Cited

U.S. PATENT DOCUMENTS

| 7,202,862 B1 | 4/2007 | Palay et al. |
| 2007/0025805 A1 | 2/2007 | Lapstun et al. |
| 2008/0055279 A1 | 3/2008 | Osada et al. |
| 2011/0192658 A1* | 8/2011 | Fukushima et al. ....... 178/19.03 |
| 2011/0219892 A1 | 9/2011 | Fukushima et al. |

FOREIGN PATENT DOCUMENTS

| JP | 2002244806 A | 8/2002 |
| JP | 2011186803 A | 9/2011 |

OTHER PUBLICATIONS

Extended European Search Report, mailed Sep. 23, 2014, for European Application No. 14158554.7-1953/2790085, 7 pages.

* cited by examiner

*Primary Examiner* — Dennis Joseph
(74) *Attorney, Agent, or Firm* — Seed Intellectual Property Law Group PLLC

(57) ABSTRACT

A position indicator includes: a core body disposed within a casing such that a tip thereof projects from one opening of the casing; a printed board on which a circuit element for detecting pressing force applied to the tip is disposed; and a pen pressure detecting module formed by arranging, in an axial direction, plural parts for detecting a displacement corresponding to the pressing force. The plural parts are arranged within a hollow portion of a cylindrical holder portion housed within the casing. The holder portion has an opening portion in a side circumferential surface thereof. The opening portion is opened in a direction perpendicular to the axial direction. At least one of the parts is/are housed into the hollow portion through the opening portion. The holder portion includes a locking portion configured to prevent the at least one of the parts from falling out through the opening portion.

20 Claims, 18 Drawing Sheets

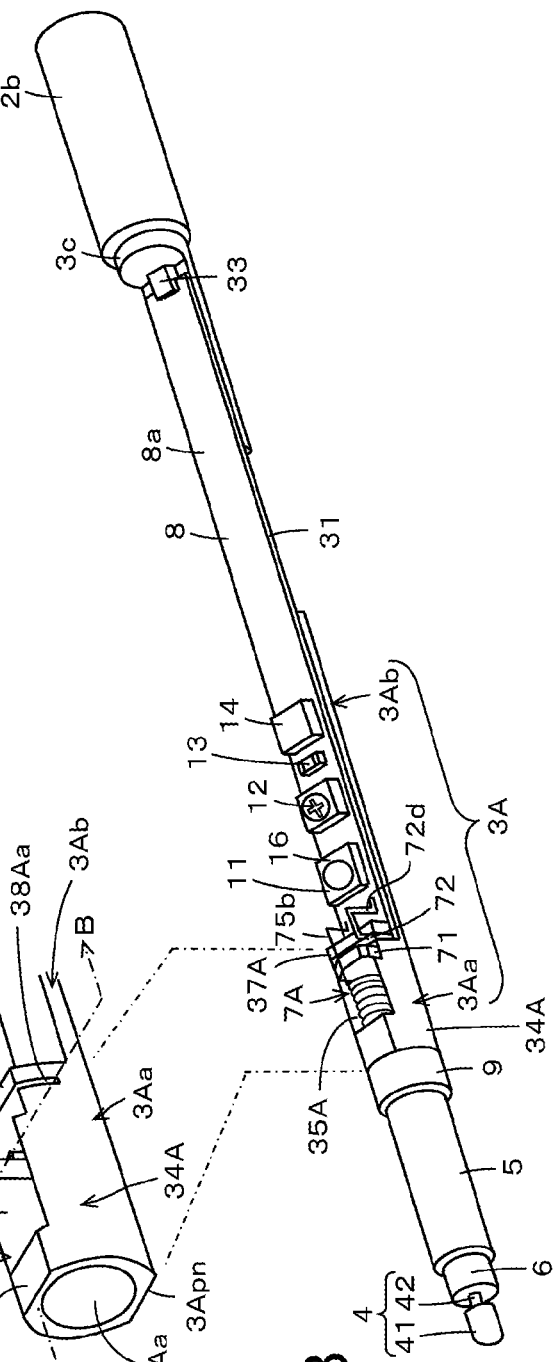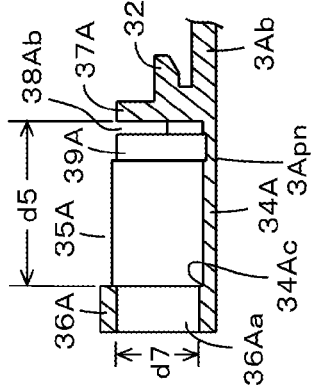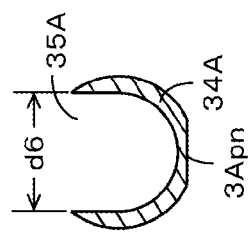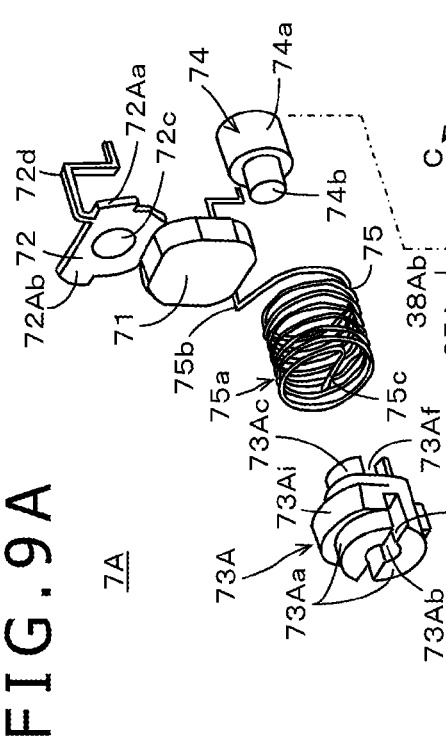

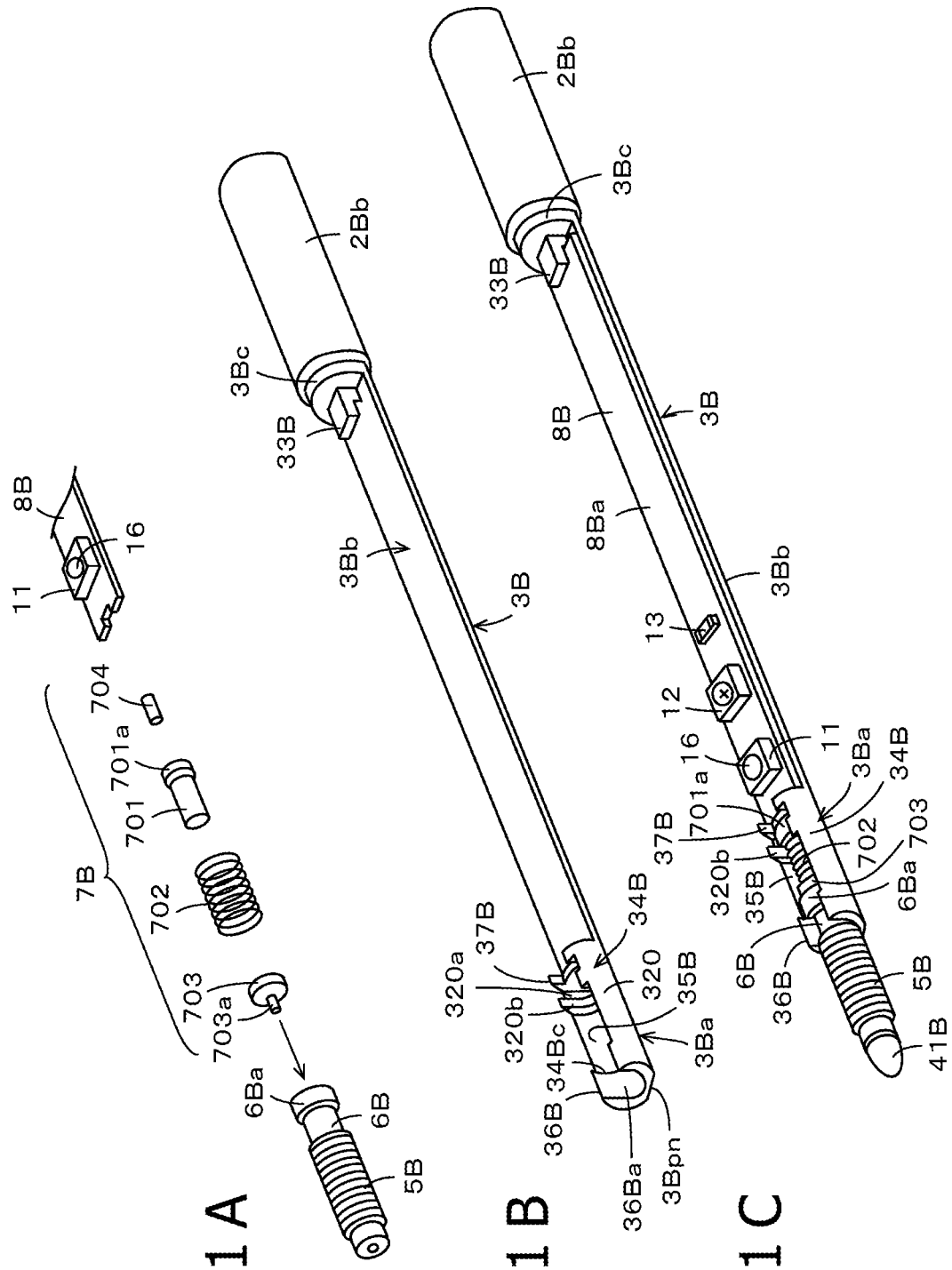

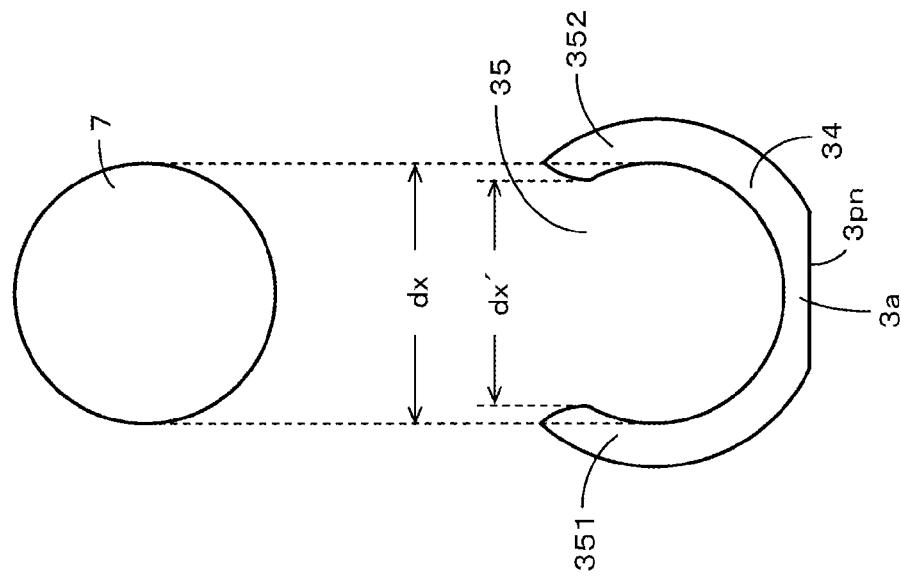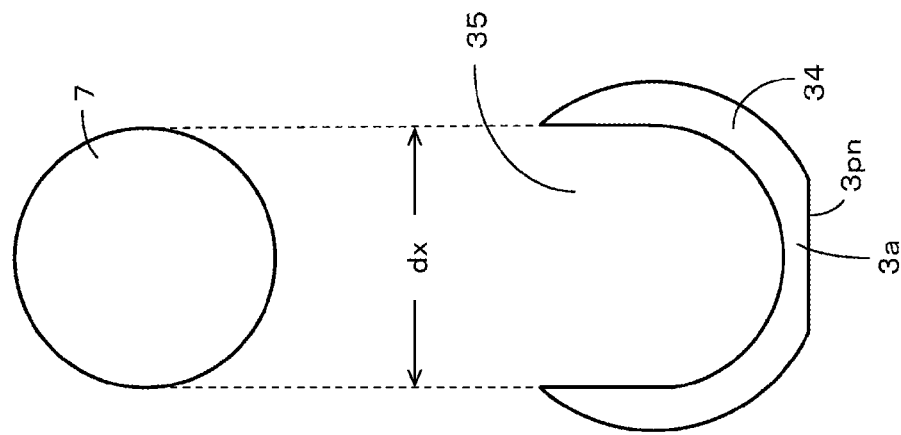

POSITION INDICATOR

BACKGROUND

1. Field of the Invention

The present invention relates to a position indicator in the shape of a pen, for example, which is used in conjunction with a position detecting device, and particularly to a position indicator having a function of detecting pressure (pen pressure) applied to a tip portion (pen point) of a core body.

2. Description of the Related Art

A position input device has recently been used as an input device for a tablet type PC (personal computer) or the like. The position input device includes, for example, a position indicator formed in the form of a pen, and a position detecting device having an input surface, on which pointing operation and input of characters, figures, and the like are performed based on the use of the position indicator.

Conventionally, as a pen type position indicator of this kind, a position indicator for a position detecting device of an electromagnetic induction system is well known. The position indicator of the electromagnetic induction system has a resonance circuit formed by connecting a resonance capacitor to a coil wound around a ferrite core. The position indicator indicates a position on the position detecting device by transmitting a resonance signal generated by the resonance circuit to the position detecting device.

The pen type position indicator of this kind is also configured conventionally to have a function of detecting pressure (pen pressure) applied to a tip portion (pen point) of a core body and transmitting the pressure (pen pressure) to the position detecting device. To detect the pen pressure, known methods use a mechanism that changes the inductance of the coil forming the resonance circuit according to the pen pressure or a mechanism that changes the capacitance of the capacitor forming the resonance circuit according to the pen pressure. When either of the methods is used, a pen pressure detecting section is formed into a pen pressure detecting module as one functional unit.

FIGS. 19A and 19B show a conventional example of construction of a variable capacitance capacitor type pen pressure detecting module that changes the capacitance of a capacitor forming a resonance circuit of a position indicator according to pen pressure. The conventional example is described in Patent Document 1 (Japanese Patent Laid-Open No. 2011-186803).

FIG. 19A is a general perspective view of the variable capacitance capacitor forming the pen pressure detecting module. FIG. 19B is a sectional view taken along line Z-Z of FIG. 19A, and is a longitudinal sectional view of the variable capacitance capacitor.

The variable capacitance capacitor 100 in the example of FIGS. 19A and 19B changes in capacitance according to pressure (pen pressure) applied to a core body 101 (see alternate long and short dashed lines in FIG. 19B) of the position indicator. The position indicator detects the pen pressure applied to the core body 101 on the basis of the change in the capacitance of the variable capacitance capacitor, and transmits the detected pen pressure to a position detecting device.

As shown in FIG. 19A and FIG. 19B, the variable capacitance capacitor 100 includes a dielectric 103, a terminal member 104, a retaining member 105, a conductive member 106, and an elastic member 107 within a cylindrical holder 102 made of a resin, for example.

The dielectric 103 for example has substantially a disk shape. The dielectric 103 has a substantially circular first surface portion 103a and a substantially circular second surface portion 103b opposed to the first surface portion 103a so as to be substantially parallel to the first surface portion 103a. In the present example, the first surface portion 103a and the second surface portion 103b are both formed in a planar shape.

As shown in FIG. 19B, the dielectric 103 is mounted on a flange portion 102a of the holder 102 with the second surface portion 103b faced toward another end side in an axial direction of the holder 102 on which end side the core body 101 is present.

The terminal member 104 is formed of a conductive metal. The terminal member 104 has a flat portion 104a as an example of a surface portion engaged with the first surface portion 103a of the dielectric 103, two locking portions 104b and 104c formed so as to be continuous from the flat portion 104a, and a lead piece 104d similarly formed so as to be continuous from the flat portion 104a.

The two locking portions 104b and 104c have substantially the shape of a letter J, and are provided so as to sandwich the flat portion 104a therebetween. The two locking portions 104b and 104c provide elasticity to the terminal member 104 so that the flat portion 104a of the terminal member 104 is always biased elastically in directions toward end portions of the locking portions 104b and 104c. The end portions of the locking portions 104b and 104c are provided with opening portions 104e and 104f having substantially a quadrangular shape, for example.

As shown in FIG. 19A and FIG. 19B, the terminal member 104 is fixed to the holder 102, with the opening portions 104e and 104f of the two locking portions 104b and 104c locked to locking tooth portions 102b and 102c of the holder 102.

At this time, because the terminal member 104 has the elasticity provided by the two locking portions 104b and 104c, the flat portion 104a abuts against the first surface portion 103a of the dielectric 103 in a state of being pressed against the first surface portion 103a. The flat portion 104a of the terminal member 104 has a surface shape (flat surface in the present example) corresponding to the surface shape of the first surface portion 103a of the dielectric 103. Thus, the flat portion 104a and the first surface portion 103a of the dielectric 103 abut against each other without any gap therebetween, and are securely connected electrically to each other.

The lead piece 104d of the terminal member 104 is connected to a contact portion of a printed board (not shown), disposed on an opposite side from the core body 101, by resistance welding or ultrasonic welding, for example. The terminal member 104 is thereby connected electrically to electronic parts on the printed board. The lead piece 104d of the terminal member 104 forms a first electrode of the variable capacitance capacitor 100.

The retaining member 105 has a base portion 105a having an outside diameter slightly smaller than the inside diameter of a hollow portion of the holder 102 and a substantially cylindrical fitting portion 105b. An engaging recessed portion 105c (see FIG. 19B) recessed in substantially a cylindrical shape is provided in the base portion 105a. An end portion in the axial direction of the core body 101 is press-fitted into the engaging recessed portion 105c, whereby the core body 101 is coupled to the retaining member 105.

In addition, the fitting portion 105b as a recessed portion for attaching the conductive member 106 is formed in the retaining member 105 so as to project to an opposite side from the core body 101 side of the base portion 105a. The conductive member 106 is fitted into the fitting portion 105b.

As shown in FIG. 19B, the conductive member 106 is formed in the form of a shell, for example, and has a curved surface portion 106a at one end in the axial direction of the conductive member 106. A cylindrical portion 106b on another end side in the axial direction of the conductive member 106 is fitted into the fitting portion 105b of the retaining member 105. The diameter of the cylindrical portion 106b of the conductive member 106 is, for example, set somewhat larger than the inside diameter of the fitting portion 105b of the retaining member 105. The relation of a fit between the conductive member 106 and the fitting portion 105b of the retaining member 105 is thereby set as the relation of a frictional fit. As a result, the conductive member 106 is prevented from falling off the fitting portion 105b of the retaining member 105.

The conductive member 106 has conductivity, and is formed of an elastic member capable of elastic deformation. Such an elastic member includes for example a silicon conductive rubber, a pressure conductive rubber (PCR: Pressure sensitive Conductive Rubber), and the like. When such an elastic member is used as the conductive member 106, a contact area between the second surface portion 103b of the dielectric 103 and the curved surface portion 106a of the conductive member 106 is increased with an increase in pen pressure (pressure) applied to the core body 101.

The elastic member 107 is for example a coil spring having conductivity. The elastic member 107 has a winding portion 107a having elasticity, a terminal piece 107b at one end portion of the winding portion 107a, and a connecting portion 107c at another end portion of the winding portion 107a.

As shown in FIG. 19B, the winding portion 107a of the elastic member 107 is disposed so as to cover the periphery of the conductive member 106 with the fitting portion 105b of the retaining member 105 interposed therebetween. At this time, the connecting portion 107c of the elastic member 107 is interposed between the retaining member 105 and the conductive member 106, and comes into contact with the conductive member 106. The elastic member 107 is thereby electrically connected to the conductive member 106.

In addition, as shown in FIG. 19A, when the elastic member 107 is housed in the holder 102, the terminal piece 107b of the elastic member 107 projects to one end side in the axial direction of the holder 102 through a through hole (not shown) provided in the holder 102. The terminal piece 107b is connected to a contact portion (not shown) of the printed board by soldering, resistance welding, or ultrasonic welding, for example. The terminal piece 107b of the elastic member 107 forms a second electrode of the variable capacitance capacitor 100.

Two engaging projecting portions 105d and 105e having a substantially triangular sectional shape are provided on two flat surface portions opposed to each other in side surface portions of the base portion 105a of the retaining member 105. Engaging holes 102d and 102e with which the engaging projecting portions 105d and 105e of the retaining member 105 are engaged are formed in the holder 102.

In a state in which the conductive member 106 is fitted in the fitting portion 105b, and the elastic member 107 is disposed around the periphery of the conductive member 106 and electrically coupled to the conductive member 106, the retaining member 105 is press-fitted into the holder 102 so that the two engaging projecting portions 105d and 105e are engaged with the two engaging holes 102d and 102e provided in the holder 102. Then, the elastic member 107 is retained between the flange portion 102a of the holder 102 and the base portion 105a, and the retaining member 105 is retained in the holder 102 in a state of being movable along the axial direction of the holder 102 by the length of the engaging holes 102d and 102e in the axial direction of the holder 102.

At this time, as shown in FIG. 19B, the curved surface portion 106a formed on one end side in the axial direction of the conductive member 106 is disposed so as to be opposed to the second surface portion 103b of the dielectric 103, and the conductive member 106 forms the second electrode portion of the variable capacitance capacitor 100.

In the variable capacitance capacitor 100 formed as described above, as shown in FIG. 19B, in a state in which no pressure (pen pressure) is applied to the core body 101 (initial state), the conductive member 106 is physically separated from the second surface portion 103b of the dielectric 103, and is not in contact with the second surface portion 103b. When pressure is applied to the core body 101, the thickness of an air layer between the conductive member 106 and the second surface portion 103b of the dielectric 103 becomes smaller than in the initial state.

As the pressure applied to the core body 101 increases, the curved surface portion 106a of the conductive member 106 comes into contact with the second surface portion 103b of the dielectric 103. The contact area between the second surface portion 103b of the dielectric 103 and the curved surface portion 106a of the conductive member 106 corresponds to the pressure applied to the core body 101.

The state between the first electrode and the second electrode of the variable capacitance capacitor 100 changes as described above according to the pressing force applied to the core body 101. Thus, the capacitance of a capacitor formed between the first electrode and the second electrode changes according to the pressing force applied to the core body 101.

The above-described example is an example of a variable capacitance capacitor type pen pressure detecting module. Also in a case of an inductance detection type pen pressure detecting module, a plurality of parts are arranged in the axial direction of a core body of a position indicator (see Patent Document 2 (Japanese Patent Laid-Open No. 2002-244806), for example). In this case, the casing of the position indicator plays a role of a holder for housing the plurality of parts of the pen pressure detecting module.

BRIEF SUMMARY

As described above, the pen pressure detecting module has the plurality of parts arranged within the hollow holder in the axial direction of the core body of the position indicator. The portion of the pen pressure detecting module is conventionally manufactured by inserting and arranging all of the plurality of parts of the pen pressure detecting module into the hollow portion of the cylindrical holder from one opening and another opening in the axial direction of the holder.

It is thus necessary to insert and arrange all of the plurality of parts forming the pen pressure detecting module into the hollow portion of the holder while considering alignment of all of the plurality of parts forming the pen pressure detecting module in the axial direction and in a direction orthogonal to the axial direction. However, it is difficult to surely achieve the alignment in the axial direction and in the direction orthogonal to the axial direction. Therefore, in a process of manufacturing the portion of the pen pressure detecting module, the difficulty is involved in work, and the number of man-hours is increased, so that the pen pressure detecting module is not suitable for mass production.

In addition, when the pen pressure detecting module is formed as one module part by housing the plurality of parts in the holder separate from the casing of the position indicator as in the above-described example, the manufacturing of the module part takes much time, so that the module part is not suitable for mass production, as described above, and cost is increased.

According to one aspect of the present invention, a position indicator is provided that can solve the above problems.

According to a first aspect of the present invention, there is provided a position indicator including: a cylindrical casing; a core body disposed within the casing such that a tip of the core body projects from one opening end side of the casing; a printed board disposed within the casing, a circuit element being disposed on the printed board for detecting pressing force applied to the tip of the core body; and a pen pressure detecting module formed by arranging a plurality of parts for detecting a displacement of the core body in an axial direction of the casing, the displacement corresponding to the pressing force applied to the tip, in the axial direction within a hollow portion of a cylindrical holder portion housed within a hollow portion of the casing such that an axial direction of the cylindrical holder portion coincides with the axial direction of the casing; wherein the holder portion has an opening portion in a portion of a side circumferential surface of the holder portion, the opening portion being opened in a direction perpendicular to the axial direction of the holder portion, at least one of the plurality of parts is (are) housed into the hollow portion of the cylindrical holder portion in the direction perpendicular to the axial direction through the opening portion, and the holder portion includes a locking portion for preventing the at least one of the plurality of housed parts from falling out through the opening portion.

In the position indicator according to the first aspect of the present invention having the above-described construction, the at least one of the plurality of parts forming the pen pressure detecting module is (are) housed through the opening portion formed in a portion of the side circumferential surface of the cylindrical holder portion and opened in the direction perpendicular to the axial direction of the holder portion. In this case, the at least one of the plurality of parts housed in the holder portion may fall out through the opening portion. In the present invention, however, the holder portion has the locking portion for preventing the at least one of the plurality of housed parts from falling out through the opening portion, so that the plurality of housed parts will be retained in the holder portion.

In addition, according to a second aspect of the present invention, the plurality of parts forming the pen pressure detecting module include one or more first parts displaced in the axial direction of the casing according to the pressing force applied to the tip of the core body and a second part for always biasing at least one of the first parts toward a side of the tip of the core body. When the plurality of parts are housed into the cylindrical holder portion in the direction perpendicular to the axial direction through the opening portion, the at least one of the first parts is moved in the axial direction and engaged with the locking portion of the holder portion by a biasing force of the second part within the hollow portion of the holder portion, whereby the locking portion of the holder portion prevents the plurality of parts from falling out through the opening portion.

In the second aspect of the present invention, the plurality of parts forming the pen pressure detecting module include one or more first parts displaced in the axial direction of the casing according to the pressing force applied to the tip of the core body, and the second part for always biasing at least one of the first parts toward the side of the tip of the core body. When the plurality of parts forming the pen pressure detecting module are housed via the opening portion opened in the direction perpendicular to the axial direction of the holder portion, the second part moves the at least one of the first parts in the axial direction by the elastic biasing force of the second part. The locking portion is engaged with the at least one of the first parts moved in the axial direction.

Because the second part applies the elastic biasing force in the axial direction to the plurality of parts as a whole, when the at least one of the first parts is engaged with the locking portion and is prevented from falling out through the opening portion, the plurality of parts as a whole are prevented from falling out through the opening portion.

In addition, according to a third aspect of the present invention, the locking portion of the holder portion includes a pair of edge portions of the opening portion along the axial direction, which are opposed to each other. The pair of edge portions is elastically displaced such that at least one of the plurality of parts increases a distance between the pair of edge portions when the plurality of parts are housed (inserted) into the cylindrical holder portion in the direction perpendicular to the axial direction through the opening portion, and the distance between the pair of edge portions is elastically restored to an original state when the plurality of parts are housed within the cylindrical holder portion, whereby the locking portion of the holder portion prevents the plurality of parts from falling out through the opening portion.

In the third aspect of the present invention, the locking portion of the holder portion includes the pair of edge portions of the opening portion along the axial direction, which are opposed to each other. When the plurality of parts are put (inserted) through the opening portion in the direction perpendicular to the axial direction to be housed into the cylindrical holder, the pair of edge portions is elastically displaced such that at least a part of the plurality of parts increases the distance between the pair of edge portions. When the plurality of parts are housed within the cylindrical holder portion, the pair of edge portions forming the locking portion elastically restores the distance therebetween to an original state. The plurality of parts are thereby prevented from being displaced thorough the opening portion of the holder portion.

According to the present invention, at least one of the plurality of parts for pen pressure detection is/are housed into the hollow portion of the holder portion via the opening portion opened in the direction perpendicular to the axial direction of the holder portion in a portion of the side circumferential surface of the cylindrical holder portion. Thus, as compared with the case where the plurality of parts for pen pressure detection are sequentially housed in the axial direction into the hollow portion of the cylindrical holder portion, a process of manufacturing the pen pressure detecting module can be simplified, and mass productivity is improved.

In addition, even when the plurality of parts are housed into the hollow portion of the holder portion through the opening portion formed in the side circumferential surface of the cylindrical holder portion, the locking portion of the holder portion prevents the plurality of housed parts from falling out through the opening portion.

According to the present invention, the housed state of the plurality of parts within the cylindrical holder portion can be monitored and visually verified through the opening portion. Thus, the positional relation of the plurality of parts forming the pen pressure detecting module within the holder portion can be maintained to be a predetermined positional relation at all times.

BRIEF DESCRIPTION OF THE DRAWINGS

FIGS. 9A, 9B, 9C, and 9D are an exploded perspective view, a perspective view, and sectional views of principal portions of the second embodiment of the position indicator according to the present invention;

FIGS. 11A, 11B, and 11C are diagrams of assistance in explaining an example of construction of principal portions of the third embodiment of the position indicator according to the present invention;

FIGS. 17A and 17B are diagrams of assistance in explaining an example of construction of principal portions of another embodiment of the position indicator according to the present invention;

DETAILED DESCRIPTION

A few embodiments of a position indicator according to the present invention will hereinafter be described with reference to the drawings.

First Embodiment

Figure 1A:
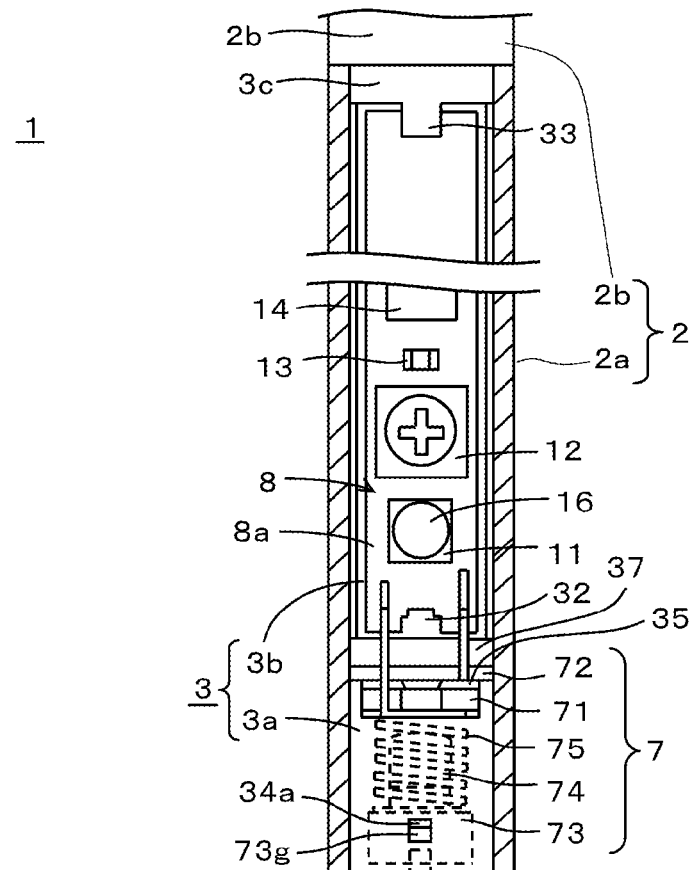
FIGS. 1A and 1B are diagrams of assistance in explaining an example of construction of a first embodiment of a position indicator according to the present invention.
Figure 1B:
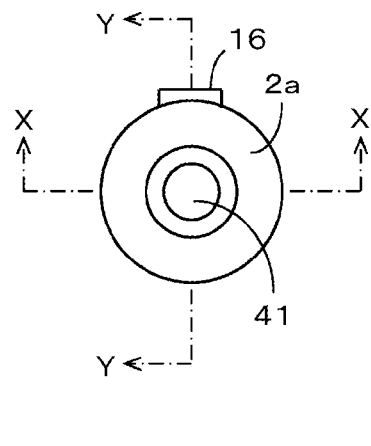
Figure 2:
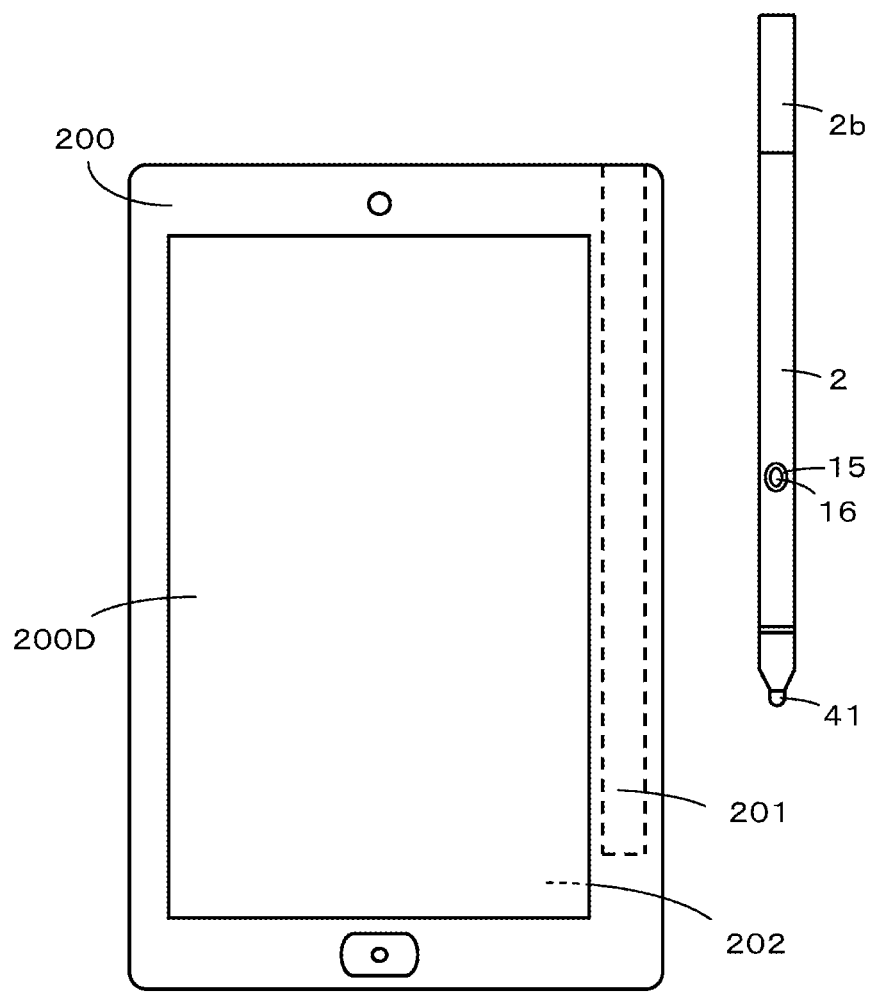
FIG. 2 is a diagram showing the embodiment of the position indicator according to the present invention and an example of an electronic device including a position detecting device used in conjunction with the position indicator.

FIGS. 1A to 4C are diagrams of assistance in explaining an example of construction of a first embodiment of the position indicator according to the present invention. FIG. 2 shows an example of an electronic device 200 using the position indicator 1 according to the first embodiment. In the present example, the electronic device 200 is a high-functionality portable telephone terminal having a display screen 200D of a display device, such as an LCD (Liquid Crystal Display), and includes a position detecting device 202 of an electromagnetic induction system under (on the back side of) the display screen 200D.

A casing of the electronic device 200 in the present example has a housing recessed hole 201 for housing the position indicator 1 in the shape of a pen. A user extracts the position indicator 1 housed in the housing recessed hole 201 from the electronic device 200, and performs position indicating operation on the display screen 200D, as required.

When position indicating operation is performed on the display screen 200D of the electronic device 200 by the position indicator 1 in the shape of a pen, the position detecting device 202 provided on the back side of the display screen 200D detects the position operated (acted on) by the position indicator 1 and pen pressure, and a microcomputer included in the position detecting device 202 of the electronic device 200 performs display processing corresponding to the operated position on the display screen 200D and the pen pressure.

FIGS. 1A and 1B schematically show the position indicator 1 as a whole according to the first embodiment. FIG. 1A shows the inside of a case main body 2a of a case 2 (casing) of the position indicator 1 with only the case main body 2a cut away for purposes of illustration. FIG. 1B is a view of the position indicator 1 according to the first embodiment as viewed in an axial direction from the side of a core body 4.

As shown in FIG. 1A, the position indicator 1 has the case 2 forming a bottomed cylindrical casing that is long and thin in the axial direction and which is closed on one side. The case 2 is formed of a resin, for example, and includes the case main body 2a of a cylindrical shape having a hollow portion therewithin and a case cap 2b coupled to the case main body 2a. The core body 4 and a magnetic core wound with a coil 5, or a ferrite core 6 in the present example, are coupled to and housed in a board holder 3 within the hollow portion of the case main body 2a. The ferrite core 6 in the present example has a cylindrical shape.

The board holder 3 is formed of a resin, for example, and is formed so as to have a pressure sensing part holder portion 3a and a printed board mounting base portion 3b continuous with each other in a longitudinal direction as the axial direction of the position indicator 1 when the board holder 3 is housed within the hollow portion of the case main body 2a. Pressure sensing parts (a plurality of parts for pen pressure detection) 7 are housed in the pressure sensing part holder portion 3a. A printed board 8 is mounted and retained on the printed board mounting base portion 3b. The pressure sensing part holder portion 3a will hereinafter be abbreviated to the holder portion 3a for the simplicity of description. The holder portion 3a is formed closest to the core body 4 in the board holder 3. The core body 4 and the ferrite core 6 are coupled to the holder portion 3a.

Figure 3A:
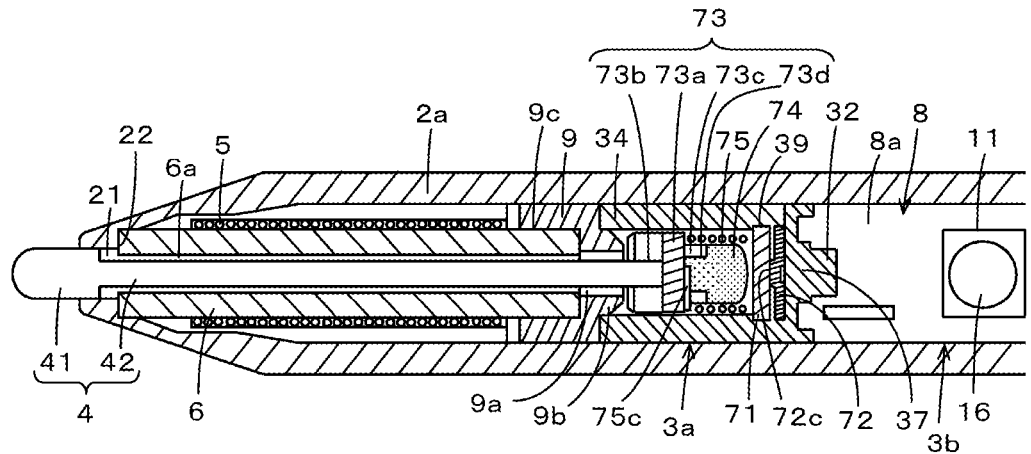
FIGS. 3A, 3B, and 3C are sectional views and a perspective view of principal portions of the first embodiment of the position indicator according to the present invention.
Figure 3B:
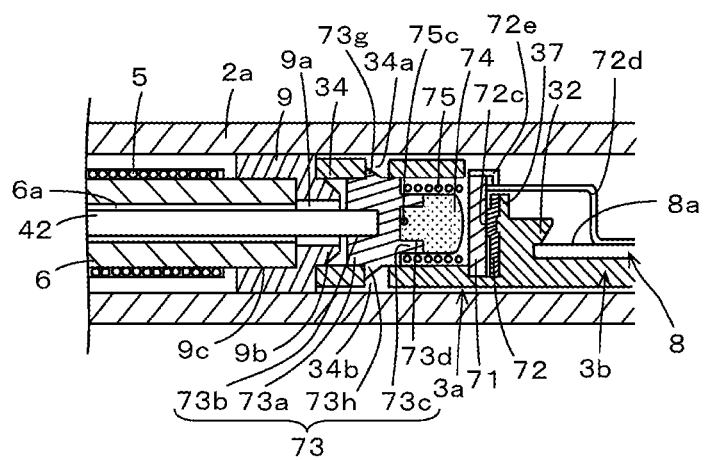
Figure 3C:
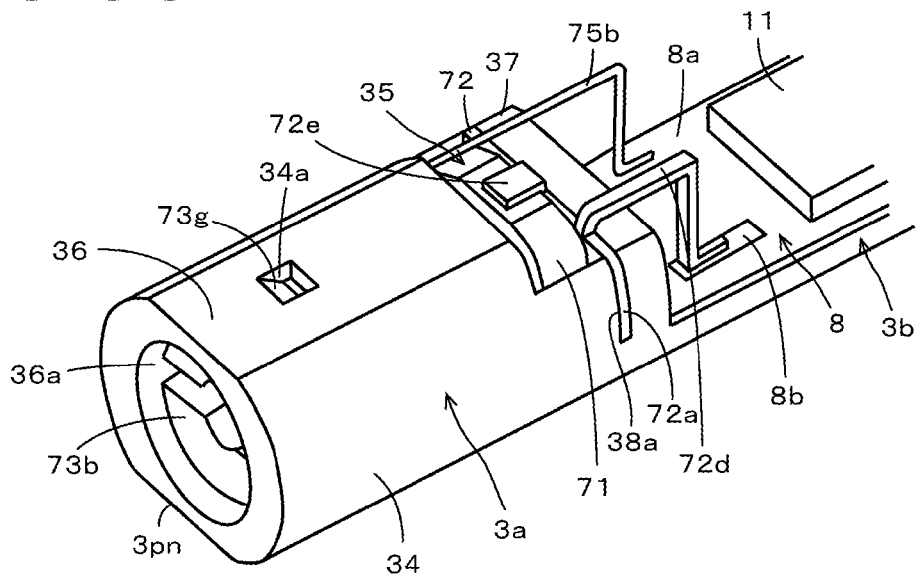

FIG. 3A is a sectional view taken along line X-X of FIG. 1B, and is a partial sectional view of the position indicator 1 sectioned in a direction passing through the axial position of the position indicator 1 and parallel with a board surface (surface on which a conductor pattern is printed and formed and circuit parts are mounted) 8a of the printed board 8. FIG. 3B is a sectional view taken along line Y-Y of FIG. 1B, and is a partial sectional view of the position indicator 1 sectioned in a direction passing through the axial position of the position indicator 1 and perpendicular to the board surface 8a of the printed board 8. FIG. 3C is a perspective view directing attention to the holder portion 3a, in particular, of the board holder 3.

Figure 4A:
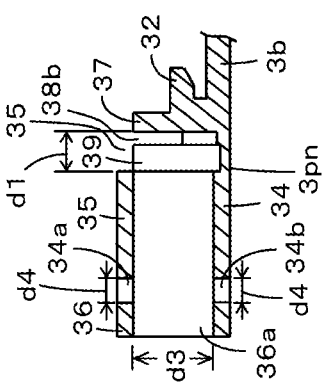
FIGS. 4A, 4B, and 4C are an exploded perspective view, a perspective view, and a sectional view of principal portions of the first embodiment of the position indicator according to the present invention.
Figure 4B:
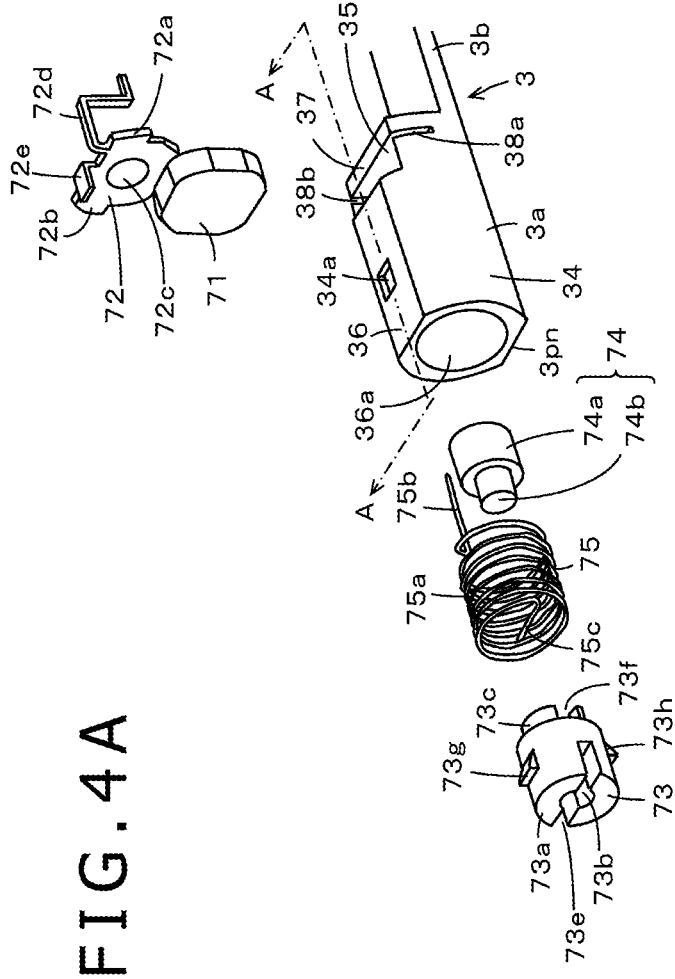
Figure 4C:
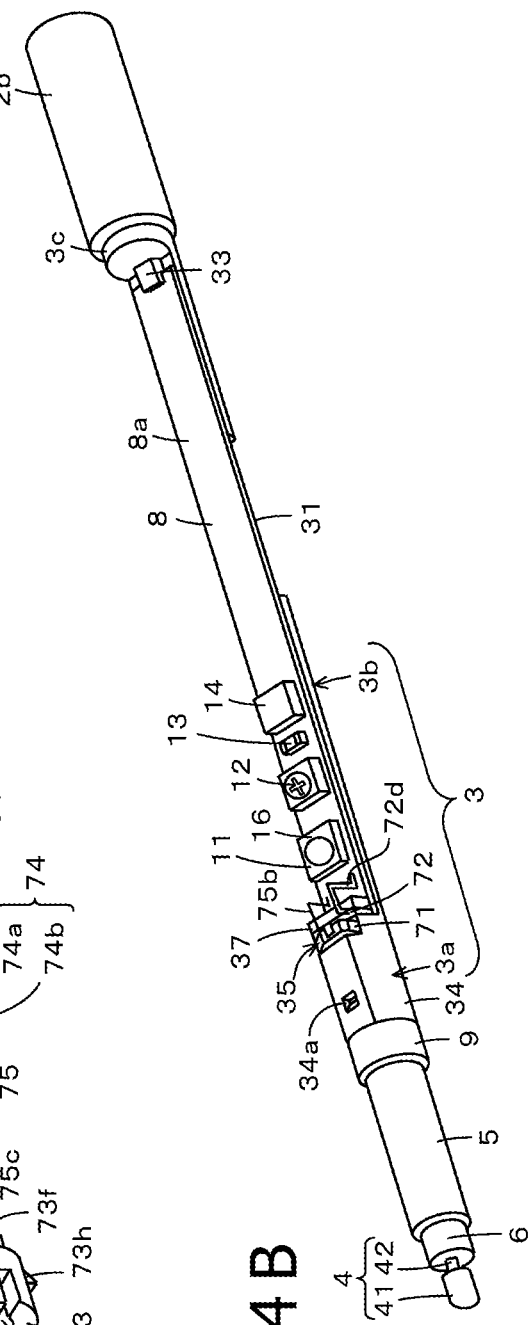

FIG. 4B is a diagram showing a state in which the core body 4 and the ferrite core 6 are coupled to the board holder 3. FIG. 4A is an exploded perspective view of assistance in explaining the holder portion 3a of the board holder 3 and the pressure sensing parts 7. FIG. 4C is a sectional view taken along line A-A of FIG. 4A, and is a longitudinal sectional view of the holder portion 3a of the board holder 3.

As shown in FIG. 4B, the printed board 8 is mounted on the printed board mounting base portion 3b of the board holder 3. The printed board 8 is of a long and thin rectangular shape having a width smaller than the inside diameter of the case main body 2a and having a predetermined length in the longitudinal direction. The length in the longitudinal direction of a board mounting flat surface of the printed board mounting base portion 3b is substantially equal to or slightly larger than the length in the longitudinal direction of the printed board 8. In addition, the length in a width direction of the board mounting flat surface of the printed board mounting base portion 3b is selected to be slightly larger than the width of the printed board 8.

Though not shown, one end and the other end of the coil 5 extend to the printed board 8 using a clearance between the board holder 3 and the case main body 2a, and are for example soldered to a conductive pattern formed on the printed board 8. In the example of FIG. 4B, a notch portion 31 is formed in a portion in the longitudinal direction of the board holder 3, and the one end and the other end of the coil 5 are soldered on a back surface side opposite from the board surface 8a of the printed board 8 and are connected to the conductive pattern on the printed board 8 via a through hole.

The printed board 8 is provided with a push switch (side switch) 11 that is turned on when depressed and which returns to an off state when the depression is stopped, and is provided with capacitors 12 and 13 forming a resonance circuit together with the coil 5. The capacitor 12 in the present example is a trimmer capacitor whose capacitance can be adjusted. Further, in the first embodiment, an IC 14 is provided on the printed board 8, and other circuit parts and a conductor pattern not shown in the figures are formed on the printed board 8.

In the present example, a through hole 15 (see FIG. 2) is made at a position of a side circumferential surface of the case main body 2a of the position indicator 1 which position corresponds to the side switch 11. A depression operating element 16 of the side switch 11 is exposed such that the side switch 11 can be depressed through the through hole 15. In this case, a predetermined function is assigned and set to the operation of depressing the side switch 11 by the depression operating element 16 on the side of the electronic device 200 including the position detecting device 202. For example, the electronic device 200 in the present example can assign and set the operation of depressing the side switch 11 by the depression operating element 16 as an operation similar to a click operation on a pointing device such as a mouse or the like.

The capacitors 12 and 13 forming a portion of the resonance circuit and the IC 14 in the present example are disposed as chip parts on the printed board 8. In the present embodiment, the resonance frequency of the resonance circuit is adjusted by adjusting the capacitance of the trimmer capacitor 12.

In the present example, locking portions 32 and 33 for locking the printed board 8 to the printed board mounting base portion 3b by sandwiching the printed board 8 in a direction of thickness thereof at both end portions in the longitudinal direction of the printed board 8 are formed at both end portions in the longitudinal direction of the printed board mounting base portion 3b of the board holder 3. As shown in FIG. 1A, the printed board 8 in a state of being mounted on the printed board mounting base portion 3b and locked by the locking portions 32 and 33 is not in contact with an inner wall surface of the case main body 2a but is separated from the case main body 2a.

Incidentally, most of the portions of the holder portion 3a of the board holder 3 excluding an opening portion 35 to be described later, the back side portion of the printed board mounting base portion 3b, and a coupling portion 3c for coupling the board holder 3 and the case cap 2b to each other are in contact with the inner wall of the case main body 2a, so that the board holder 3 does not rattle in a direction orthogonal to the axial direction within the hollow portion of the case main body 2a.

The pressure sensing parts 7 formed by a plurality of parts as shown in FIG. 1A, FIGS. 3A to 3C, and FIG. 4A are housed in the holder portion 3a of the board holder 3. A pen pressure detecting module is formed by thus housing the pressure sensing parts 7 in the holder portion 3a. A core body main body 42 of the core body 4 is coupled to the pen pressure detecting module, whereby the pressure sensing parts 7 of the pen pressure detecting module detect pen pressure applied to a projecting member 41 of the core body 4. Construction of the pressure sensing parts 7 of the pen pressure detecting module and the housing of the pressure sensing parts 7 in the holder portion 3a will be described later in detail.

Incidentally, the board holder 3 has a flat surface 3pn (see FIG. 4A) formed along the axial direction on a side of a side circumferential surface of a cylindrical body 34 forming the holder portion 3a, which side is opposed to the opening portion 35 with the axial position interposed therebetween and is opposite from the printed board mounting flat surface of the printed board mounting base portion 3b. In this case, though not shown in detail, the flat surface 3pn is a flush flat surface along the axial direction on the holder portion 3a or from the holder portion 3a to the printed board mounting base portion 3b.

The board holder 3 is mounted on a predetermined flat surface of a workbench in a stable state without rolling because of the flat surface 3pn. In a state of the board holder 3 being mounted on the flat surface of the workbench, the opening portion 35 of the holder portion 3a is an opening in a direction orthogonal to the predetermined flat surface of the workbench, and the printed board mounting flat surface of the printed board mounting base portion 3b is a surface parallel to the predetermined flat surface of the workbench. Therefore, the work of housing the pressure sensing parts 7 in the holder portion 3a of the board holder 3 mounted on the flat surface of the workbench through the opening portion 35 can be surely performed, and the printed board 8 can be surely mounted and locked on the mounting flat surface of the printed board mounting base portion 3b.

As shown in FIG. 4B, in the present example, the board holder 3 is coupled to the case cap 2b at the coupling portion 3c at an end portion of the printed board mounting base portion 3b, which end portion is on the opposite side from the holder portion 3a in the longitudinal direction, so that the case cap 2b and the board holder 3 can be handled as an integral object.

Hence, in the present example, as will be described later, an object formed by mounting and fixing the printed board 8 on the printed board mounting base portion 3b of the board holder 3, housing the pressure sensing parts 7 in the holder portion 3a, and coupling the ferrite core 6 wound with the coil 5 and the core body 4 to the board holder 3 can be handled as one module part. The module part is housed within the hollow portion of the case main body 2a, whereby the position indicator 1 is completed. At this time, the board holder 3 is coupled to the case cap 2b so as to be locked to the inside of the case main body 2a in such a state that the position of a center line in the axial direction of the holder portion 3a coincides with the position of a center line in the axial direction of the cylindrical case main body 2a.

As shown in FIG. 1A and FIG. 3A, one end side in the axial direction of the case main body 2a is a pen point side of the position indicator 1 in the shape of a pen, and a through hole 21 (opening) is provided on the pen point side of the case main body 2a.

The core body 4 in the present example is formed by the projecting member (pen point member) 41 projecting from the through hole 21 of the case main body 2a to the outside and the core body main body 42. The core body 4 is made of a synthetic resin such as a polyacetal resin (Duracon) or the like in consideration of resistance to friction when the projecting member 41 is used in a state of abutting against the operating surface.

The core body main body 42 is a cylindrical rod-shaped body having a smaller diameter than the diameter of the projecting member 41. In the present example, a through hole 6a having a larger inside diameter than the diameter of the core body main body 42 is formed in the ferrite core 6 in the axial direction of the ferrite core 6. The core body main body 42 of the core body 4 is inserted through the through hole 6a of the ferrite core 6 to be coupled to one of the plurality of parts forming the pressure sensing parts 7, as will be described later.

In addition, one end side (side opposite from the side of the projecting member 41 of the core body 4) in the axial direction of the ferrite core 6 is coupled to the holder portion 3a of the board holder 3 via an anti-falling member 9 formed of an elastic material, for example a silicon rubber in the present example.

When the integrated module part formed by coupling the core body 4 and the ferrite core 6 wound with the coil 5 to the board holder 3 as shown in FIG. 4B is inserted into the hollow portion of the case main body 2a, and the case main body 2a is coupled to the case cap 2b, another end side in the axial direction of the ferrite core 6 abuts against a stepped portion 22 formed in the through hole 21 of the case main body 2a, as shown in FIG. 1A and FIG. 3A. The ferrite core 6 wound with the coil 5 is thereby fixed between the holder portion 3a of the board holder 3 and the stepped portion 22 of the case main body 2a.

Example of Construction of Pen Pressure Detecting Module

Next, description will be made below of the holder portion 3a of the board holder 3 and the pressure sensing parts 7 forming the pen pressure detecting module as well as the housing of the pressure sensing parts 7 in the holder portion 3a. The pen pressure detecting module in the present example uses a variable capacitance capacitor whose capacitance varies according to pen pressure applied to the core body as with the pen pressure detecting module described at the beginning with reference to Patent Document 1.

As shown in FIG. 4A, the pressure sensing parts 7 in the present example are formed by a plurality of parts, that is, a dielectric 71, a terminal member 72, a retaining member 73, a conductive member 74, and an elastic member 75. The terminal member 72 forms a first electrode of the variable capacitance capacitor formed by the pressure sensing parts 7. In addition, the conductive member 74 and the elastic member 75 are electrically connected to each other to form a second electrode of the variable capacitance capacitor.

As shown in FIG. 3C and FIG. 4A, the holder portion 3a of the board holder 3 is formed by the cylindrical body 34 having a hollow portion, and is formed so as to house the pressure sensing parts 7 arranged in the axial direction within the hollow portion of the cylindrical body 34.

Of the pressure sensing parts 7 formed by the plurality of parts as described above, the dielectric 71 and the terminal member 72, which are parts not moving in the axial direction within the holder portion 3a formed by the cylindrical body 34, are inserted in the direction orthogonal to the axial direction of the cylindrical body 34 and perpendicular to the board surface 8a of the printed board 8, through the opening portion 35 formed in a portion of the side circumferential surface of the cylindrical body 34 forming the holder portion 3a and opened in the direction orthogonal to the axial direction, as shown in FIG. 4A, and are housed as shown in FIG. 3C and FIG. 4B.

As shown in FIGS. 4A to 4C, the opening portion 35 is formed in an end portion of the side circumferential surface of the cylindrical body 34 forming the holder portion 3a, which end portion is on the side of the printed board mounting base portion 3b. The opening portion 35 is opened in the direction orthogonal to the axial direction and opened in the direction perpendicular to the board surface 8a of the printed board 8 mounted on the printed board mounting base portion 3b. The opening portion 35 has a predetermined length d1 (see FIG. 4C) in the axial direction, and has a predetermined length d2 (not shown) in the direction orthogonal to the axial direction.

The length d1 is selected to be larger than the length (thickness) in the axial direction of the dielectric 71 and the terminal member 72 when the dielectric 71 and the terminal member 72 are superposed on each other in the axial direction. The length d2 is selected to be slightly larger than the larger length of the lengths of the dielectric 71 and the terminal member 72 in the direction orthogonal to the axial direction. Thus selecting the dimensions of the lengths d1 and d2 enables the dielectric 71 and the terminal member 72 superposed on each other in the axial direction to be housed within the holder portion 3a through the opening portion 35.

In addition, the cylindrical body 34 forming the holder portion 3a has an inside diameter d3 (see FIG. 4C), and has an opening 36a on the side of the core body 4 in the axial direction of the cylindrical body 34. A portion 36 having the opening 36a on the side of the core body 4 in the axial direction does not have an opening in the side circumferential surface. In the present embodiment, the length d2 in the direction orthogonal to the axial direction of the opening portion 35 in the side circumferential surface of the cylindrical body 34 is selected to be equal to the inside diameter d3 of the cylindrical body 34, but is selected to be larger by the depth of a recessed groove 39, to be described later, in the portion of the recessed groove 39.

The cylindrical body 34 forming the holder portion 3a is closed by a wall portion 37 on the side of the printed board mounting base portion 3b. The locking portion 32 described above is formed on the wall portion 37 so as to project on the side of the printed board mounting base portion 3b. The opening portion 35 is formed so as to expose the wall portion 37 to the outside. That is, the opening portion 35 is made in the side circumferential surface of the cylindrical body 34 so as to form an opening of the length d1 from the wall portion 37 in the axial direction.

Slits 38*a* and 38*b* having a predetermined width slightly larger than the thickness of the terminal member 72 in the axial direction are formed in a coupling portion of the side circumferential surface of the cylindrical body 34, which coupling portion is coupled to the wall portion 37. The recessed groove 39 (see FIG. 3A and FIG. 4C) having a larger inside diameter than the inside diameter d2 of the portion of the cylindrical body 34, in which portion the opening portion 35 is formed, is formed at a position adjacent to the slits 38*a* and 38*b* in the axial direction in the inner wall of the cylindrical body 34.

The dielectric 71 is formed as a plate-shaped object having an external shape to be fitted into the recessed groove 39 and having a thickness corresponding to the width in the axial direction of the recessed groove 39. Therefore, the dielectric 71 can be inserted and fitted into the recessed groove 39 of the cylindrical body 34 through the opening portion 35, and the recessed groove 39 prevents the dielectric 71 in the fitted state from moving in the axial direction within the cylindrical body 34. Incidentally, in the first embodiment, as will be described later, the dielectric 71 is pressed and biased by the conductive member 74, and is thus pressed to the side of the wall portion 37. Therefore the recessed groove 39 need not be provided.

The terminal member 72 is formed by a disk-shaped conductive member, for example a plate-shaped object of a conductive metal, which has a thickness slightly smaller than the width in the axial direction of the slits 38*a* and 38*b* of the cylindrical body 34 and has an outside diameter corresponding to the inside diameter d3 of the cylindrical body 34. As shown in FIG. 4A, the terminal member 72 has bulging portions 72*a* and 72*b* to be fitted into the slits 38*a* and 38*b* of the cylindrical body 34. Hence, the terminal member 72 can be inserted so as to be in contact with the wall portion 37 of the cylindrical body 34 through the opening portion 35, and the bulging portions 72*a* and 72*b* are fitted into the slits 38*a* and 38*b* of the cylindrical body 34 by the insertion and locked to the cylindrical body 34 so as not to move in the axial direction.

In addition, a swelling portion 72*c* swelling toward the side of the dielectric 71 is formed on a central portion of a plate surface of the terminal member 72, which plate surface is on the side of the dielectric 71. The swelling portion 72*c* plays a role of surely bringing the dielectric 71 and the terminal member 72 into contact with each other when the dielectric 71 and the terminal member 72 are housed within the cylindrical body 34.

The terminal member 72 plays the role of the first electrode of the variable capacitance capacitor. The terminal member 72 has a lead portion 72*d* formed from an end surface as an upper end of the terminal member 72, which upper end is on the side of the opening portion 35. The lead portion 72*d* straddles the wall portion 37 of the cylindrical body 34 to be connected by soldering to a land portion 8*b* (see FIG. 3C) on the board surface 8*a* of the printed board 8 mounted on the printed board mounting base portion 3*b* when the terminal member 72 is housed within the holder portion 3*a*.

Further, the terminal member 72 has an L-shaped projection 72*e* formed in substantially the center of the end surface as the upper end of the terminal member 72, which upper end is on the side of the opening portion 35. The L-shaped projection 72*e* projects on an opposite side from the lead portion 72*d* when the terminal member 72 is housed within the holder portion 3*a*. The L-shaped projection 72*e* of the terminal member 72 holds down the opening side end portion of the dielectric 71 when the dielectric 71 and the terminal member 72 are housed within the holder portion 3*a*. When the lead portion 72*d* of the terminal member 72 is connected by soldering and thus fixed to the land portion 8*b* (see FIG. 3C) on the board surface 8*a* of the printed board 8, the L-shaped projection 72*e* prevents the dielectric 71 from falling out through the opening portion 35.

The retaining member 73 has a cylindrical shape portion 73*a* having a recessed hole 73*b*, into which to press-fit the core body main body 42 of the core body 4 on the core body 4 side in the axial direction of the retaining member 73. The retaining member 73 also has a ring-shaped projecting portion 73*c* having a recessed hole 73*d*, into which to fit the conductive member 74 on an opposite side in the axial direction from the side of the recessed hole 73*b*. In this case, the recessed hole 73*b* and the recessed hole 73*d* are formed such that the center line (axial position) of the recessed hole 73*b* and the center line (axial position) of the recessed hole 73*d* are located on one straight line.

The outside diameter (portion in a circumferential direction) of the cylindrical shape portion 73*a* of the retaining member 73 is selected to be slightly smaller than the inside diameter d3 of the cylindrical body 34. The outside diameter of the ring-shaped projecting portion 73*c* of the retaining member 73 is selected to be smaller than the outside diameter of the cylindrical shape portion 73*a* and smaller than the inside diameter of a coil spring forming the elastic member 75 to be described later. In this case, a stepped portion is formed between the ring-shaped projecting portion 73*c* and the cylindrical shape portion 73*a*. The stepped portion is to lock an end portion of the spring as the elastic member 75 to be described later.

In the present embodiment, slits 73*e* and 73*f* are formed in the cylindrical shape portion 73*a* and the ring-shaped projecting portion 73*c* so as to traverse the recessed hole 73*b* and the recessed hole 73*d*, respectively. The presence of the slits 73*e* and 73*f* allows the cylindrical shape portion 73*a* and the ring-shaped projecting portion 73*c* to be elastically displaced (deformed) in the direction orthogonal to the axial direction. Engaging projecting portions 73*g* and 73*h* are formed on the side circumferential surface of the cylindrical shape portion 73*a* of the retaining member 73 at such positions as to be opposed to each other, while interposing the axial center position of the cylindrical shape portion 73*a* therebetween.

Engaging holes 34*a* and 34*b* (see FIG. 3B and FIG. 4C), into which to engage the engaging projecting portions 73*g* and 73*h* formed on the side circumferential surface of the cylindrical shape portion 73*a* of the retaining member 73, are formed in the side circumferential surface of the cylindrical body 34 forming the holder portion 3*a*.

The length d4 (see FIG. 4C) in the axial direction of the engaging holes 34*a* and 34*b* is larger than the length in the axial direction of the engaging projecting portions 73*g* and 73*h* formed on the side circumferential surface of the cylindrical shape portion 73*a* of the retaining member 73. Thereby, the retaining member 73 can be moved within the hollow portion of the cylindrical body 34 in the axial direction of the cylindrical body 34 even in a state in which the retaining member 73 is housed within the hollow portion of the cylindrical body 34 and the engaging projecting portions 73*g* and 73*h* are engaged with the engaging holes 34*a* and 34*b*. Incidentally, as will be described later, the length d4 is selected to be a value such that the conductive member 74 can be moved in the axial direction and abut against the dielectric 71 and be further elastically deformed in a state in which all of the pressure sensing parts 7 are housed within the hollow portion of the cylindrical body 34.

The conductive member 74 is made of a conductive and elastically deformable elastic member, and is for example formed by a silicon conductive rubber or a pressure conductive rubber. The conductive member 74 includes a large-diameter portion 74a formed by a cylindrical portion having an outside diameter equal to the outside diameter of the ring-shaped projecting portion 73c of the retaining member 73 and a small-diameter portion 74b formed by a cylindrical portion having an outside diameter substantially equal to the diameter of the recessed hole 73d of the ring-shaped projecting portion 73c. The positions of center lines of the large-diameter portion 74a and the small-diameter portion 74b are the same. As shown in FIGS. 3A and 3B, an end surface of the large-diameter portion 74a, which end surface is on an opposite side from the small-diameter portion 74b, is formed so as to have a curved surface portion swelling in the form of a shell. Further, the height of the small-diameter portion 74b of the conductive member 74 is selected to be substantially equal to the depth of the recessed hole 73d formed in the ring-shaped projecting portion 73c of the retaining member 73.

The elastic member 75 is for example formed by a coil spring having conductivity. The elastic member 75 has a winding portion 75a having elasticity, a terminal piece 75b at one end portion of the winding portion 75a, and a connecting portion 75c at another end portion of the winding portion 75a. The winding portion 75a of the coil spring forming the elastic member 75 has a diameter that allows the conductive member 74 to be housed within the winding portion 75a without the winding portion 75a being in contact with the conductive member 74, and which diameter is smaller than the diameter of the cylindrical shape portion 73a of the retaining member 73.

The connecting portion 75c of the elastic member 75 is inserted from the slit portion of the ring-shaped projecting portion 73c of the retaining member 73 into the bottom of the recessed hole 73d formed in the ring-shaped projecting portion 73c (see FIG. 3A and FIG. 3B). Hence, when the small-diameter portion 74b of the conductive member 74 is press-fitted into the ring-shaped projecting portion 73c of the retaining member 73, the end surface of the small-diameter portion 74b of the conductive member 74 is brought into contact with the connecting portion 75c of the elastic member 75 having conductivity, and is thus electrically connected to the connecting portion 75c.

The terminal piece 75b of the elastic member 75 straddles the dielectric 71, the terminal member 72, and the wall portion 37, and is connected by soldering to the conductive pattern on the board surface 8a of the printed board 8 mounted on the printed board mounting base portion 3b.

Method of Housing Pressure Sensing Parts 7 in Holder Portion 3a

First, the board holder 3 is mounted on the flat surface of the workbench such that the flat surface 3pn faces the flat surface of the workbench. In this state, the board holder 3 is positioned such that the opening of the opening portion 35 faces in an upward direction orthogonal to the flat surface of the workbench and the printed board mounting flat surface of the printed board mounting base portion 3b is parallel to the flat surface of the workbench, and the board holder 3 is locked on the flat surface of the workbench.

Next, the dielectric 71 and the terminal member 72 of the pressure sensing parts 7 are housed within the hollow portion of the cylindrical body 34 forming the holder portion 3a through the opening portion 35. At this time, the dielectric 71 and the terminal member 72 are housed within the hollow portion of the cylindrical body 34 in a state in which the L-shaped projection 72e of the terminal member 72 holds down the opening side end portion of the dielectric 71 housed within the hollow portion of the cylindrical body 34. In addition, at this time, the dielectric 71 is housed within the recessed groove 39 formed in the inner wall of the cylindrical body 34, and the bulging portions 72a and 72b of the terminal member 72 are fitted into the slits 38a and 38b of the holder portion 3a.

Next, in the present example, the small-diameter portion 74b of the conductive member 74 is press-fitted into the recessed hole 73d of the ring-shaped projecting portion 73c of the retaining member 73, and the winding portion 75a of the elastic member 75 is arranged so as to be brought around the periphery of the ring-shaped projecting portion 73c and the conductive member 74. At this time, the connecting portion 75c of the elastic member 75 is sandwiched between the upper end surface of the small-diameter portion 74b of the conductive member 74 and the bottom of the recessed hole 73d of the ring-shaped projecting portion 73c, so that the connecting portion 75c of the elastic member 75 and the conductive member 74 are electrically connected to each other.

Next, the combination of the retaining member 73, the conductive member 74, and the coil spring of the elastic member 75 is inserted in the axial direction into the hollow portion of the cylindrical body 34 from the side of the conductive member 74 through the opening 36a of the cylindrical body 34. Then, the combination of the retaining member 73, the conductive member 74, and the coil spring of the elastic member 75 is inserted in the axial direction until the engaging projecting portions 73g and 73h formed on the cylindrical shape portion 73a of the retaining member 73 are fitted into the engaging holes 34a and 34b formed in the side circumferential surface of the cylindrical body 34. At this time, the cylindrical shape portion 73a of the retaining member 73 is elastically deformed in the direction orthogonal to the axial direction and inserted into the hollow portion of the cylindrical body 34 in spite of the presence of the engaging projecting portions 73g and 73h because the slit 73e is formed.

When the engaging projecting portions 73g and 73h formed on the cylindrical shape portion 73a of the retaining member 73 are fitted into the engaging holes 34a and 34b formed in the side circumferential surface of the cylindrical body 34 of the holder portion 3a, the retaining member 73 is locked to the inside of the hollow portion of the cylindrical body 34 of the holder portion 3a. Thus, the retaining member 73 will not fall out through the opening 36a of the cylindrical body 34 of the holder portion 3a irrespective of a biasing force in the axial direction of the elastic member 75. In addition, in this state, the dielectric 71 and the terminal member 72 are pressed to the side of the wall portion 37 by the biasing force in the axial direction of the elastic member 75. This prevents the dielectric 71 and the terminal member 72 from falling out through the opening portion 35 of the cylindrical body 34.

That is, locking mechanism for preventing the dielectric 71 and the terminal member 72 forming parts of the pressure sensing parts 7 from being displaced in the direction orthogonal to the axial direction is formed by the engagement between the engaging holes 34a and 34b formed in the cylindrical body 34 and the engaging projecting portions 73g and 73h of the cylindrical shape portion 73a of the retaining member 73 and the biasing force of the elastic member 75.

Next, in a state in which all of the plurality of parts forming the pressure sensing parts 7 are housed and locked within the hollow portion of the cylindrical body 34 of the holder portion 3a as described above, the lead portion 72d of the terminal member 72 is soldered to the land portion 8b of the printed board 8, and the terminal piece 75b of the coil spring as the elastic member 75 is soldered to the printed board 8.

The soldering and fixing of the lead portion 72d of the terminal member 72 and the terminal piece 75b of the elastic member 75 to the printed board 8 can more surely prevent the terminal member 72 from falling out through the opening portion 35 of the holder portion 3a. In the present example, the L-shaped projection 72e of the terminal member 72 holds down the opening side end portion of the dielectric 71 housed within the hollow portion of the cylindrical body 34 of the holder portion 3a. Therefore the soldering and fixing of the terminal member 72 to the printed board 8 can more surely prevent the dielectric 71 from falling out through the opening portion 35 of the cylindrical body 34 of the holder portion 3a.

The retaining member 73 fitted with the conductive member 74 is prevented from moving to the side of the core body 4 in the axial direction with the engaging projecting portions 73g and 73h engaged with the engaging holes 34a and 34b of the cylindrical body 34, but is movable to the side of the dielectric 71 in the axial direction within the hollow portion of the cylindrical body 34. When no pen pressure is applied, the biasing force of the elastic member 75 creates an air space between the conductive member 74 and the dielectric 71.

After the pressure sensing parts 7 are housed within the cylindrical body 34 forming the holder portion 3a as described above, the anti-falling member 9 is press-fitted into the opening 36a of the cylindrical body 34, as shown in FIGS. 3A and 3B and FIG. 4B. As FIGS. 3A and 3B, the anti-falling member 9 has a through hole 9a into which to insert the core body main body 42 of the core body 4 in the axial direction, and has a cylindrical portion 9b having an outside diameter substantially equal to or slightly smaller than the inside diameter of the portion 36 on the side of the opening 36a of the cylindrical body 34. The anti-falling member 9 is coupled to the holder portion 3a by press-fitting the cylindrical portion 9b of the anti-falling member 9 into the portion 36 on the side of the opening 36a of the cylindrical body 34.

In addition, the anti-falling member 9 has a recessed portion 9c having an inside diameter substantially equal to the outside diameter of the ferrite core 6 on an opposite side from the cylindrical portion 9b in the axial direction. The ferrite core 6 is coupled to the holder portion 3a of the board holder 3 via the anti-falling member 9 by press-fitting an end portion of the ferrite core 6, which end portion is on an opposite side from the side of the projecting member 41 of the core body 4, into the recessed portion 9c of the anti-falling member 9.

As described above, the anti-falling member 9 is formed of a material having elasticity, for example a silicon rubber. Thus, because the ferrite core 6 is coupled to the holder portion 3a of the board holder 3 via the anti-falling member 9, the ferrite core 6 can be prevented from being damaged even if the position indicator 1 is dropped and a high acceleration is applied to the coupling portion between the ferrite core 6 and the holder portion 3a.

Next, in a state in which the ferrite core 6 is coupled to the board holder 3 as described above, the core body main body 42 of the core body 4 is inserted into the through hole 6a of the ferrite core 6. Then, an end portion of the core body main body 42 of the core body 4 is press-fitted into the recessed hole 73b of the cylindrical shape portion 73a of the retaining member 73 housed in the holder portion 3a. In this case, even in a state in which the core body 4 is press-fitted in the recessed hole 73b of the cylindrical shape portion 73a, the core body main body 42 of the core body 4 is also exposed from the ferrite core 6 to the side of the projecting member 41 of the core body 4, as shown in FIG. 3A and FIG. 4B. A pressure (pen pressure) applied to the projecting member 41 of the core body 4 can displace the core body 4 to the side of the case cap 2b in the axial direction against the biasing force of the elastic member 75.

As described above, the printed board 8 is mounted on the printed board mounting base portion 3b of the board holder 3 coupled to the case cap 2b, the pressure sensing parts 7 are housed in the holder portion 3a, and the ferrite core 6 and the core body 4 are coupled to the holder portion 3a, whereby a module part as shown in FIG. 4B is formed.

Next, this module part is inserted into the hollow portion of the case main body 2a, so that the projecting member 41 of the core body 4 projects from the through hole 21 of the case main body 2a to the outside. Then, the case main body 2a and the case cap 2b are coupled to each other, whereby the position indicator 1 is completed.

In the position indicator 1, when pressure is applied to the projecting member 41 of the core body 4, the core body 4 is displaced in a direction of the inside of the case main body 2a in the axial direction according to the pressure. Then, the displacement of the core body 4 displaces the retaining member 73 within the holder portion 3a, which retaining member 73 is coupled with the core body main body 42 to the side of the dielectric 71 against the elastic biasing force of the elastic member 75. As a result, the conductive member 74 fitted in the retaining member 73 is displaced to the side of the dielectric 71, so that a distance between the conductive member 74 and the dielectric 71 and, further, a contact area between the conductive member 74 and the dielectric 71 change according to the pressure applied to the core body 4.

The capacitance of the variable capacitance capacitor formed between the terminal member 72 forming the first electrode and the conductive member 74 forming the second electrode thereby changes according to the pressure applied to the core body 4. The change in the capacitance of the variable capacitance capacitor is transmitted from the position indicator 1 to the position detecting device 202, whereby the position detecting device 202 detects the pen pressure applied to the core body 4 of the position indicator 1.

Figure 5:
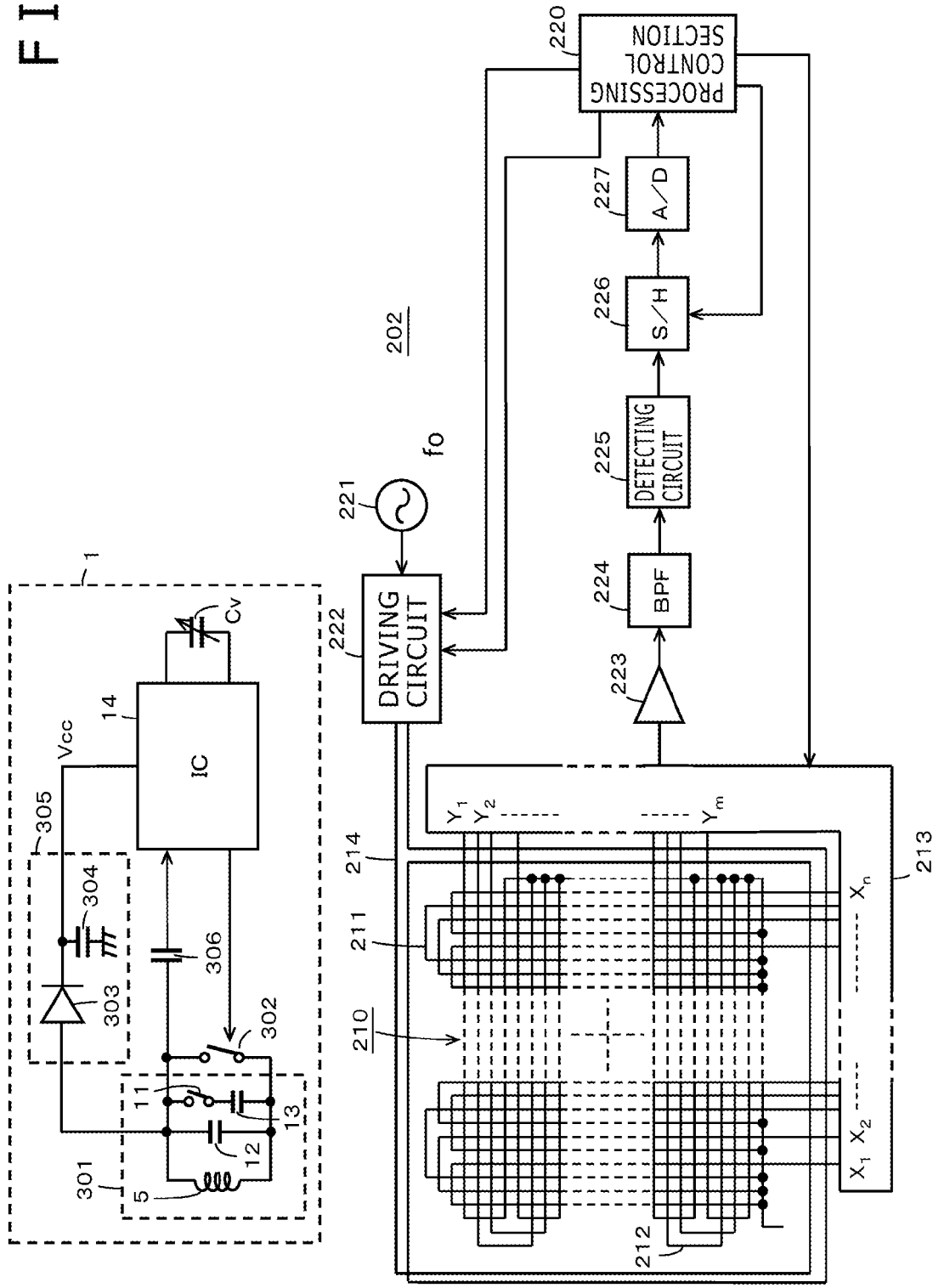
FIG. 5 is a circuit diagram of assistance in explaining the first embodiment of the position indicator according to the present invention and the position detecting device.

Circuit Configuration for Position Detection and Pen Pressure Detection in First Embodiment FIG. 5 is a diagram showing an equivalent circuit of the position indicator 1 according to the first embodiment and an example of circuit configuration of the position detecting device 202 performing position detection and pen pressure detection by electromagnetic induction coupling with the position indicator 1.

The position detecting device 202 in the example of FIG. 5 has a position detecting coil 210 formed by stacking an X-axis direction loop coil group 211 and a Y-axis direction loop coil group 212, and has a selecting circuit 213 for sequentially selecting one loop coil of the two loop coil groups 211 and 212.

The position indicator 1 according to the first embodiment includes a signal control circuit formed by the IC 14, and is configured to obtain a driving voltage for driving the IC 14 from an exciting signal transmitted from an exciting coil 214 provided to the position detecting device 202. Incidentally, description will be made supposing that in FIG. 5, as an example, the loop coil groups 211 and 212 of the position detecting device 202 are used only for the reception of an electromagnetic coupling signal from the position indicator 1. However, it is not excluded that the signal control circuit provided to the position indicator 1 is driven by the electromagnetic coupling between the loop coil groups 211 and 212 of the position detecting device 202 and the position indicator 1 in place of the exciting coil 214. In addition, it is not excluded that a signal such as predetermined control data or the like is transmitted to the signal control circuit provided to the position indicator 1.

In the position detecting device 202 in the example of FIG. 5, the exciting coil 214 is disposed so as to surround the position detecting coil 210. The exciting coil 214 in FIG. 5 has two turns. In actuality, however, the exciting coil 214 has a larger number of turns, for example eight to ten turns. As shown in FIG. 5, the exciting coil 214 is connected to a driving circuit 222. The driving circuit 222 is connected to an oscillating circuit 221 oscillating at a frequency fo.

The driving circuit 222 is controlled by a processing control section 220 formed by a microcomputer. The processing control section 220 controls the driving circuit 222 to control the supply of an oscillating signal of the frequency fo from the oscillating circuit 221 to the exciting coil 214 and thus control signal transmission from the exciting coil 214 to the position indicator 1.

The selecting circuit 213 selects one loop coil under selection control of the processing control section 220. An induced voltage generated in the loop coil selected by the selecting circuit 213 is amplified in a receiving amplifier 223, and supplied to a band-pass filter 224, so that only a component of the frequency fo is extracted. The band-pass filter 224 supplies the extracted component to a detecting circuit 225.

The detecting circuit 225 detects the component of the frequency fo, and supplies a direct-current signal corresponding to the detected component of the frequency fo to a sample and hold circuit 226. The sample and hold circuit 226 holds a voltage value of the output signal of the detecting circuit 225 in predetermined timing, specifically predetermined timing during a receiving period, and sends out the voltage value to an ND (analog-to-digital) converter circuit 227. The ND converter circuit 227 converts the analog output of the sample and hold circuit 226 into a digital signal, and outputs the digital signal to the processing control section 220. The processing control section 220 supplies the signal in the predetermined timing to the sample and hold circuit 226.

The processing control section 220 determines whether the digital signal from the ND converter circuit 227 is a value exceeding a predetermined threshold value, and thereby determines whether the loop coil selected by the selecting circuit 213 is a loop coil at a position indicated by the position indicator 1.

As will be described later, aside from the detection of the position indicated by the position indicator 1, the processing control section 220 also detects the intermittence of a signal from the position indicator 1 as a digital signal of a few bits, for example 8 bits, and thereby detects pen pressure.

The circuit configuration of the position indicator 1 is as shown enclosed by a dotted line in FIG. 5. Specifically, the capacitor 12 is connected in parallel with the coil 5 as an inductance element. The capacitor 13 and the side switch 11 are connected in series with each other. The series circuit of the capacitor 13 and the side switch 11 is connected in parallel with the coil 5, whereby a resonance circuit 301 is formed. A switch 302 is connected in parallel with the resonance circuit 301. This switch 302 is configured to be subjected to on-off control by the IC 14.

The IC 14 is configured to operate on power Vcc obtained by rectifying an alternating-current signal received in the resonance circuit 301 by electromagnetic induction from the position detecting device 202 in a rectifying circuit (power supply circuit) 305 including a diode 303 and a capacitor 304. The IC 14 is connected to the resonance circuit 301 via a capacitor 306, and monitors conditions of operation of the resonance circuit 301. By monitoring the conditions of operation of the resonance circuit 301, the IC 14 can detect conditions of electromagnetic coupling to the exciting coil 214 of the position detecting device 202 or, though not described in the present example, a signal such as control data or the like transmitted from the position detecting device 202 using the two loop coil groups 211 and 212, to perform desired operation control.

The IC 14 is further connected with the variable capacitance capacitor (capacitance Cv) formed by the pressure sensing parts 7. The IC 14 is configured to be able to detect the capacitance Cv corresponding to pen pressure. The IC 14 detects the pen pressure in the position indicator 1 from the value of the capacitance Cv. The IC 14 then converts the detected pen pressure into a digital signal of 8 bits, for example, and controls the switch 302 by the digital signal corresponding to the pen pressure. In the above circuit configuration, the variable capacitance capacitor formed by the pressure sensing parts 7 does not need to form the resonance circuit 301. The constituent elements other than the coil 5 and the variable capacitance capacitor formed by the pressure sensing parts 7 are all disposed on the printed board 8.

Description will be made of position detecting operation and pen pressure detecting operation of the position indicator 1 and the position detecting device 202 configured as described above.

The processing control section 220 first drives the driving circuit 222 to transmit a signal to the position indicator 1 from the exciting coil 214 for a predetermined time. Next, the processing control section 220 makes the selecting circuit 213 sequentially select one loop coil of the X-axis direction loop coil group 211, and obtains the X-coordinate value of a position indicated by the position indicator 1.

The processing control section 220 next drives the driving circuit 222 to transmit a signal to the position indicator 1 from the exciting coil 214 for a predetermined time. Next, the processing control section 220 makes the selecting circuit 213 sequentially select one loop coil of the Y-axis direction loop coil group 212, and obtains the Y-coordinate value of the position indicated by the position indicator 1.

After detecting the position indicated by the position indicator 1 as described above, the processing control section 220 performs transmission that continues for a predetermined time or more from the exciting coil 214, and thereafter performs transmission and reception eight consecutive times in similar timing to that of the coordinate detection, to detect 8-bit pen pressure information from the position indicator 1. At this time, the selecting circuit 213 selects a loop coil (which may be either of an X-axis direction loop coil and a Y-axis direction loop coil) closest to the position indicator 1 according to the detected coordinate value, and receives a signal.

Meanwhile, the IC 14 of the position indicator 1 converts pen pressure obtained so as to correspond to the capacitance Cv of the variable capacitance capacitor formed by the pressure sensing parts 7 into an 8-bit digital signal, and performs on-off control of the switch 302 by the 8-bit digital signal in synchronism with the transmission and reception of a signal from the position detecting device 202. When the switch 302 is off, the resonance circuit 301 can return the signal transmitted from the position detecting device 202 to the position detecting device 202. Thus, the loop coil of the position detecting device 202 receives this signal. On the other hand, when the switch 302 is on, the resonance circuit 301 is prohibited from operating. Thus, the signal is not returned from the resonance circuit 301 to the position detecting device 202, and the loop coil of the position detecting device 202 does not receive the signal.

The processing control section 220 of the position detecting device 202 receives the 8-bit digital signal corresponding to the pen pressure by determining whether the signal is received or not eight times, and is thus able to detect the pen pressure information from the position indicator 1.

Effects of First Embodiment

Of the pressure sensing parts 7, parts not moving in the axial direction even when pen pressure is applied from the core body 4, in particular, are desirably arranged in a predetermined state in a predetermined position set in advance in the axial direction within the holder portion 3a. According to the first embodiment described above, of the pressure sensing parts 7, the dielectric 71 and the terminal member 72, which are parts not moving in the axial direction, are housed into the holder portion 3a in a direction orthogonal to the axial direction via the opening portion 35 having an opening in the direction orthogonal to the axial direction, which opening portion 35 is provided in the side circumferential surface of the cylindrical body 34 forming the holder portion 3a.

Hence, the dielectric 71 and the terminal member 72 as parts not moving in the axial direction (fixed parts) can be surely housed and arranged in a predetermined state in a predetermined position in the axial direction within the hollow portion of the cylindrical body 34. In addition, according to the first embodiment, the housed state of these parts can be visually checked easily through the opening portion 35.

Since those "fixed parts" are housed and arranged in a predetermined state in a predetermined position within the holder portion 3a as described above, in the first embodiment, it suffices to house only the retaining member 73, the conductive member 74, and the elastic member 75, which are other parts (movable parts) moving in the axial direction according to the application of the pen pressure from the core body 4 among the pressure sensing parts 7, into the hollow portion of the cylindrical body 34 of the holder portion 3a via the opening 36a in the axial direction of the cylindrical body 34.

Therefore, work and the number of man-hours at the time of producing the pen pressure detecting module by housing the pressure sensing parts in the holder while considering alignments of the pressure sensing parts in the axial direction and the direction orthogonal to the axial direction can be simplified and reduced as compared with the conventional pen pressure detecting modules. Thus, the pen pressure detecting module can be manufactured more easily, and work efficiency in the manufacturing of the position indicator is improved, so that the position indicator is suitable for mass production.

According to the first embodiment described above, the dielectric 71 and the terminal member 72 in the state of being housed in the hollow portion of the cylindrical body 34 are pressed to the side of the wall portion 37 in the axial direction by the biasing force of the elastic member 75. The dielectric 71 and the terminal member 72 are thereby locked so as not to move in the direction orthogonal to the axial direction. Therefore the dielectric 71 and the terminal member 72 are prevented from falling out (springing out) through the opening portion 35.

Further, in the first embodiment, the lead portion 72d of the terminal member 72 is soldered and fixed to the printed board 8, and the L-shaped projection 72e of the terminal member 72 holds down the opening side end portion of the dielectric 71. Thus, the dielectric 71 and the terminal member 72 can be more surely prevented from falling out through the opening portion 35 of the cylindrical body 34 of the holder portion 3a.

In addition, in the first embodiment described above, all of the pressure applied to the core body 4 is received by the holder portion 3a of the board holder 3. That is, even when the pressure applied to the core body 4 brings the conductive member 74 and the dielectric 71 in contact with each other, so that pressure is applied to the dielectric 71, the pressure applied to the dielectric 71 in the axial direction is received by the wall portion 37 of the cylindrical body 34 forming the holder portion 3a via the terminal member 72.

Therefore, in the position indicator 1 according to the first embodiment, the pressure applied to the core body 4 is not at all applied to the printed board 8 mounted on the printed board mounting base portion 3b of the board holder 3. Hence, according to the first embodiment, there is no fear of deformation or the like of the printed board 8 due to the application of pressure caused by the pen pressure to the printed board 8, and there occurs no defect such as a contact failure, variation in circuit characteristics, or the like in the printed board 8.

In addition, all of the pressure applied to the core body 4 is received by the holder portion 3a of the board holder 3, and the board holder 3 is partly in contact with the inner wall of the case main body 2a but is only housed within the case main body 2a without being fixed to the case main body 2a as a whole. Therefore the pressure applied to the core body 4 is not directly applied to the case main body 2a. Hence, even if the position indicator 1 is placed in harsh conditions such as high-temperature conditions and the like, and even after many years of use of the position indicator 1, elastic biasing forces do not continue being applied to the case main body 2a through the board holder 3. The case main body 2a is thus prevented from being bent.

Further, in the first embodiment described above, the printed board 8 is mounted and locked on the printed board mounting base portion 3b of the board holder 3, and the printed board 8 is smaller than the mounting flat surface of the printed board mounting base portion 3b. The printed board 8 is thus housed without being protruding from the board holder 3. Hence, the printed board 8 is separated from the case main body 2a, and is not in contact with the case main body 2a.

Therefore, even when an impact is applied to the case main body 2a in a case where the position indicator 1 is dropped, the impact is not directly applied to the printed board 8. In addition, even when a force in the axial direction from the side of the case cap or a force in a direction intersecting the axial direction is applied to the case main body 2a, the force applied to the case main body 2a is not directly applied to the printed board 8. That is, the printed board 8 is in a so-called free state of being free from forces applied to the case main body 2a.

Therefore, because excessive forces are not applied to the printed board 8, there occurs no defect such as a contact failure, variation in circuit characteristics, or the like in the printed board 8. In addition, the parts on the printed board 8 housed in the board holder 3 do not need to be readjusted when housed within the case main body 2a after being adjusted before being housed within the case main body 2a.

In addition, in the first embodiment described above, the pen pressure detecting module is embodied using the holder portion 3a of the board holder 3 having the printed board mounting base portion 3b. Then, the ferrite core 6 wound with the coil 5 and the core body 4 are coupled to the holder portion 3a of the board holder 3. Thus, all of the parts housed within the case main body 2a of the position indicator 1 can be handled en bloc as a module part.

Therefore, according to the first embodiment, the position indicator 1 can be manufactured by merely housing the module part within the case main body 2a. Thus, as compared with a case where a plurality of parts are arranged in order in the axial direction and housed within the case main body 2a, a manufacturing process is simplified, and is suitable for the mass production of the position indicator. In addition, because the printed board 8 and the pressure sensing parts 7 are housed in the board holder 3, even when a force is applied from the side of the coupling portion 3c of the board holder 3, the printed board 8 and the pressure sensing parts 7 are not affected by the force. Hence, the module part can be handled in a similar manner to a refill for a ballpoint pen or the like. Incidentally, the module part is thinned easily by reducing the size of the pressure sensing parts 7.

In addition, in the first embodiment described above, the core body 4 is replaceable because the core body main body 42 of the core body 4 is fitted into the retaining member 73 of the pressure sensing parts 7 within the board holder 3 through the through-hole 6a of the ferrite core 6.

Figure 19B:
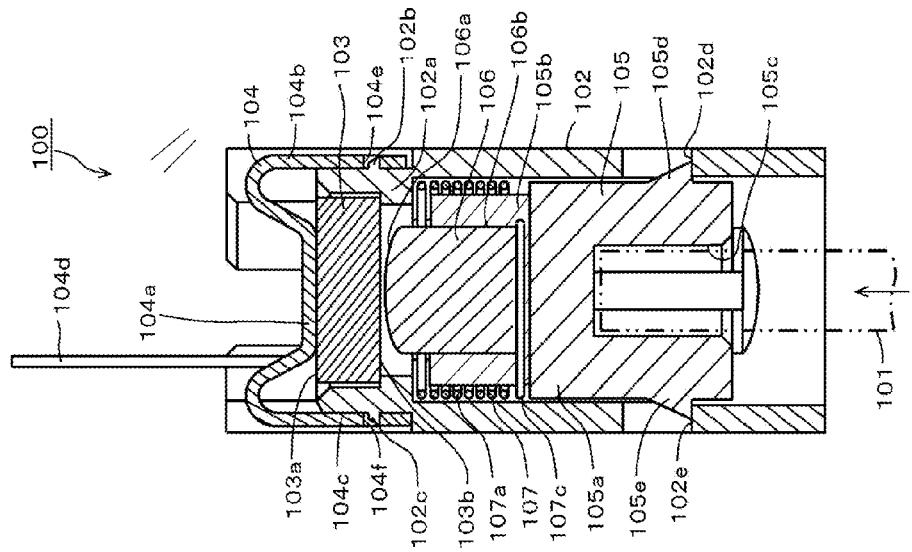
FIGS. 19A and 19B are diagrams of assistance in explaining an example of construction of a conventional position indicator.
Figure 19A:
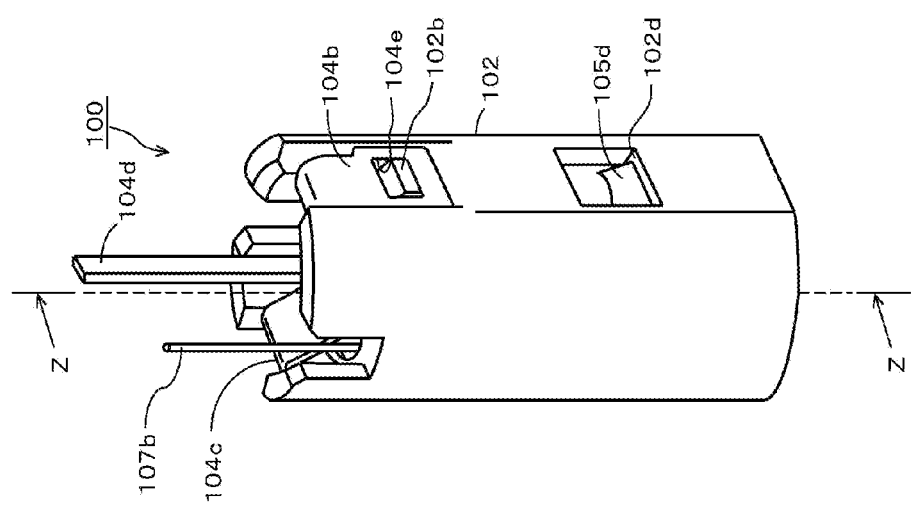

In addition, the first embodiment provides the following effects as compared with the case where the conventional variable capacitance capacitor described with reference to FIGS. 19A and 19B is used as pressure sensing parts. In the conventional variable capacitance capacitor 100 in the example of FIGS. 19A and 19B, the dielectric 103 is elastically held down and fixed to the holder 102 by the terminal member 104 configured to have elasticity. Thus, a strong impact from the core body 101, which impact is caused by the falling of the position indicator 1 or the like, may break locking tooth portions 102b and 102c of the holder 102, causing the terminal member 104 to come off the holder 102, and causing a contact failure of one of the two electrodes sandwiching the dielectric 103.

On the other hand, according to the first embodiment described above, the terminal member 72 can be fitted into the slits 38a and 38b formed in the cylindrical body 34 by being inserted into the cylindrical body 34 forming the holder portion 3a through the opening portion 35 in the direction orthogonal to the axial direction in a state of being in contact with a surface of the dielectric 71. The terminal member 72 is thereby locked to the holder portion 3a. Therefore, even when the position indicator 1 falls, for example, the terminal member 72 does not come off the holder portion 3a, and no contact failure occurs.

Modification of First Embodiment

In the foregoing first embodiment, the terminal member 72 housed through the opening portion 35 has the bulging portions 72a and 72b, and the cylindrical body 34 of the holder portion 3a has the slits 38a and 38b, into which to fit the bulging portions 72a and 72b. In addition, the recessed groove 39 into which to fit the dielectric 71 is formed in the cylindrical body 34.

Figure 6:
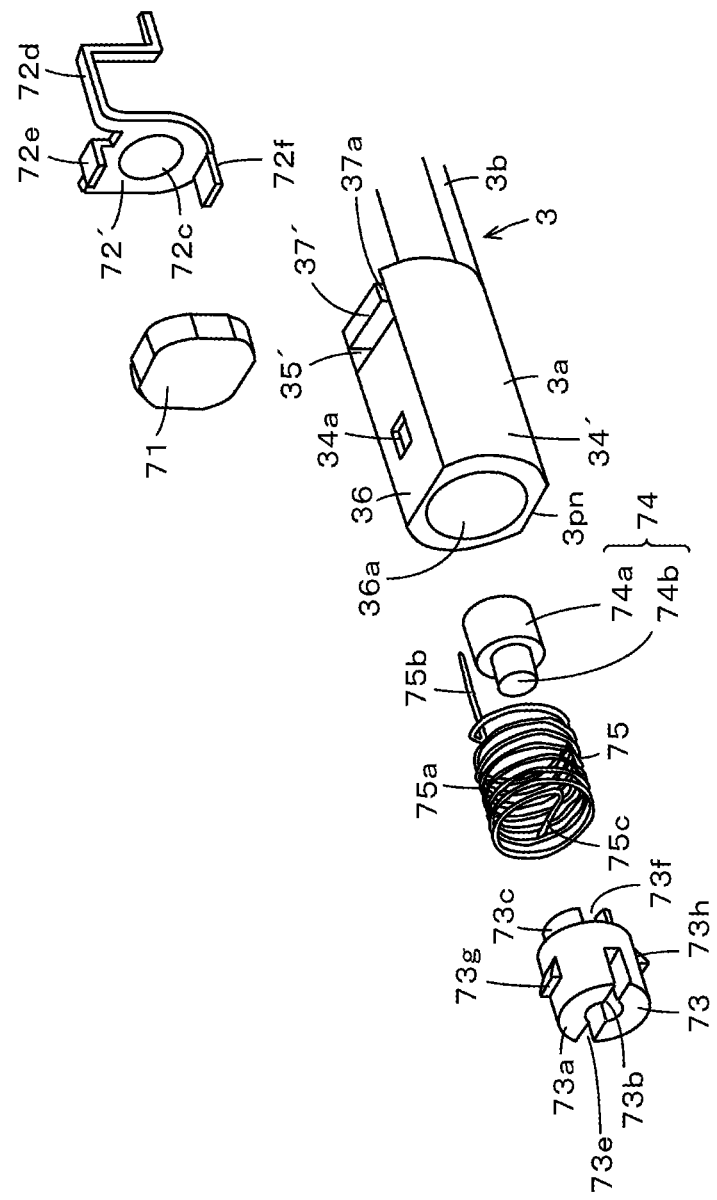
FIG. 6 is a diagram of assistance in explaining an example of construction of a modification of the first embodiment of the position indicator according to the present invention.

However, the slits 38a and 38b and the recessed groove 39 of the cylindrical body 34 can be omitted by forming the construction of the terminal member 72 and the construction of the cylindrical body 34 of the holder portion 3a as shown in FIG. 6.

FIG. 6 is a diagram showing the portions of the pressure sensing parts 7 and the holder portion 3a of the board holder 3. In the example of FIG. 6, the terminal member 72 in the example of FIGS. 4A to 4C is changed to a terminal member 72', and the cylindrical body 34 forming the holder portion 3a in the example of FIGS. 4A to 4C is changed to a cylindrical body 34'. The construction of other parts is the same as that shown in FIGS. 4A to 4C.

Specifically, in the example of FIG. 6, the terminal member 72' has a substantially similar construction to that of the terminal member 72 in the example of FIGS. 4A to 4C, but does not have the bulging portions 72a and 72b. An L-shaped projection 72f projecting on an opposite side from the lead portion 72d is formed at a position of a lower end portion of the terminal member 72', which lower end portion is on an opposite side from the side of an opening portion 35', the position being such as to be opposed to the L-shaped projection 72e with the swelling portion 72c interposed between the L-shaped projection 72f and the L-shaped projection 72e. A distance between the L-shaped projection 72e and the L-shaped projection 72f is in accordance with the size of the dielectric 71. The dielectric 71 can be sandwiched and locked between the L-shaped projection 72e and the L-shaped projection 72f.

The cylindrical body 34' of the holder portion 3a does not have the slits 38a and 38b nor have the recessed groove 39. In addition, in the cylindrical body 34 in the example of FIGS. 4A to 4C, the opening portion 35 is formed by cutting away the cylindrical body 34 by the wall thickness of the cylindrical body 34, and the wall portion 37 and the cylindrical body 34 are lower by the same thickness of the cut-away portion. However, in the example of FIG. 6, the opening portion 35' corresponding to the opening portion 35 is formed by making a gap in the side circumferential surface of the cylindrical body 34' in a direction orthogonal to the axial direction, and the height of a wall portion 37' corresponding to the wall portion 37 is greater than that of the wall portion 37.

Therefore, the lead portion 72d of the terminal member 72 cannot straddle the wall portion 37' as it is. In the example of FIG. 6, however, a recessed groove 37a, into which to fit the lead portion 72d precisely, is formed in the wall portion 37' in a vertical direction (direction orthogonal to the axial direction).

In the example of FIG. 6, the dielectric 71 sandwiched and positioned between the L-shaped projection 72e and the L-shaped projection 72f of the terminal member 72' is inserted and housed into the hollow portion of the cylindrical body 34' in the direction orthogonal to the axial direction through the opening portion 35'. At this time, the lead portion 72d of the terminal member 72' is fitted into the recessed groove 37a of the wall portion 37', and an end portion of the lead portion 72d is positioned on the side of the printed board 8.

The other construction is the same as that of the foregoing first embodiment. In the example of FIG. 6, the dielectric 71 can be positioned by being sandwiched between the L-shaped projection 72e and the L-shaped projection 72f of the terminal member 72' and can be housed into the cylindrical body 34' through the opening portion 35' in the positioned state, which is convenient. In addition, the cylindrical body 34' is simplified in construction because the slits 38a and 38b and the recessed groove 39 do not need to be formed in the cylindrical body 34'.

Second Embodiment

In the foregoing first embodiment, when the plurality of parts forming the pen pressure detecting module are inserted into the cylindrical holder from the axial direction, the retaining member needs to press-fit parts into the holder portion. Therefore, contact portions of the engaging portions formed on the parts and the engaging portions of the holder and the casing may be worn away or chipped. In such a case, the position of the parts after the plurality of parts forming the pen pressure detecting module are incorporated into the holder and the casing of the position indicator may differ for each position indicator. Then, positional relation between the parts of the pen pressure detecting module in each position indicator is not constant, so that the characteristics of pen pressure detection may become different.

In this case, it is desirable if the positional relation between the parts of the pen pressure detecting module within the holder can be checked. Conventionally, however, the check is difficult because the parts are inserted into a cylindrical holder in the axial direction thereof. A second embodiment solves this problem.

FIGS. 7A to 9D are diagrams of assistance in explaining an example of construction of the second embodiment of the position indicator according to the present invention. As in the first embodiment, a position indicator 1A according to the second embodiment is an example of a position indicator used in conjunction with the position detecting device 202 provided in the electronic device 200. Only the construction of parts of a plurality of parts forming pressure sensing parts and the construction of a portion corresponding to the holder portion 3a of the board holder 3 in the position indicator 1A according to the second embodiment are different from those of the first embodiment, and the construction of other portions in the position indicator 1A according to the second embodiment is similar to that of the first embodiment. Accordingly, the same portions in the position indicator 1A according to the second embodiment as in the position indicator 1 according to the first embodiment are identified by the same reference symbols, and detailed description thereof will be omitted.

Figure 7A:
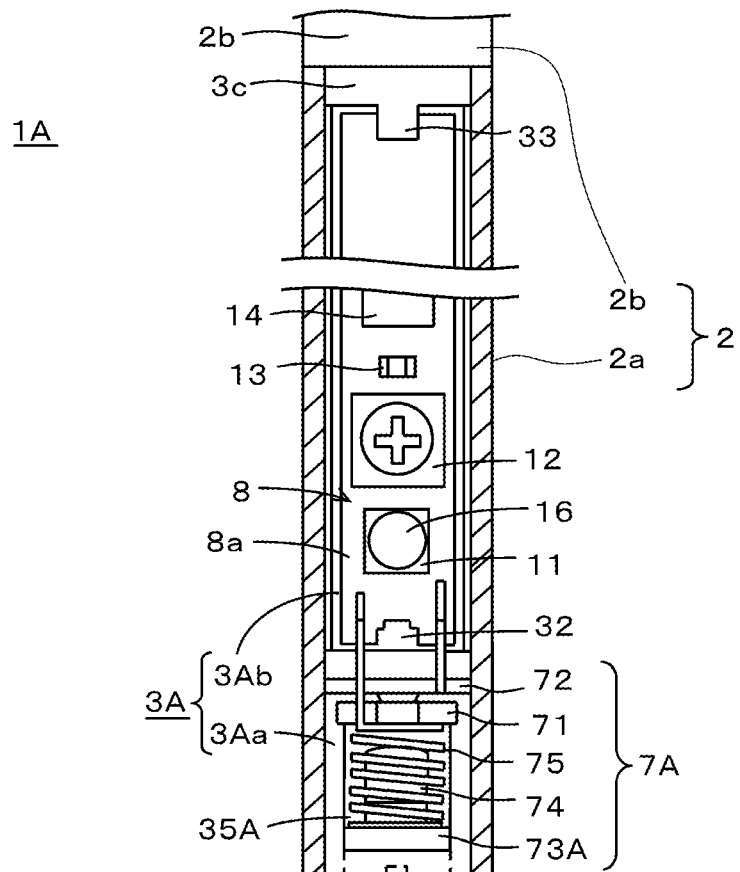
FIGS. 7A and 7B are diagrams of assistance in explaining an example of construction of a second embodiment of the position indicator according to the present invention.
Figure 7B:
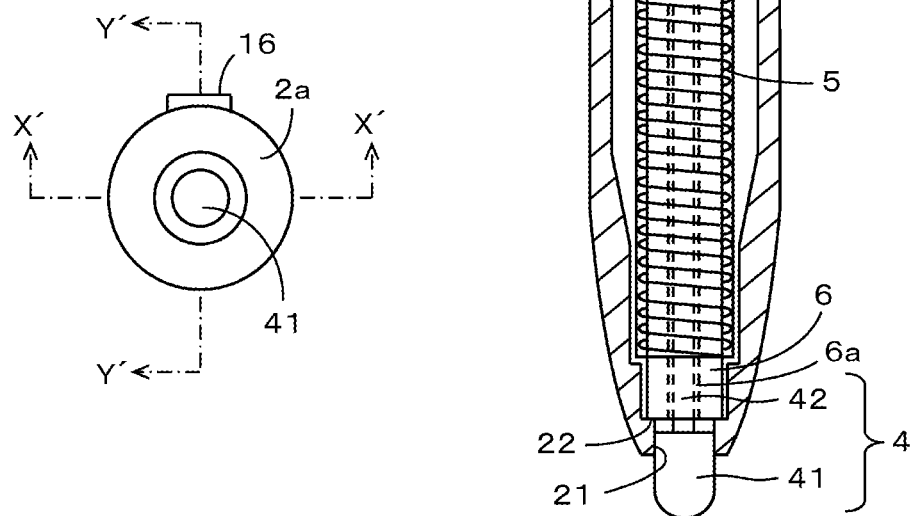

FIGS. 7A and 7B schematically show the position indicator 1A as a whole according to the second embodiment. As with FIG. 1A, FIG. 7A shows the inside of a case main body 2a of a case 2 (casing) of the position indicator 1A with only the case main body 2a cut away for purposes of illustration. FIG. 7B is a view of the position indicator 1A according to the second embodiment as viewed in an axial direction from the side of a core body 4.

Figure 8A:
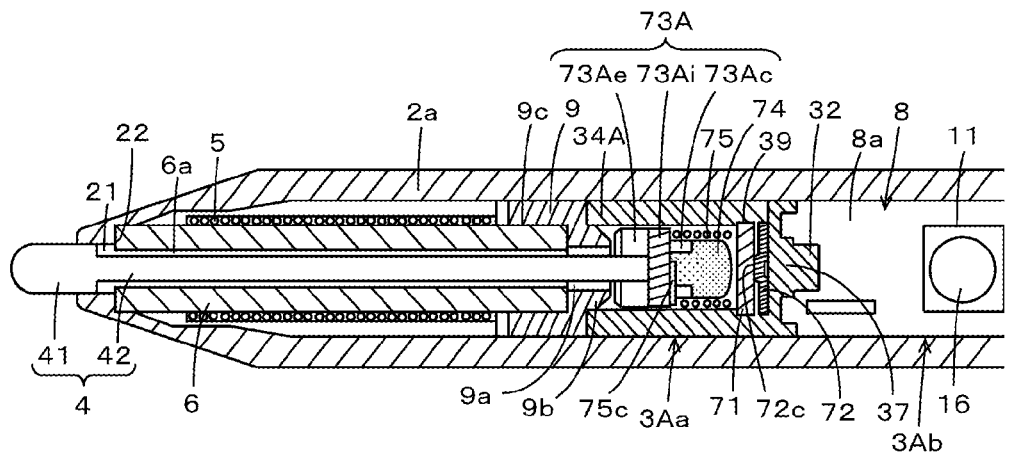
FIGS. 8A, 8B, and 8C are sectional views and a perspective view of principal portions of the second embodiment of the position indicator according to the present invention.
Figure 8B:
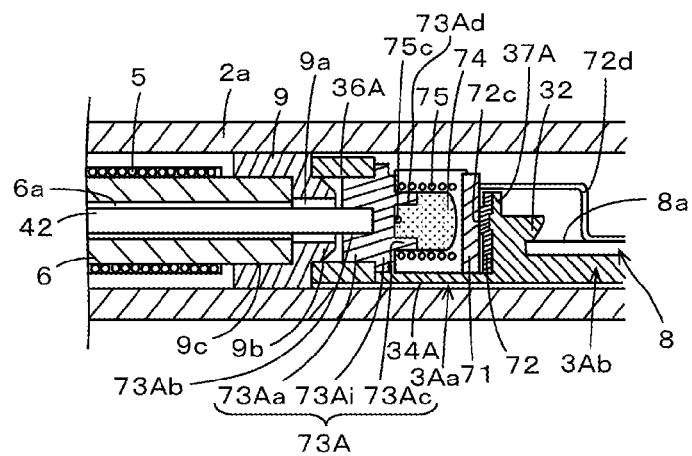
Figure 8C:
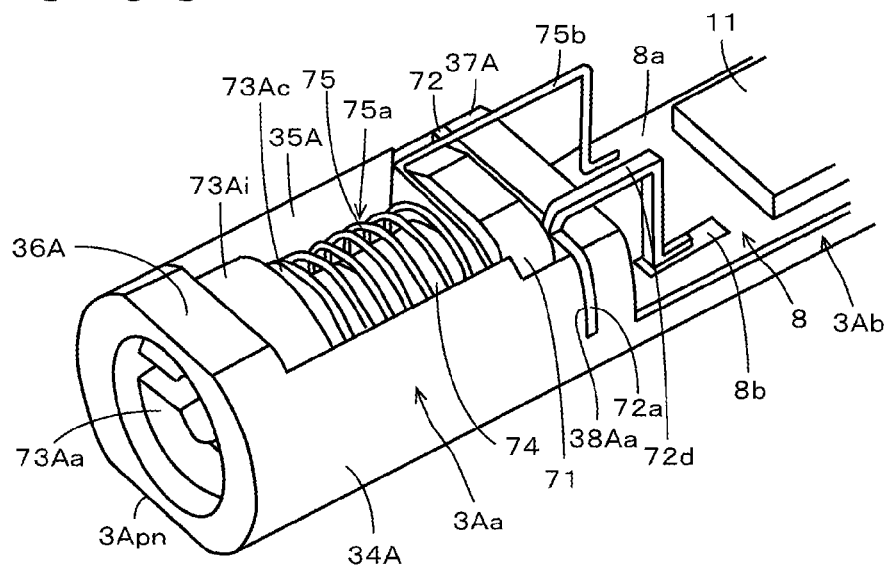

FIG. 8A is a sectional view taken along line X'-X' of FIG. 7B, and is a partial sectional view of the position indicator 1A sectioned in a direction passing through the axial position of the position indicator 1A and parallel with a board surface (surface on which a conductor pattern is printed and formed and circuit parts are mounted) 8a of a printed board 8. FIG. 8B is a sectional view taken along line Y'-Y' of FIG. 7B, and is a partial sectional view of the position indicator 1A sectioned in a direction passing through the axial position of the position indicator 1A and perpendicular to the board surface 8a of the printed board 8. FIG. 8C is a perspective view directing attention to a holder portion 3Aa, in particular, of a board holder 3A according to the second embodiment.

As in the first embodiment, the board holder 3A in the second embodiment has the holder portion 3Aa and a printed board mounting base portion 3Ab. FIG. 9B is a diagram showing a state in which the core body 4 and a ferrite core 6 are coupled to the board holder 3A. FIG. 9A is an exploded perspective view of assistance in explaining the holder portion 3Aa of the board holder 3A and pressure sensing parts 7A.

Incidentally, only the construction of the holder portion 3Aa of the board holder 3A is different from that of the holder portion 3a in the first embodiment. The printed board mounting base portion 3Ab is formed in a similar manner to the printed board mounting base portion 3b of the board holder 3 in the first embodiment, as shown in FIG. 9B.

Also in the present example, the board holder 3A has a flat surface 3Apn formed along the axial direction on a side of a side circumferential surface of a cylindrical body 34A forming the holder portion 3Aa, which side is opposed to an opening portion 35A to be described later with the axial position interposed therebetween and is opposite from the printed board mounting flat surface of the printed board mounting base portion 3Ab. In this case, the flat surface 3Apn is a flush flat surface along the axial direction on the holder portion 3Aa or from the holder portion 3Aa to the printed board mounting base portion 3Ab.

Example of Construction of Pen Pressure Detecting Module

Next, description will be made below of the holder portion 3Aa of the board holder 3A and the pressure sensing parts 7A forming the pen pressure detecting module as well as the housing of the pressure sensing parts 7A in the holder portion 3Aa. The pen pressure detecting module in the present example uses a variable capacitance capacitor whose capacitance varies according to pen pressure applied to the core body as in the first embodiment.

As shown in FIG. 9A, the pressure sensing parts 7A in the present example are formed by a plurality of parts, that is, a dielectric 71, a terminal member 72, a retaining member 73A, a conductive member 74, and an elastic member 75. That is, the pressure sensing parts 7A have a similar construction to that of the first embodiment except that the retaining member 73A has a different construction from that of the retaining member 73 in the first embodiment.

As shown in FIG. 8C and FIG. 9A, the holder portion 3Aa of the board holder 3A is formed by the cylindrical body 34A having a hollow portion, and is formed so as to house the pressure sensing parts 7A arranged in the axial direction within the hollow portion of the cylindrical body 34A.

In the second embodiment, all of the pressure sensing parts 7A are inserted in a direction orthogonal to the axial direction of the cylindrical body 34A and perpendicular to the board surface 8a of the printed board 8, through the opening portion 35A formed in a portion of the side circumferential surface of the cylindrical body 34A forming the holder portion 3Aa and opened in the direction orthogonal to the axial direction, as shown in FIG. 9A, and are housed as shown in FIGS. 8A to 8C.

FIG. 9C is a sectional view taken along line B-B in the cylindrical body 34A forming the holder portion 3Aa of FIG. 9A, and is a sectional view obtained by cutting away a portion of the opening portion 35A in about the middle in the axial direction of the cylindrical body 34A in the direction orthogonal to the axial direction. FIG. 9D is a sectional view taken along line C-C in the cylindrical body 34A forming the holder portion 3Aa of FIG. 9A, and is a sectional view obtained by cutting away the cylindrical body 34A in the axial direction thereof.

As shown in FIG. 9A to 9D, the opening portion 35A formed in a portion of the side circumferential surface of the cylindrical body 34A is opened in the direction orthogonal to the axial direction and opened in the direction perpendicular to the board surface 8a of the printed board 8 mounted on the printed board mounting base portion 3Ab. The opening portion 35A has a predetermined length d5 (see FIG. 9D) in the axial direction, and has a predetermined length d6 (see FIG. 9C) in a direction orthogonal to the axial direction.

The length d5 is selected to be slightly larger than the entire length of the pressure sensing parts 7A as a whole arranged in the axial direction, which length is obtained when the pressure sensing parts 7A are compressed in the axial direction against the biasing force of the elastic member 75. The length d6 is selected to be slightly larger than the largest length of the lengths of the plurality of parts forming the pressure sensing parts 7A in the direction orthogonal to the axial direction.

In addition, the cylindrical body 34A forming the holder portion 3Aa has an opening 36Aa of an inside diameter d7 (see FIG. 9D) on the side of the core body 4 in the axial direction of the cylindrical body 34A, and has the construction of a ring-shaped locking portion 36A having no openings on the side circumferential surface. The inside diameter d7 of the ring-shaped locking portion 36A is selected to be smaller than the inside diameter d6 of the portion in about the middle of the cylindrical body 34A, in which portion the opening portion 35A is formed (d7<d6). Hence, the hollow portion of the cylindrical body 34A has a stepped portion 34Ac formed between the ring-shaped locking portion 36A and the portion of the inside diameter d6 of the cylindrical body 34A, in which portion the opening portion 35A is formed.

The cylindrical body 34A forming the holder portion 3Aa is closed by a wall portion 37A on the side of the printed board mounting base portion 3Ab. A locking portion 32 is formed on the wall portion 37A on the side of the printed board mounting base portion 3Ab. Slits 38Aa and 38Ab having a predetermined width in the axial direction are formed in a coupling portion of the side circumferential surface of the cylindrical body 34A, which coupling portion is coupled to the wall portion 37A. A recessed groove 39A having a larger inside diameter than the inside diameter d6 of the portion of the cylindrical body 34A, in which portion the opening portion 35A is formed, is formed at a position adjacent to the slits 38Aa and 38Ab in the axial direction in the inner wall of the cylindrical body 34A.

In the second embodiment, the dielectric 71 of the pressure sensing parts 7A is formed as a plate-shaped object having an external shape to be fitted into the recessed groove 39A and having a thickness corresponding to the width in the axial direction of the recessed groove 39A. Therefore, the dielectric 71 can be inserted and fitted into the recessed groove 39A of the cylindrical body 34A through the opening portion 35A, and the recessed groove 39A prevents the dielectric 71 in the fitted state from moving in the axial direction within the cylindrical body 34A.

The terminal member 72 in the second embodiment is formed by a disk-shaped conductive member, for example a plate-shaped object of a conductive metal, which has the same thickness as the width in the axial direction of the slits 38Aa and 38Ab of the cylindrical body 34A and has an outside diameter corresponding to the inside diameter d6. As shown in FIG. 9A, the terminal member 72 has bulging portions 72Aa and 72Ab to be fitted into the slits 38Aa and 38Ab of the cylindrical body 34A. Hence, the terminal member 72 can be inserted so as to be in contact with the wall portion 37A of the cylindrical body 34A through the opening portion 35A, and the bulging portions 72Aa and 72Ab are fitted into the slits 38Aa and 38Ab of the cylindrical body 34A by the insertion and locked to the cylindrical body 34A. Further, a swelling portion 72c swelling on the side of the dielectric 71 is formed on a central portion of a plate surface of the terminal member 72, which plate surface is on the side of the dielectric 71. The swelling portion 72c plays a role of surely bringing the dielectric 71 and the terminal member 72 into contact with each other when the dielectric 71 and the terminal member 72 are housed within the cylindrical body 34A.

The terminal member 72 has a lead portion 72d straddling the wall portion 37A of the cylindrical body 34A to be connected by soldering to a land portion 8b (see FIG. 8C) on the board surface 8a of the printed board 8 mounted on the printed board mounting base portion 3Ab.

The retaining member 73A has a cylindrical shape including a ring-shaped swelling portion 73Ai in a portion in a circumferential direction of a side circumferential surface of the retaining member 73A. The retaining member 73A has a cylindrical shape portion 73Aa having a recessed hole 73Ab, into which to press-fit the core body main body 42 of the core body 4 on the core body 4 side in the axial direction of the retaining member 73A. The retaining member 73A also has a ring-shaped projecting portion 73Ac having a recessed hole 73Ad, into which to fit the conductive member 74 on an opposite side in the axial direction from the side of the recessed hole 73Ab. In this case, the center line positions of the ring-shaped swelling portion 73Ai, the cylindrical shape portion 73Aa, and the ring-shaped projecting portion 73Ac are the same as the center line position of the retaining member 73A of a cylindrical shape, and the recessed hole 73Ab and the recessed hole 73Ad are formed such that the center line (axial position) of the recessed hole 73Ab and the center line (axial position) of the recessed hole 73Ad are located on one straight line.

The outside diameter (portion in a circumferential direction) of the ring-shaped swelling portion 73Ai of the retaining member 73A is selected to be equal to the inside diameter d6 of the inside portion of the opening portion 35A of the cylindrical body 34A. In addition, the outside diameter of the cylindrical shape portion 73Aa of the retaining member 73A is selected to be slightly smaller than the inside diameter of the ring-shaped locking portion 36A of the cylindrical body 34A. The diameter of the recessed hole 73Ab of the cylindrical shape portion 73Aa is selected to be slightly smaller than the diameter of the core body main body 42 of the core body 4. The length (height) in the axial direction of the cylindrical shape portion 73Aa is shorter than the length in the axial direction of the ring-shaped locking portion 36A of the cylindrical body 34A, and is about ½ of the length in the axial direction of the ring-shaped locking portion 36A of the cylindrical body 34A in the present example.

The outside diameter of the ring-shaped projecting portion 73Ac of the retaining member 73A is selected to be smaller than the diameter d6 of the inside of the opening portion 35A of the cylindrical body 34A and smaller than the inside diameter of a coil spring forming the elastic member 75. In addition, the inside diameter of the ring-shaped projecting portion 73Ac is selected to be substantially equal to the outside diameter of a small-diameter portion 74b of the conductive member 74.

In the present embodiment, slits 73Ae and 73Af are formed in the cylindrical shape portion 73Aa and the ring-shaped projecting portion 73Ac so as to traverse the recessed hole 73Ab and the recessed hole 73Ad, respectively. The presence of the slits 73Ae and 73Af allows the cylindrical shape portion 73Aa and the ring-shaped projecting portion 73Ac to be elastically displaced in the direction orthogonal to the axial direction. Hence, the core body main body 42 and the conductive member 74 are easily press-fitted into the recessed hole 73Ab and the recessed hole 73Ad of the cylindrical shape portion 73Aa and the ring-shaped projecting portion 73Ac, respectively.

The retaining member 73A has the construction as described above. Thus, when the retaining member 73A is housed in the hollow portion of the cylindrical body 34A through the opening portion 35A, the cylindrical shape portion 73Aa is housed within the ring-shaped locking portion 36A of the cylindrical body 34A, and an (axial) end surface of the ring-shaped swelling portion 73Af abuts against an (axial) end surface of the ring-shaped locking portion 36A of the cylindrical body 34A, whereby the retaining member 73A is prevented from moving to the side of the core body 4. That is, the stepped portion 34Ac of the cylindrical body 34A prevents the retaining member 73A from moving in the axial direction to the side of the core body 4.

The conductive member 74 is similar to that of the first embodiment. In the second embodiment, the outside diameter of a large-diameter portion 74a is selected to be equal to the outside diameter of the ring-shaped projecting portion 73Ac of the retaining member 73A, and the outside diameter of the small-diameter portion 74b is selected to be substantially equal to the diameter of the recessed hole 73Ad of the ring-shaped projecting portion 73Ac of the retaining member 73A.

A winding portion 75a of the coil spring having conductivity, which coil spring forms the elastic member 75, has such a diameter as to be able to house the conductive member 74 and the ring-shaped projecting portion 73Ac of the retaining member 73A within the winding portion 75a without being in contact with the conductive member 74 and the ring-shaped projecting portion 73Ac of the retaining member 73A and as to be smaller than the outside diameter of the cylindrical shape portion 73Ac of the retaining member 73A.

Also in the second embodiment, a connecting portion 75c of the elastic member 75 is inserted from the notch portion of the ring-shaped projecting portion 73Ac of the retaining member 73A into the inside of the ring-shaped projecting portion 73Ac (see FIG. 8A and FIG. 8B). Hence, when the small-diameter portion 74b of the conductive member 74 is press-fitted into the recessed hole 73Ad of the ring-shaped projecting portion 73Ac of the retaining member 73A, an upper end surface of the small-diameter portion 74b of the conductive member 74 is brought into contact with and electrically connected to the connecting portion 75c of the elastic member 75 having conductivity.

A terminal piece 75b of the elastic member 75 straddles the dielectric 71, the terminal member 72, and the wall portion 37A, and is connected by soldering to the conductive pattern on the board surface 8a of the printed board 8 mounted on the printed board mounting base portion 3Ab.

Method of Housing Pressure Sensing Parts 7A in Holder Portion 3Aa

First, the board holder 3A is mounted on the flat surface of the workbench such that the flat surface 3Apn faces the flat surface of the workbench. In this state, the board holder 3A is positioned such that the opening of the opening portion 35A faces in an upward direction orthogonal to the flat surface of the workbench and the printed board mounting flat surface of the printed board mounting base portion 3Ab is parallel to the flat surface of the workbench, and the board holder 3A is locked on the flat surface of the workbench.

Next, before the pressure sensing parts 7A are housed within the hollow portion of the cylindrical body 34A forming the holder portion 3Aa through the opening portion 35A, the small-diameter portion 74b of the conductive member 74 is first press-fitted into the ring-shaped projecting portion 73Ac of the retaining member 73A, and the winding portion 75a of the elastic member 75 is arranged so as to be brought around the periphery of the ring-shaped projecting portion 73Ac and the conductive member 74. At this time, the connecting portion 75c of the elastic member 75 is sandwiched between the upper end surface of the small-diameter portion 74b of the conductive member 74 and the bottom of the retaining member 73A, which bottom is surrounded by the ring-shaped projecting portion 73Ac, so that the connecting portion 75c of the elastic member 75 and the conductive member 74 are electrically connected to each other.

Next, the dielectric 71 is disposed so as to be opposed to a curved surface of the conductive member 74, which curved surface is in the form of a shell, and further the terminal member 72 is disposed so as to be superposed on the dielectric 71. Thus, the retaining member 73A, the conductive member 74 and the elastic member 75, the dielectric 71, and the terminal member 72 are arranged in this order in the axial direction. Then, the pressure sensing parts 7A as a whole are sandwiched between the end surface of the cylindrical shape portion 73Ac of the retaining member 73A and an end surface of the terminal member 72, which end surface is on the opposite side from the dielectric 71. At this time, the pressure sensing parts 7A as a whole are sandwiched with the elastic member 75 biased so as to be compressed in the axial direction. A dedicated jig can be used for this sandwiching. Incidentally, the length in the axial direction of the pressure sensing parts 7A as a whole, when the pressure sensing parts 7A are thus sandwiched by the jig, is slightly shorter than the length d5 in the axial direction of the opening portion 35A of the cylindrical body 34A forming the holder portion 3Aa.

Then, the pressure sensing parts 7A as a whole that are being sandwiched by the jig are housed into the cylindrical body 34A in the direction orthogonal to the axial direction through the opening portion 35A of the cylindrical body 34A so as to fit the bulging portions 72Aa and 72Ab of the terminal member 72 into the slits 38Aa and 38Ab of the cylindrical body 34A and so as to fit the dielectric 71 into the recessed groove 39A. Only the jig is removed. Then, the elastic member 75 produces a bias by expanding in the axial direction. Because the dielectric 71 and the terminal member 72 are fitted so as not to move in the axial direction within the cylindrical body 34A, the bias in the axial direction by the elastic member 75 is applied to only the retaining member 73A, in which the conductive member 74 is press-fitted. As a result, the cylindrical shape portion 73Aa of the retaining member 73A is inserted and fitted into the ring-shaped locking portion 36A of the cylindrical body 34A, and the ring-shaped swelling portion 73Ai of the retaining member 73A is engaged with the stepped portion 34Ac of the cylindrical body 34A, thus preventing the retaining member 73A from moving toward the core body 4 in the axial direction within the cylindrical body 34A.

Then, because the cylindrical shape portion 73Aa of the retaining member 73A is fitted into the ring-shaped locking portion 36A of the cylindrical body 34A, the retaining member 73A is also prevented from moving in the direction orthogonal to the axial direction. Further, in this state, the elastic member 75 applies the biasing force in the axial direction to the plurality of parts as a whole forming the pressure sensing parts 7A. Therefore, the pressure sensing parts 7A as a whole are prevented from being displaced in the axial direction or falling out through the opening portion 35A. That is, a locking mechanism, which is configured to prevent the plurality of parts as a whole forming the pressure sensing parts 7A from being displaced in the direction orthogonal to the axial direction, is provided by the engagement between the ring-shaped locking portion 36A of the cylindrical body 34A and the cylindrical shape portion 73Aa of the retaining member 73A and the biasing force of the elastic member 75.

In a state in which all of the plurality of parts forming the pressure sensing parts 7A are housed and locked within the holder portion 3Aa formed by the cylindrical body 34A as described above, the lead portion 72d of the terminal member 72 is soldered to the land portion 8b of the printed board 8, and the terminal piece 75b of the elastic member 75 is soldered to the printed board 8.

Coupled with the locking mechanism, the soldering and fixing of the lead portion 72d of the terminal member 72 and the terminal piece 75b of the elastic member 75 to the printed board 8 can more surely prevent the pressure sensing parts 7A from falling out through the opening portion 35A.

In this case, the dielectric 71 and the terminal member 72 are housed in a state of being unable to move in the axial direction within the hollow portion of the cylindrical body 34A. On the other hand, the retaining member 73A fitted with the conductive member 74 is movable in the axial direction within the hollow portion of the cylindrical body 34A. When no pen pressure is applied, the biasing force of the elastic member 75 biases the retaining member 73A to the side of the ring-shaped locking portion 36A of the cylindrical body 34A, with an air space created between the conductive member 74 and the dielectric 71.

After the pressure sensing parts 7A are housed within the cylindrical body 34A forming the holder portion 3Aa as described above, an anti-falling member 9 is press-fitted into the ring-shaped locking portion 36A of the cylindrical body 34A, as shown in FIGS. 8A and 8B and FIG. 9B. The anti-falling member 9 is coupled to the holder portion 3Aa by press-fitting a cylindrical portion 9b of the anti-falling member 9 into the ring-shaped locking portion 36A of the cylindrical body 34A.

Then, the ferrite core 6 is coupled to the holder portion 3Aa of the board holder 3A via the anti-falling member 9. Next, the core body main body 42 of the core body 4 is inserted into a through hole 6a of the ferrite core 6, and an end portion of the core body main body 42 of the core body 4 is press-fitted into the recessed hole 73Ab of the cylindrical shape portion 73Aa of the retaining member 73A housed in the holder portion 3Aa. In this case, even in a state in which the core body 4 is press-fitted in the recessed hole 73Ab of the cylindrical shape portion 73Aa, the core body main body 42 of the core body 4 is also exposed from the ferrite core 6 to the side of the projecting member 41 of the core body 4, as shown in FIG. 8A and FIG. 9B. A pressure (pen pressure) applied to the projecting member 41 of the core body 4 can displace the core body 4 toward the side of a case cap 2b in the axial direction against the biasing force of the elastic member 75.

As described above, the printed board 8 is mounted on the printed board mounting base portion 3Ab of the board holder 3A coupled to the case cap 2b, the pressure sensing parts 7A are housed in the holder portion 3Aa, and the ferrite core 6 and the core body 4 are coupled to the holder portion 3Aa, whereby a module part as shown in FIG. 9B is formed.

Next, the module part is inserted into the hollow portion of the case main body 2a, so that the projecting member 41 of the core body 4 projects from a through hole 21 of the case main body 2a to the outside. Then, the case main body 2a and the case cap 2b are coupled to each other, whereby the position indicator 1A is completed.

Pen pressure detecting operation in the position indicator 1A is the same as that of the foregoing first embodiment, and therefore description thereof will be omitted here.

Effects of Second Embodiment

According to the second embodiment described above, the pen pressure detecting module can be created by housing all of the plurality of parts forming the pressure sensing parts 7A into the holder portion 3Aa in the direction orthogonal to the axial direction through the opening portion 35A having an opening in the direction orthogonal to the axial direction, the opening portion 35A being provided in the side circumferential surface of the cylindrical body 34A forming the holder portion 3Aa. In this case, as described above, all of the plurality of parts forming the pressure sensing parts 7A are arranged in the axial direction into a unit, and the unit of the parts can be housed into the holder portion 3Aa in the direction orthogonal to the axial direction through the opening portion 35A in a state of being sandwiched from both sides in the axial direction of the unit of the parts. The parts can be retained in a state in which the center line position of the case 2 and the center line position of the pressure sensing parts 7A coincide with each other, by housing the parts within the holder portion 3Aa such that the parts are merely arranged along the axial direction. Hence, work efficiency in the manufacturing of the position indicator is improved.

According to the second embodiment described above, the retaining member 73A among the pressure sensing parts 7A in the state of being housed in the hollow portion of the cylindrical body 34A is moved by the elastic member 75 to the side of the core body 4 in the axial direction, to be engaged with the ring-shaped locking portion 36A and locked so as not to move in the direction orthogonal to the axial direction. Therefore, when the pressure sensing parts 7A are housed within the holder portion 3Aa, the locking between the retaining member 73A and the ring-shaped locking portion 36A against the movement of the retaining member 73A in the direction orthogonal to the axial direction, coupled with the biasing force in the axial direction by the elastic member 75, which biasing force is applied to all of the pressure sensing parts 7A, prevents the pressure sensing parts 7A from falling out (springing out) via the opening portion 35A.

Hence, according to the second embodiment, a need to assemble the pen pressure detecting module by coupling each of the pressure sensing parts in the axial direction as in the prior art is eliminated. Thus, the pen pressure detecting module can be manufactured more easily, and work efficiency in the manufacturing of the position indicator is improved, so that the position indicator is suitable for mass production.

In addition, the second embodiment also provides similar effects to those of the foregoing first embodiment. In addition, the second embodiment in particular provides the following effects as compared with the case where the conventional variable capacitance capacitor described with reference to FIGS. 19A and 19B is used as pressure sensing parts.

In the conventional variable capacitance capacitor 100, the retaining member 105 is press-fitted into the hollow portion of the holder 102. At this time, portions of the engaging holes 102d and 102e of the holder 102, which engaging holes are brought into contact with the engaging projecting portions 105d and 105e provided to the retaining member 105, may be worn away or chipped, so that the position in the axial direction of the retaining member 105 with respect to the holder 102 after assembly may be varied. When such a variation occurs, a distance before contact between the conductive member 106 and the dielectric 103 may be varied, and thus the characteristics of the variable capacitance capacitor may be varied in each position indicator.

On the other hand, in the second embodiment, the retaining member 73A is engaged with the ring-shaped locking portion 36A by the biasing force of the elastic member 75 by merely inserting the retaining member 73A into the cylindrical body 34A forming the holder portion 3Aa in the direction orthogonal to the axial direction through the opening portion 35A. Therefore, unlike the position in the axial direction of the retaining member 105 that varies relative to the holder 102 in the prior art example of FIGS. 19A and 19B, the position of the retaining member 73A with respect to the holder portion 3Aa does not vary, and the characteristics of the variable capacitance capacitor are not varied in each position indicator.

In addition, in the conventional variable capacitance capacitor described with reference to FIGS. 19A and 19B, the terminal member 104 needs to elastically hold down the dielectric 103 and fix the dielectric 103 to the holder 102. The terminal member 104 thus needs to have a shape larger than the diameter of the dielectric 103. Therefore, the conventional variable capacitance capacitor has a large size, and is difficult to be made thinner.

On the other hand, in the variable capacitance capacitor formed by the pressure sensing parts 7A used in the position indicator 1A according to the second embodiment, the pressure sensing parts 7A are merely housed into the holder portion 3Aa in the direction orthogonal to the axial direction through the opening portion 35A and arranged in the axial direction, and the terminal member 72 can be of substantially the same shape as the dielectric 71. Therefore the position indicator can be thinned easily by miniaturizing each of the plurality of parts forming the pressure sensing parts 7A so as to correspond to the thinning of the position indicator.

Incidentally, also in the second embodiment described above, as in the first embodiment, the dielectric 71 can be more surely prevented from falling out through the opening portion 35A of the holder portion 3Aa by providing the terminal member 72 with an L-shaped projection for holding down an end portion of the dielectric 71 housed in the holder portion 3Aa, the end portion of the dielectric 71 being on the side of the opening portion 35A, in the direction orthogonal to the axial direction.

Third Embodiment

A third embodiment of the position indicator according to the present invention will next be described with reference to FIGS. 10 to 14. The position indicators 1 and 1A according to the first embodiment and the second embodiment use a variable capacitance capacitor for pen pressure detection. A position indicator 1B according to the third embodiment detects a change in inductance value of a coil forming a resonance circuit for pen pressure detection.

As in the first embodiment and the second embodiment, the position indicator 1B according to the third embodiment is used in conjunction with a position detecting device 202B included in the electronic device 200 shown in FIG. 2. However, in correspondence with the use of a change in inductance value of the coil of the resonance circuit for pen pressure detection by the position indicator 1B according to the third embodiment, the position detecting device 202B uses a pen pressure detecting method different from that of the position detecting device 202. A circuit of the position indicator 1B and a circuit configuration of the position detecting device 202B will be described later. Incidentally, in the description of the third embodiment, the same parts as in the first embodiment and the second embodiment are identified by the same reference numerals, and detailed description thereof will be omitted. In addition, in the third embodiment, parts corresponding to the respective parts in the first embodiment and the second embodiment are identified by the same reference numerals to which a suffix B is added.

Figure 10:
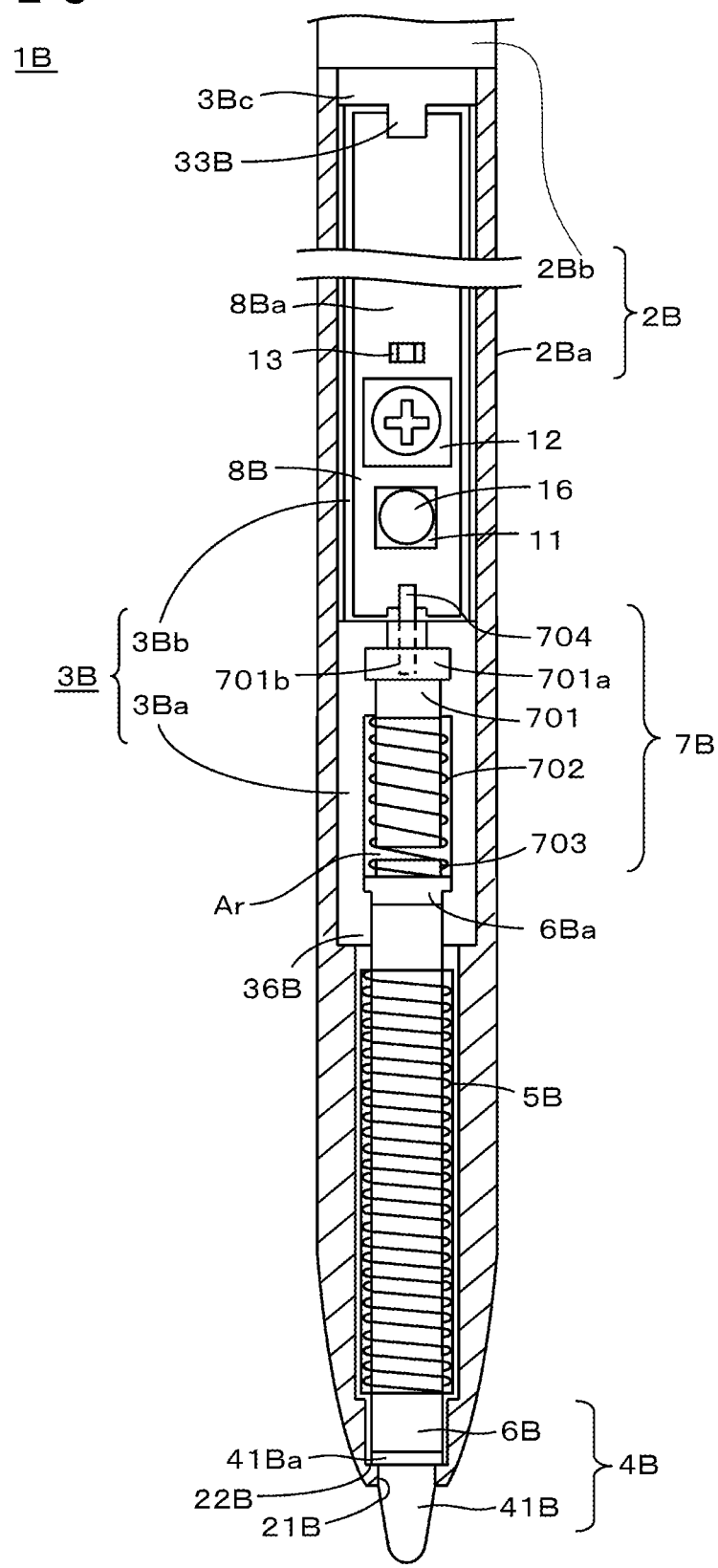
FIG. 10 is a diagram of assistance in explaining an example of construction of a third embodiment of the position indicator according to the present invention.

FIG. 10 schematically shows the position indicator 1B as a whole according to the third embodiment. As with FIG. 1A and FIG. 7A in the first embodiment and the second embodiment described above, FIG. 10 shows the inside of a case main body 2Ba of a case 2B of the position indicator 1B with only the case main body 2Ba cut away for purposes of illustration.

In the third embodiment, as in the first embodiment and the second embodiment, a board holder 3B formed of a resin, for example, which board holder retains a core body 4B, pressure sensing parts (pen pressure detecting parts) 7B, and a printed board 8B, is housed within the hollow portion of the case main body 2Ba. As in the board holders 3 and 3A according to the first embodiment and the second embodiment, an end portion in a longitudinal direction of the board holder 3B is coupled to a case cap 2Bb at a coupling portion 3Bc of the board holder 3B.

In the position indicator 1B according to the third embodiment, the core body 4B includes a projecting member (pen point member) 41B and a ferrite core 6B. The pressure sensing parts 7B include a ferrite chip 701, a coil spring 702, and an elastic body, or a silicon rubber 703 in the present example. Incidentally, the ferrite core 6B is an example of a first magnetic substance, and the ferrite chip 701 is an example of a second magnetic substance.

On a pen point side within the case main body 2Ba of the position indicator 1B, as shown in FIG. 10, the projecting member 41B of the core body 4B is housed with a portion of the projecting member 41B projected through a through hole 21B. The projecting member 41B has a flange portion 41Ba. The flange portion 41Ba is engaged with a stepped portion 22B formed in the portion of the through hole 21B of the case main body 2Ba, so that the projecting member 41B is prevented from falling out through the through hole 21B. Incidentally, the projecting member 41B is made of a synthetic resin such as a polyacetal resin (Duracon) or the like in consideration of resistance to friction when the projecting member 41B is used in a state of abutting against an operating surface.

The ferrite core 6B as an example of a magnetic material, which ferrite core is wound with a coil 5B as an example of an inductance element, is disposed on an opposite side from the projecting side of the projecting member 41B within the case main body 2Ba. The ferrite core 6B in the present example has a cylindrical shape without a through hole.

The ferrite core 6B forming a portion of the core body 4B has a flange portion 6Ba having a diameter larger than a winding portion of the coil 5B on an opposite side from the side of the projecting member 41B. The flange portion 6Ba is locked by a pressure sensing part holder portion 3Ba (which will be abbreviated to a holder portion 3Ba) to be described later of the board holder 3B. The ferrite core 6B is thereby locked to and retained by the board holder 3B.

As with the board holders 3 and 3A in the first embodiment and the second embodiment, the board holder 3B has the holder portion 3Ba on the side of the core body 4B and a printed board mounting base portion 3Bb formed so as to be continuous with the holder portion 3Ba on an opposite side from the side of the core body 4B.

In the holder portion 3Ba, the ferrite chip 701, the coil spring 702, and the silicon rubber 703 forming the pressure sensing parts 7B are arranged in order and retained in an axial direction along a direction of going from the side of the printed board mounting base portion 3Bb to the side of the core body 4B. Further, a printed board 8B is mounted on the printed board mounting base portion 3Bb of the board holder 3B.

In the position indicator 1B according to the third embodiment, a side switch 11, capacitors 12 and 13, and other parts and a conductive pattern are provided on a board surface 8Ba of the printed board 8B as in the first embodiment and the second embodiment. However, in the third embodiment, unlike the first embodiment and the second embodiment, an IC 14 and a peripheral circuit thereof are not provided on the printed board 8B. Incidentally, as shown in FIG. 10, also in the third embodiment, the printed board 8B in a state of being mounted and locked on the printed board mounting base portion 3Bb is separated from an inner wall of the case main body 2Ba without being in contact with the inner wall of the case main body 2Ba.

Construction of Board Holder 3B and Pressure Sensing Parts 7B

FIGS. 11A to 11C are diagrams of assistance in explaining the construction of portions housed within the case main body 2Ba of the position indicator 1B. Specifically, FIG. 11B is a perspective view of the board holder 3B. In addition, FIG. 11A is a diagram of the parts retained by the board holder 3B, the parts being shown arranged in the axial direction of the case main body 2Ba. Further, FIG. 11C is a diagram showing a state in which the ferrite core 6B and the pressure sensing parts 7B are housed and retained in the board holder 3B and the printed board 8B is disposed and locked on the board holder 3B.

As shown in FIG. 11A, the parts retained by the holder portion 3Ba of the board holder 3B are the flange portion 6Ba of the ferrite core 6B (wound with the coil 5B) of the core body 4B and all of the plurality of parts forming the pressure sensing parts 7B. The printed board 8B is mounted on the printed board mounting base portion 3Bb of the board holder 3B.

As the pressure sensing parts 7B, the silicon rubber 703, the coil spring 702, and the ferrite chip 701 are arranged in this order in the axial direction from the side of the projecting member 41B of the core body 4B. Incidentally, in FIG. 11A, as will be described later, a rod-shaped member 704 disposed next to the ferrite chip 701 in the axial direction is a locking member for locking the ferrite chip 701 of the pressure sensing parts 7B to the holder portion 3Ba in a state in which the center line position of the ferrite chip 701 and the center line position of the holder portion 3Ba coincide with each other.

As shown in FIG. 11B, as with the holder portion 3Aa in the second embodiment, the holder portion 3Ba has a shape provided with an opening portion 35B formed by cutting away, along the axial direction, an overall length of a side circumferential surface of a cylindrical body 34B in a cylindrical shape corresponding to the hollow portion of the case main body 2Ba. As in the second embodiment, the opening portion 35B has an opening in a direction orthogonal to the axial direction of the cylindrical body 34B and orthogonal to the mounting flat surface of the printed board mounting base portion 3Bb of the board holder 3B, on which mounting flat surface the printed board 8B is mounted.

A core body locking portion 36B is formed in an end portion of the cylindrical body 34B forming the holder portion 3Ba, which end portion is on the side of the core body 4B. In addition, a part arranging portion 320 for arranging the pressure sensing parts 7B is formed in the holder portion 3Ba so as to be continuous with the core body locking portion 36B.

As shown in FIG. 11B, in the third embodiment, the opening portion 35B is formed over the core body locking portion 36B and the part arranging portion 320. In addition, an opening 36Ba is made on the core body 4B side of the cylindrical body 34B forming the holder portion 3Ba, and a wall portion 37B that closes the hollow portion of the cylindrical body 34B is formed at an end portion of the cylindrical body 34B, which end portion is on the side of the printed board mounting base portion 3Bb.

As will be described later, the flange portion 6Ba of the ferrite core 6B as well as the silicon rubber 703, the coil spring 702, and the ferrite chip 701 forming the pressure sensing parts 7B are arranged in the axial direction, and housed in the core body locking portion 36B and the part arranging portion 320 of the holder portion 3Ba through the opening portion 35B.

The printed board mounting base portion 3Bb is formed between the coupling portion 3Bc of the board holder 3B, which coupling portion is an end portion of the board holder 3B on the side of the case cap 2Bb in the axial direction, and the wall portion 37B of the holder portion 3Ba. The printed board 8B that is long and thin with a width smaller than the inside diameter of the case main body 2Ba is mounted on the printed board mounting base portion 3Bb. As in the first embodiment, a locking portion 33B for locking the printed board 8B to the printed board mounting base portion 3Bb by sandwiching an end portion in a longitudinal direction of the printed board 8B in a direction of thickness thereof is formed on the case cap 2Bb side of the printed board mounting base portion 3Bb.

Incidentally, in the third embodiment, no locking portion is formed on the wall portion 37B of the cylindrical body 34B forming the holder portion 3Ba, which wall portion is on the side of the printed board mounting base portion 3Bb. Instead, a portion of the above-described rod-shaped member 704 is located on the side of the printed board mounting base portion 3Bb, and thereby serves also as a locking portion for sandwiching a thickness portion of an end portion of the printed board 8B between the locking portion and the mounting flat surface of the printed board mounting base portion 3Bb.

Figure 12A:
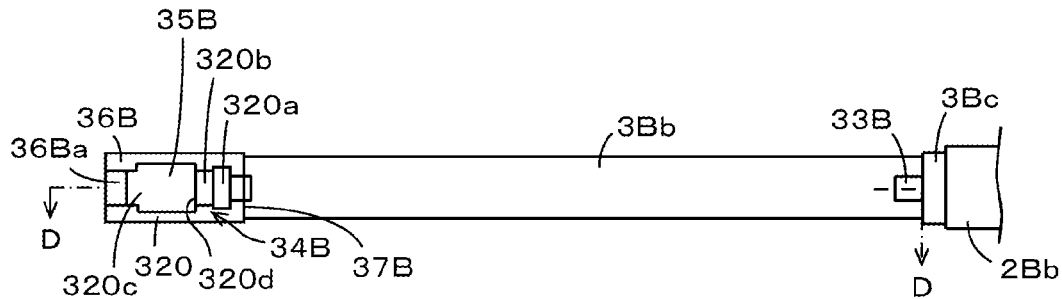
FIGS. 12A, 12B, 12C, and 12D are diagrams of assistance in explaining an example of construction of principal portions of the third embodiment of the position indicator according to the present invention.
Figure 12B:
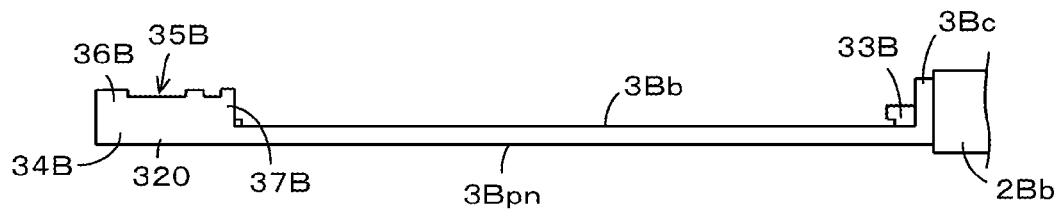
Figure 12C:
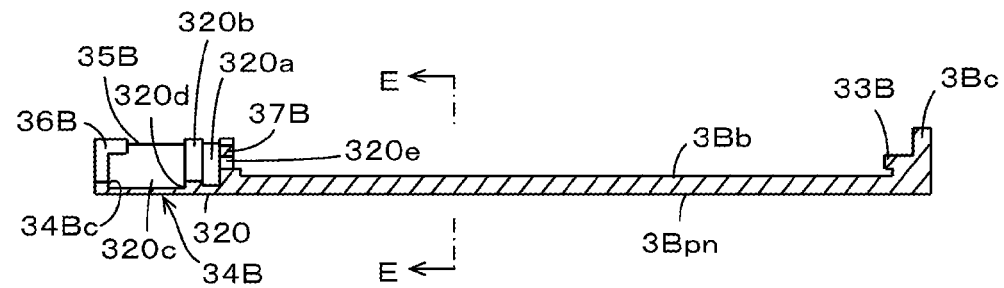
Figure 12D:

FIGS. 12A to 12D are diagrams showing an example of construction of the board holder 3B. FIG. 12A is a top view of the board holder 3B as viewed in a direction orthogonal to the mounting flat surface of the printed board mounting base portion 3Bb. FIG. 12B is a side view of the board holder 3B as viewed in a direction parallel to the mounting flat surface of the printed board mounting base portion 3Bb. FIG. 12C is a sectional view taken along line D-D of FIG. 12A. FIG. 12D is a sectional view taken along line E-E of FIG. 12C.

Figure 13:
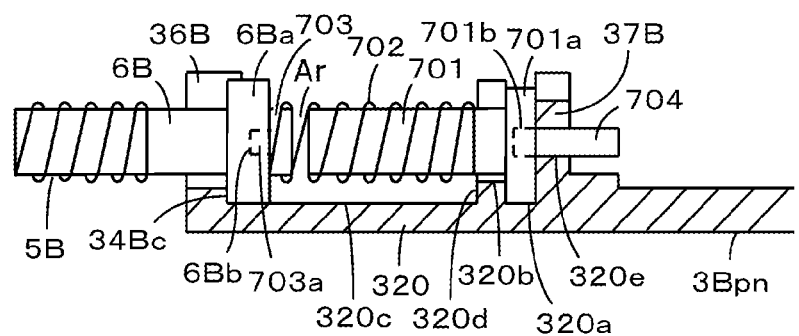
FIG. 13 is a diagram of assistance in explaining an example of construction of principal portions of the third embodiment of the position indicator according to the present invention.

FIG. 13 is a diagram of assistance in explaining a housed and retained state of the ferrite core 6B and the pressure sensing parts 7B in the core body locking portion 36B and the part arranging portion 320 of the holder portion 3Ba of the board holder 3B. FIG. 13 shows the holder portion 3Ba in a state of the sectional view of FIG. 12C for purposes of illustration.

Also in the board holder 3B in the third embodiment, a flat surface 3Bpn is formed along the axial direction on a side of a side circumferential surface of the cylindrical body 34B forming the holder portion 3Ba, which side is opposed to the opening portion 35B with the axial core interposed therebetween and is opposite from the printed board mounting flat surface of the printed board mounting base portion 3Bb. In this case, though not shown in detail, the flat surface 3Bpn is a flush flat surface along the axial direction on the holder portion 3Ba or from the holder portion 3Ba to the printed board mounting base portion 3Bb.

As shown in FIGS. 11A to 11C, FIGS. 12A to 12C, and FIG. 13, the inside diameter of the core body locking portion 36B is selected to be slightly larger than the diameter of the portion of the ferrite core 6B wound with the coil 5B. The part arranging portion 320 is formed continuously with the core body locking portion 36B. A coupling portion of the part arranging portion 320, which coupling portion is coupled to the core body locking portion 36B, is formed so as to have an inside diameter slightly larger than the outside diameter of the flange portion 6Ba of the ferrite core 6B. A stepped portion 34Bc is formed at the coupling portion of the part arranging portion 320, which coupling portion is coupled to the core body locking portion 36B.

As shown in FIG. 13, the flange portion 6Ba of the ferrite core 6B is disposed on the part arranging portion 320 side of the core body locking portion 36B. The stepped portion 34Bc thereby locks the ferrite core 6B so as to prevent the core body 4B from falling off the holder portion 3Ba in the axial direction. In addition, the part arranging portion 320 includes a notch for receiving the flange portion 6Ba of the ferrite core 6B. The ferrite core 6B is formed such that an angular-range of at least 180 degrees of the flange portion 6Ba of the ferrite core 6B is retained in the core body locking portion 36B. Therefore, the ferrite core 6B is retained so as not to be detached from the core body locking portion 36B and not to fall out in the direction orthogonal to the axial direction in a state in which the center line position of the ferrite core 6B coincides with the center line position of the cylindrical body 34B forming the holder portion 3Ba.

As shown in FIG. 11A, the silicon rubber 703 of the pressure sensing parts 7B has a projecting portion 703a. As shown in FIG. 13, an end surface of the flange portion 6Ba of the ferrite core 6B has a recessed hole 6Bb, into which to fit the projecting portion 703a of the silicon rubber 703. The silicon rubber 703 is mounted on the end surface of the flange portion 6Ba of the ferrite core 6B by press-fitting the projecting portion 703a of the silicon rubber 703 into the recessed hole 6Bb of the flange portion 6Ba of the ferrite core 6B. The outside diameter of the silicon rubber 703 is selected to be smaller than the diameter of the end surface of the flange portion 6Ba of the ferrite core 6B.

The pressure sensing parts 7B are retained in the part arranging portion 320 such that the coil spring 702 forms a predetermined air space Ar between an end surface of the ferrite chip 701 and the silicon rubber 703 mounted on the end surface of the flange portion 6Ba of the ferrite core 6B.

For this purpose, as shown in FIGS. 11B and 11C, FIGS. 12A to 12D, and FIG. 13, the part arranging portion 320 has the wall portion 37B that an end surface of a flange portion 701a of the ferrite chip 701 abuts against, thus preventing the ferrite chip 701 from moving to the side of the printed board mounting base portion 3Bb in the axial direction. A through hole 320e, into which to insert the rod-shaped member 704, is formed in a position of the wall portion 37B, which position corresponds to the center position of the cylindrical body 34B forming the holder portion 3Ba.

In addition, a fitting recessed portion 320a having an inside diameter equal to or slightly larger than the outside diameter of the flange portion 701a of the ferrite chip 701 is formed in the part arranging portion 320 by a distance corresponding to the thickness of the flange portion 701a in a direction of going from the wall portion 37B to the side of the core body locking portion 36B.

A step portion 320b having an inside diameter equal to or slightly larger than the outside diameter of a small-diameter portion of the ferrite chip 701 excluding the flange portion 701a is formed on the core body locking portion 36B side of the fitting recessed portion 320a. A portion located farther inside on the core body locking portion 36B side of the step portion 320b is a coil disposing portion 320c having an inside diameter equal to that of the portion whose inside diameter is made slightly larger than the flange portion 6Ba of the ferrite core 6B to form the stepped portion 34Bc.

The length in the axial direction of the coil disposing portion 320c is a length from the position of the stepped portion 34Bc formed with the core body locking portion 36B to the position of a stepped portion 320d formed between the coil disposing portion 320c and the step portion 320b. The length in the axial direction of the coil disposing portion 320c is such that the pressure sensing parts 7B can be retained in a state in which the predetermined air space Ar is formed between the end surface of the ferrite chip 701, which end surface is on the opposite side in the axial direction from the flange portion 701a, and the silicon rubber 703 mounted on the end surface of the flange portion 6Ba of the ferrite core 6B, as described above.

As shown in FIG. 13, the ferrite core 6B having the silicon rubber 703 mounted on the end surface of the flange portion 6Ba is disposed on the core body locking portion 36B side of the coil disposing portion 320c. In addition, the flange portion 701a of the ferrite chip 701 is fitted in the fitting recessed portion 320a of the part arranging portion 320 in a state of abutting against the wall portion 37B. The flange portion 701a is made unable to move in the axial direction by a stepped portion formed by the fitting recessed portion 320a and the step portion 320b.

The coil spring 702 has a larger winding diameter than the outside diameter of the silicon rubber 703. Therefore, as shown in FIG. 10 and FIG. 13, one end side of the coil spring 702 in an elastic biasing direction abuts against the end surface of the flange portion 6Ba of the ferrite core 6B in a state of housing the silicon rubber 703 within the winding diameter of the coil spring 702. Another end side of the coil spring 702 in the elastic biasing direction abuts against the stepped portion 320d formed between the step portion 320b and the coil disposing portion 320c. The coil spring 702 sets the ferrite core 6B in a state of being elastically biased to the pen point side at all times and locked and retained by the core body locking portion 36B.

Incidentally, in practice, the silicon rubber 703 is fitted and mounted on the ferrite core 6B, the coil spring 702 is then mounted on the small-diameter portion of the ferrite chip 701, and further the silicon rubber 703 is inserted into the winding diameter of the coil spring 702, so that a unit is formed in a state in which the silicon rubber 703 mounted on the ferrite core 6B and the end surface of the ferrite chip 701 are provisionally coupled to each other. The unit of the parts is sandwiched by a jig in the axial direction. In this case, the unit of the parts is sandwiched by the jig between a step portion between the flange portion 6Ba of the ferrite core 6B and the main body of the ferrite core 6B and a head portion of the flange portion 701a of the ferrite chip 701.

The jig in the state of thus sandwiching the plurality of parts is inserted into the part arranging portion 320 of the holder portion 3Ba in the direction orthogonal to the axial direction through the opening portion 35B. The jig is removed, so that the above-described unit of the parts is left in the part arranging portion 320. In this case, the flange portion 701a of the ferrite chip 701 is fitted into the fitting recessed portion 320a, and the coil spring 702 is inserted so as to abut against the end surface of the flange portion 6Ba of the ferrite core 6B and the stepped portion 320d formed between the step portion 320b and the coil disposing portion 320c.

Then, in the state in which the unit of the parts is inserted within the part arranging portion 320, the coil spring 702 sets the ferrite core 6B in a state of being elastically biased to the side of the core body locking portion 36B at all times and retained with the air space Ar created between the silicon rubber 703 and the end portion of the small-diameter portion of the ferrite chip 701, as shown in FIG. 10 and FIG. 13.

As shown in FIG. 10 and FIG. 13, a recessed hole 701b is formed in the center position of the end surface of the flange portion 701a of the ferrite chip 701. The rod-shaped member 704 is fitted into the recessed hole 701b through the through hole 320e of the wall portion 37B. The ferrite chip 701 is thereby retained such that the center line position of the ferrite chip 701 coincides with the center line position of the cylindrical body 34B forming the holder portion 3Ba.

The flange portion 6Ba of the ferrite core 6B is displaced to the side of the core body locking portion 36B by the biasing force of the coil spring 702, so that a portion of the flange portion 6Ba is engaged with the inner wall surface of the core body locking portion 36B. The ferrite core 6B is thereby locked so as not to move in the direction orthogonal to the axial direction. The ferrite chip 701 is also locked so as not to move in the axial direction by the elastic biasing force of the coil spring 702.

As described above, the ferrite core 6B is retained by the core body locking portion 36B such that the center line position of the ferrite core 6B coincides with the center line position of the cylindrical body 34B forming the holder portion 3Ba. Thus, the parts arranged in the part arranging portion 320 are retained such that the center line positions of the respective parts arranged in the part arranging portion 320 all coincide with the center line position of the cylindrical body 34B forming the holder portion 3Ba.

The printed board 8B is mounted on the mounting flat surface of the printed board mounting base portion 3Bb of the board holder 3B. At the same time, an end edge of the printed board 8B on the side of the case cap 2Bb in the longitudinal direction of the printed board 8B is locked in a state of being sandwiched between the locking portion 33B and the mounting flat surface of the printed board mounting base portion 3Bb, and an end edge of the printed board 8B on the side of the part arranging portion 320 in the longitudinal direction of the printed board 8B is locked in a state of being sandwiched between the rod-shaped member 704 and the mounting flat surface of the printed board mounting base portion 3Bb.

Further, the projecting member 41B is mounted on an end of the ferrite core 6B in a state in which the ferrite core 6B wound with the coil 5B and the pressure sensing parts 7B are retained by the holder portion 3Ba of the board holder 3B, and the printed board 8B is mounted and locked on the printed board mounting base portion 3Bb as described above.

Then, also in the third embodiment, an object formed by mounting and locking the printed board 8B on the printed board mounting base portion 3Bb of the board holder 3B, housing the pressure sensing parts 7B in the holder portion 3Ba and housing a portion of the ferrite core 6B wound with the coil 5B in the holder portion 3Ba, and coupling the projecting member 41B to the ferrite core 6B can be handled as one module part (unit).

The module part including the board holder 3B as a center is inserted into the hollow portion of the case main body 2Ba, and the case main body 2Ba and the case cap 2Bb are coupled to each other. As a result of the above, the position indicator 1B according to the third embodiment is completed.

When a user of the position indicator 1B applies a pressing force (pen pressure) to the projecting member 41B forming the pen point, the end surface of the flange portion 6Ba of the ferrite core 6B, to which the projecting member 41B is coupled, is displaced and brought closer toward the side of the ferrite chip 701 against the biasing force of the coil spring 702 according to the pressing force. Then, the inductance of the coil 5B changes accordingly, and the phase (resonance frequency) of a radio wave transmitted from the coil 5B of the resonance circuit changes accordingly.

Further, when the pressing force is increased, the end surface of the ferrite chip 701 abuts against the silicon rubber 703, and elastically displaces the silicon rubber 703. Thereby, the inductance of the coil 5B changes, and the phase (resonance frequency) of the radio wave transmitted from the coil 5B of the resonance circuit changes, with a changing characteristic corresponding to the elastic modulus of the silicon rubber 703.

Incidentally, in the third embodiment, the coil spring 702 has a smaller elastic modulus than the silicon rubber 703. Specifically, letting k1 be the elastic modulus of the coil spring 702, and letting k2 be the elastic modulus of the silicon rubber 703, a relation k1<k2 holds. Hence, the coil spring 702 is elastically deformed by a small pressing force, while the silicon rubber 703 is not elastically deformed unless a larger pressing force than the pressing force which is necessary to elastically deform the coil spring 702 is applied to the silicon rubber 703.

Figure 14:
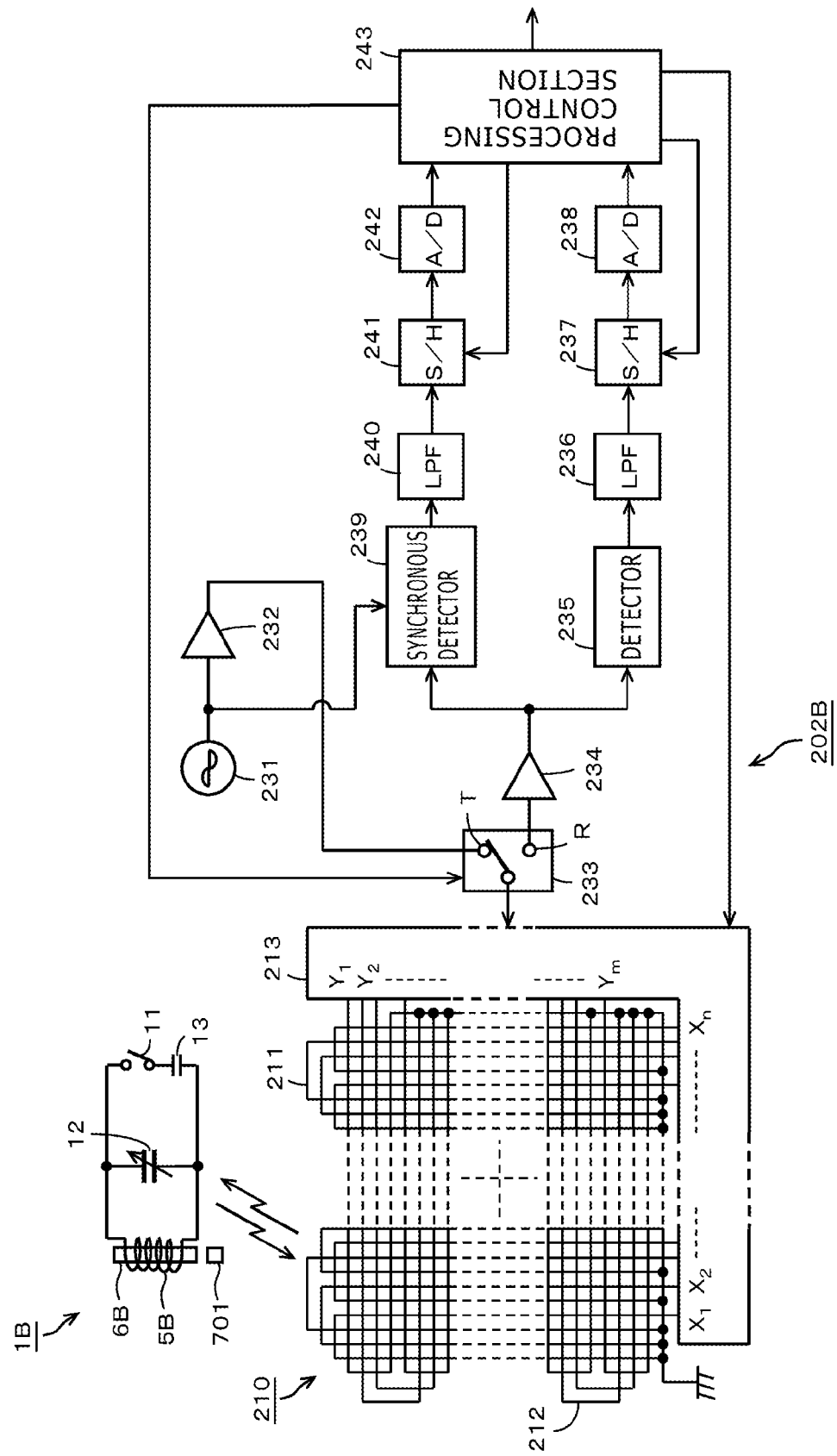
FIG. 14 is a circuit diagram of assistance in explaining the third embodiment of the position indicator according to the present invention and a position detecting device.

Circuit Configuration for Position Detection and Pen Pressure Detection by Position Detecting Device 202B in Third Embodiment Next, an example of a circuit configuration in the position detecting device 202B of the electronic device 200 that detects an indicated position and detects pen pressure using the position indicator 1B according to the third embodiment described above will be described with reference to FIG. 14. FIG. 14 is a block diagram showing an example of a circuit configuration of the position indicator 1B and the position detecting device 202B included in the electronic device 200.

The position indicator 1B includes a resonance circuit formed by the coil 5B and the capacitors 12 and 13. As shown in FIG. 14, the resonance circuit is formed by connecting the coil 5B as an inductance element and the trimmer capacitor 12 formed by a chip part in parallel with each other, and further connecting in parallel a series circuit of the side switch 11 and the capacitor 13 formed by a chip part.

In this case, according to the turning on and off of the side switch 11, the connection of the capacitor 13 to the parallel resonance circuit is controlled, and the resonance frequency changes. In addition, the inductance of the coil 5B changes according to a distance relation between the ferrite chip 701 and the ferrite core 6B, which distance relation corresponds to applied pen pressure. The resonance frequency thus changes according to the pen pressure. As will be described later, the position detecting device 202B detects frequency changes by detecting changes in phase of a signal from the position indicator 1B, and thus detects whether or not the side switch 11 is pressed and detects the pen pressure applied to the core body 4B of the position indicator 1B.

As with the position detecting device 202 in the first embodiment, the position detecting device 202B of the electronic device 200 has a position detecting coil 210 formed by stacking an X-axis direction loop coil group 211 and a Y-axis direction loop coil group 212.

In addition, the position detecting device 202B has a selecting circuit 213 connected with the X-axis direction loop coil group 211 and the Y-axis direction loop coil group 212. The selecting circuit 213 sequentially selects one loop coil of the two loop coil groups 211 and 212.

The position detecting device 202B further includes an oscillator 231, a current driver 232, a switching connecting circuit 233, a receiving amplifier 234, a detector 235, a low-pass filter 236, a sample and hold circuit 237, an ND converter circuit 238, a synchronous detector 239, a low-pass filter 240, a sample and hold circuit 241, an A/D converter circuit 242, and a processing control section 243. The processing control section 243 is formed by a microcomputer.

The oscillator 231 generates an alternating-current signal of a frequency f0. The oscillator 231 then supplies the generated alternating-current signal to the current driver 232 and the synchronous detector 239. The current driver 232 converts the alternating-current signal supplied from the oscillator 231 into a current, and sends out the current to the switching connecting circuit 233. The switching connecting circuit 233 selects a connection destination (a transmitting side terminal T or a receiving side terminal R) to which to connect the loop coil selected by the selecting circuit 213, under control of the processing control section 243. Of the connection destinations, the transmitting side terminal T is connected with the current driver 232, and the receiving side terminal R is connected with the receiving amplifier 234.

An induced voltage generated in the loop coil selected by the selecting circuit 213 is sent to the receiving amplifier 234 via the selecting circuit 213 and the switching connecting circuit 233. The receiving amplifier 234 amplifies the induced voltage supplied from the loop coil, and sends out the amplified induced voltage to the detector 235 and the synchronous detector 239.

The detector 235 detects the induced voltage generated in the loop coil, that is, a received signal, and sends out the received signal to the low-pass filter 236. The low-pass filter 236 has a cutoff frequency sufficiently lower than the above-mentioned frequency f0. The low-pass filter 236 converts the output signal of the detector 235 into a direct-current signal, and sends out the direct-current signal to the sample and hold circuit 237. The sample and hold circuit 237 holds a voltage value of the output signal of the low-pass filter 236 in predetermined timing, specifically predetermined timing during a receiving period, and sends out the voltage value to the ND (Analog to Digital) converter circuit 238. The ND converter circuit 238 converts the analog output of the sample and hold circuit 237 into a digital signal, and outputs the digital signal to the processing control section 243.

Meanwhile, the synchronous detector 239 performs synchronous detection of the output signal of the receiving amplifier 234 with the alternating-current signal from the oscillator 231, and sends out a signal having a level corresponding to a phase difference between the output signal of the receiving amplifier 234 and the alternating-current signal from the oscillator 231 to the low-pass filter 240. The low-pass filter 240 has a cutoff frequency sufficiently lower than the frequency f0. The low-pass filter 240 converts the output signal of the synchronous detector 239 into a direct-current signal, and sends out the direct-current signal to the sample and hold circuit 241. The sample and hold circuit 241 holds a voltage value of the output signal of the low-pass filter 240 in predetermined timing, and sends out the voltage value to the ND (Analog to Digital) converter circuit 242. The ND converter circuit 242 converts the analog output of the sample and hold circuit 241 into a digital signal, and outputs the digital signal to the processing control section 243.

The processing control section 243 controls various parts of the position detecting device 202B. Specifically, the processing control section 243 controls the selection of a loop coil in the selecting circuit 213, the switching of the switching connecting circuit 233, and the timing of the sample and hold circuits 237 and 241. The processing control section 243 controls a radio wave to be transmitted from the X-axis direction loop coil group 211 and the Y-axis direction loop coil group 212 for a certain transmission duration on the basis of the input signals from the ND converter circuits 238 and 242.

A radio wave transmitted from the position indicator 1B generates an induced voltage in each of loop coils of the X-axis direction loop coil group 211 and the Y-axis direction loop coil group 212. The processing control section 243 calculates the coordinate values of an indicated position in the X-axis direction and the Y-axis direction, which position is indicated by the position indicator 1B, on the basis of the level of the voltage value of the induced voltage generated in each of the loop coils. In addition, the processing control section 243 detects whether or not the side switch 11 is depressed and pen pressure on the basis of the level of a signal corresponding to a phase difference between the transmitted radio wave and the received radio wave.

Thus, in the position detecting device 202B, the processing control section 243 can detect the position of the position indicator 1B that has approached the position detecting device 202B. In addition, the processing control section 243 in the position detecting device 202B can detect whether or not a depression operating element 16 of the side switch 11 is depressed in the position indicator 1B, and detect the pen pressure applied to the core body 4B of the position indicator 1B, by detecting the phase (frequency shift) of the received signal.

Effects of Third Embodiment

The third embodiment also produces similar effects to those of the first embodiment and the second embodiment described above. The third embodiment further produces the following effects.

The position indicator 1B according to the third embodiment has the coil spring 702 and the silicon rubber 703 interposed between the ferrite core 6B and the ferrite chip 701. The ferrite core 6B is thereby separated from the ferrite chip 701 mainly by the action of the coil spring 702. Thus, even when the pen point side of the position indicator 1B is directed upward, the ferrite core 6B and the ferrite chip 701 do not come close to each other. Hence, even when the position indicator 1B is handled such that the projecting member 41B is directed upward, erroneous detection of pressing force does not occur.

In addition, a range of detection of the pressing force (pen pressure) applied to the core body including the projecting member 41B and the ferrite core 6B can be widened by the action of the coil spring 702 and the silicon rubber 703. Moreover, the radio wave properly changing in phase (frequency) according to the pressing force can be transmitted to the position detecting device 202B, and the pressing force (pen pressure) can be detected properly.

Incidentally, in the above-described example of the third embodiment, the projecting member 41B of the core body 4B has the flange portion 41Ba and is locked to the inside of the case main body 2Ba, and is thus configured to be non-replaceable. However, for example, the projecting member 41B can be configured to be replaceable by providing the end portion of the ferrite core 6B with a recessed portion or a projecting portion to be fitted to a projecting portion or a recessed portion provided to the projecting member 41B and fitting both portions to each other.

Fourth Embodiment

Principal portions of a fourth embodiment of the position indicator according to the present invention will next be described with reference to FIGS. 15A to 15C. The position indicator 1C according to the fourth embodiment is an example of a position indicator that detects pen pressure on the basis of a change in capacitance, as in the first embodiment and the second embodiment. However, in particular, in the fourth embodiment, a pressure sensing part is formed by a semiconductor device of a so-called MEMS (Micro Electro Mechanical System). In the fourth embodiment, a variable capacitance device for pressure sensing using a MEMS will be referred to as a capacitance system pressure sensing semiconductor device (hereinafter referred to as a pressure sensing device).

Also in the fourth embodiment, as in the first embodiment and the second embodiment, the position indicator 1C is constructed by housing a board holder 3C coupled to a case cap 2b within a case main body 2a.

Figure 15A:
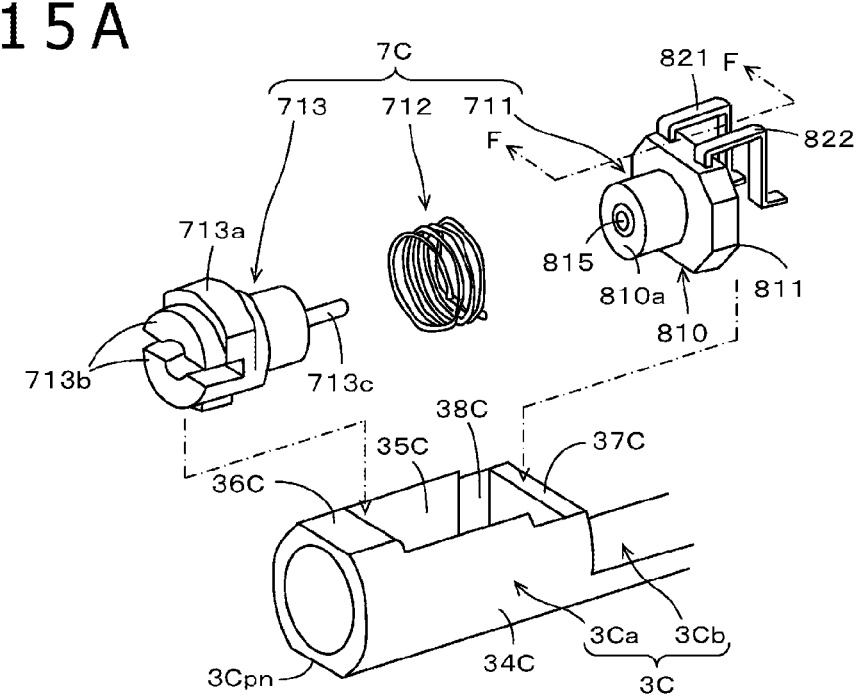
FIGS. 15A, 15B, and 15C are diagrams of assistance in explaining an example of construction of principal portions of a fourth embodiment of the position indicator according to the present invention.

FIG. 15A is a perspective view of portions of a pressure sensing part holder portion 3Ca (hereinafter abbreviated to a holder portion 3Ca), in particular, of the board holder 3C in the fourth embodiment and an exploded perspective view of pressure sensing parts 7C. FIG. 15B is a partial sectional view of the position indicator 1C according to the fourth embodiment, showing particularly the holder portion 3Ca and the vicinity thereof. FIG. 15C is a sectional view of assistance in explaining a construction of the pressure sensing device used in the fourth embodiment, and is a sectional view taken along line F-F of FIG. 15A.

As shown in FIG. 15A, the pressure sensing parts 7C in the fourth embodiment include the pressure sensing device 711, an elastic member 712 formed by a coil spring, and a retaining member 713.

Figure 15B:
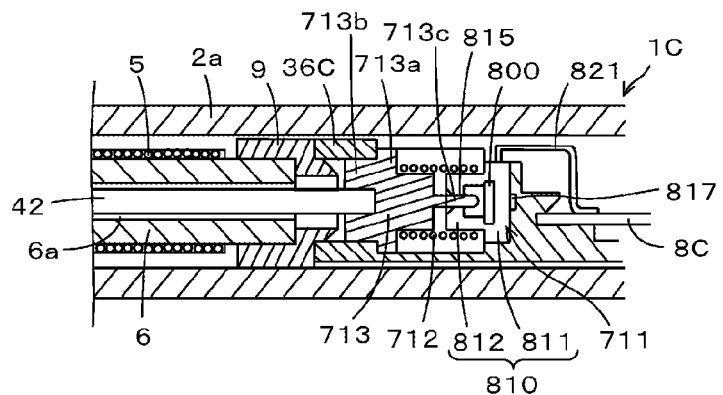
Figure 15C:
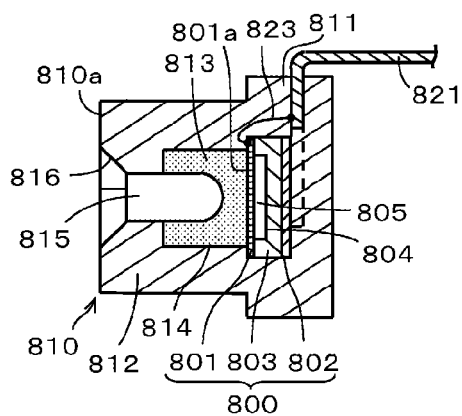

The pressure sensing device 711 in the present example is for example formed by sealing a pressure sensing chip 800 formed as a semiconductor device manufactured by MEMS technology within a package 810 in the form of a box as a cube or a rectangular parallelepiped, for example (see FIGS. 15A and 15C).

The pressure sensing chip 800 detects pressure applied thereto as a change in capacitance. The pressure sensing chip 800 in the present example has a construction as shown in FIG. 15C.

The pressure sensing chip 800 in the present example has the shape of a rectangular parallelepiped with a longitudinal length and a lateral length of 1.5 mm and a height of 0.5 mm, for example. The pressure sensing chip 800 in the present example includes a first electrode 801, a second electrode 802, and an insulating layer (dielectric layer) 803 between the first electrode 801 and the second electrode 802. The first electrode 801 and the second electrode 802 in the present example are formed by a conductor made of single crystal silicon (Si). The insulating layer 803 in the present example is formed by an oxide film ($SiO_2$). Incidentally, the insulating layer 803 does not need to be formed by an oxide film, but may be formed by another insulator.

On a surface side of the insulating layer 803, which surface side is opposed to the first electrode 801, a circular recessed portion 804 having a center position of the surface as a center is formed in the present example. The recessed portion 804 forms a space 805 between the insulating layer 803 and the first electrode 801. In the present example, the bottom surface of the recessed portion 804 is a flat surface, and has a radius of 1 mm, for example. The depth of the recessed portion 804 in the present example is about a few tens of microns to a few hundreds of microns.

The pressure sensing chip 800 in the present example is produced by a semiconductor process as follows. First, the insulating layer 803 made of an oxide film is formed on single crystal silicon forming the second electrode 802. Next, a circular mask having a radius R is provided on the insulating layer 803 of the oxide film, and etching is performed, whereby the recessed portion 804 is formed. Then, single crystal silicon forming the first electrode 801 is deposited on the insulating layer 803. The pressure sensing chip 800 having the space 805 under the first electrode 801 is thereby formed.

The presence of the space 805 allows the first electrode 801 to be displaced so as to be bent in the direction of the space 805 when pressed from the side of a surface 801a on an opposite side from a surface opposed to the second electrode 802. The thickness t of single crystal silicon as an example of the first electrode 801 is such that the first electrode 801 can be bent by a pressure applied to the first electrode 801, and the thickness t is smaller than that of the second electrode 802. The thickness t of the first electrode 801 is selected such that a bending displacement characteristic of the first electrode 801 in relation to the applied pressure is a desired characteristic.

In the pressure sensing chip 800 having the construction as described above, a capacitance Cd is formed between the first electrode 801 and the second electrode 802. When a pressure is applied to the first electrode 801 from the side of the upper surface 801a of the first electrode 801, which upper surface is on the opposite side from the surface opposed to the second electrode 802, the first electrode 801 is bent to the side of the space 805, and a distance between the first electrode 801 and the second electrode 802 is shortened, so that the value of the capacitance Cd is changed so as to increase. An amount of bending of the first electrode 801 changes according to the magnitude of the applied pressure. Hence, the capacitance Cd is a variable capacitance that varies according to the magnitude of the pressure applied to the pressure sensing chip 800.

Incidentally, it has been confirmed that single crystal silicon as an example of the first electrode 801 is bent by a few microns by a pressure, and that the capacitance of the capacitor Cd is changed by 0 to 10 pF (picofarads) according to the bending by the pressing force to this extent.

In the pressure sensing device 711 according to the present embodiment, the pressure sensing chip 800 having the construction as described above is housed within the package 810 in a state in which the surface 801a of the first electrode 801 subjected to pressure is parallel to an upper surface 810a of the package 810 and opposed to the upper surface 810a in FIGS. 15A and 15C.

The package 810 in the present example has a shape formed by coupling a thin-plate shape portion 811 and a cylindrical shape portion 812 to each other. The package 810 in the present example is formed of an electrically insulative material such as a ceramic material, a resin material, or the like. As shown in FIG. 15C, the pressure sensing chip 800 is housed within the thin-plate shape portion 811. Within the cylindrical shape portion 812, an elastic member 813 is provided on the side of the surface 801a of the pressure sensing chip 800, which surface is subjected to pressure. The elastic member 813 is an example of a pressure transmitting member.

In the present example, a recessed portion 814, which covers the area of the portion subjected to pressure in the pressure sensing chip 800, is provided on the side of the surface 801a of the first electrode 801 subjected to pressure in the pressure sensing chip 800 within the cylindrical shape portion 812 of the package 810. The elastic member 813 is filled into the recessed portion 814. The elastic member 813 is formed so as to be a structure integral with the package 810 within the recessed portion 814 within the cylindrical shape portion 812 of the package 810. The elastic member 813 in the present example is formed of a silicon resin, particularly a silicon rubber.

A communicating hole 815 communicating from the upper surface 810a to a portion of the elastic member 813 is formed in the cylindrical shape portion 812 of the package 810. Specifically, a recessed hole forming an end portion of the communicating hole 815 is provided in the elastic member 813 within the cylindrical shape portion 812. In addition, a tapered portion 816 is formed on an opening portion side (side of the upper surface 810a) of the communicating hole 815 in the cylindrical shape portion 812, so that the opening portion of the communicating hole 815 has the shape of a trumpet.

As shown in FIGS. 15A and 15C, a first lead terminal 821 connected to the first electrode 801 of the pressure sensing chip 800 is led out from the thin-plate shape portion 811 of the pressure sensing chip 800, and a second lead terminal 822 connected to the second electrode 802 of the pressure sensing chip 800 is led out from the thin-plate shape portion 811 of the pressure sensing chip 800. The first lead terminal 821 is electrically connected to the first electrode 801 by a gold wire 823, for example. The second lead terminal 822 is electrically connected to the second electrode 802 by being led out in a state of being in contact with the second electrode 802. However, the second lead terminal 822 and the second electrode 802 may of course be electrically connected to each other by a gold wire or the like.

In the present example, the first and second lead terminals 821 and 822 are formed of a conductor metal, and have a large width as shown in FIG. 15A. In the present example, the first and second lead terminals 821 and 822 are led out from the side surface of the thin-plate shape portion 811, and then bent so as to be soldered on the board surface of a printed board 8C mounted on a printed board mounting base portion 3Cb of the board holder 3C.

In addition, as shown in FIG. 15B, as will be described later, a projecting portion 817 for positioning the pressure sensing device 711 in a direction orthogonal to the axial direction of the pressure sensing device 711 when the pressure sensing device 711 is housed within the holder portion 3Ca is formed on the bottom surface of the thin-plate shape portion 811.

The elastic member 712 is formed by a coil spring whose inside diameter is larger than the diameter of the cylindrical shape portion 812 of the package 810 of the pressure sensing device 711, and whose length in an elastic biasing direction is larger than the length (height) in the axial direction of the cylindrical shape portion 812. As shown in the sectional view of FIG. 15B, the elastic member 712 is attached so as to include the cylindrical shape portion 812 within the winding portion of the coil spring.

The retaining member 713 has a shape approximate to that of the retaining member 73 in the second embodiment. The retaining member 713 has a cylindrical shape provided with a ring-shaped swelling portion 713a in a side circumferential surface. The retaining member 713 is provided with a ring-shaped projecting portion 713b, into which to press-fit a core body main body 42 of a core body 4 on the core body 4 side in the axial direction of the retaining member 713, and is provided with a rod-shaped projecting portion 713c to be inserted into the communicating hole 815 of the pressure sensing device 711 on an opposite side in the axial direction of the retaining member 713. The center line positions of the ring-shaped swelling portion 713a, the ring-shaped projecting portion 713b, and the rod-shaped projecting portion 713c are the same as the center line position of the retaining member 713 of a cylindrical shape. The rod-shaped projecting portion 713c is to transmit pen pressure applied to the core body 4 to the first electrode of the pressure sensing chip 800 via the elastic member 813 within the package 810 of the pressure sensing device 711.

The holder portion 3Ca of the board holder 3C has a shape approximate to that of the holder portion 3a with an only difference being that the holder portion 3Ca does not have the slits for housing the terminal member 72 in the holder portion 3a of the board holder 3 in the first embodiment. Specifically, the holder portion 3Ca has an opening portion 35C that is formed in a portion of the side circumferential surface of a cylindrical body 34C forming the holder portion 3Ca and which has an opening in the direction orthogonal to the axial direction. The cylindrical body 34C forming the holder portion 3Ca has the construction of a ring-shaped locking portion 36C on the core body 4 side in the axial direction of the cylindrical body 34C.

The inside diameter of the ring-shaped locking portion 36C is selected to be slightly larger than the outside diameter of the ring-shaped projecting portion 713b of the retaining member 713, and is selected to be smaller than the outside diameter of the ring-shaped swelling portion 713a of the retaining member 713. As in the first embodiment, the retaining member 713 is thereby regulated so as to be prevented from moving to the side of the core body 4 in the axial direction by the ring-shaped locking portion 36C when the retaining member 713 is housed within the holder portion 3Ca, but the retaining member 713 is movable to an opposite side from the side of the core body 4 in the axial direction.

The inside diameter of a portion where the opening portion 35C of the cylindrical body 34C forming the holder portion 3Ca is formed is selected to be slightly larger than the outside diameter of the ring-shaped swelling portion 713a of the retaining member 713. A wall portion 37C is formed in an end portion of the cylindrical body 34C forming the holder portion 3Ca, which end portion is on the side of the printed board mounting base portion 3Cb, and a recessed groove 38C for housing the pressure sensing device 711 is provided on the inside of the wall portion 37C. Further, though not shown, a positioning recessed portion to be engaged with the projecting portion 817 provided on the bottom surface of the thin-plate shape portion 811 of the package 810 of the pressure sensing device 711 is formed in a flat surface of the wall portion 37C, which flat surface is on the side of the recessed groove 38C.

Also in the board holder 3C according to the fourth embodiment, a flat surface 3Cpn is formed along the axial direction on the side of the side circumferential surface of the cylindrical body 34C forming the holder portion 3Ca, which side is opposed to the opening portion 35C with an axial position interposed therebetween and is opposite from the printed board mounting flat surface of the printed board mounting base portion 3Cb. In this case, though not shown in detail, the flat surface 3Cpn is a flush flat surface along the axial direction from the holder portion 3Ca to the printed board mounting base portion 3Cb.

Method of Housing Pressure Sensing Parts 7C in Holder Portion 3Ca

First, the board holder 3C is mounted on the flat surface of the workbench such that the flat surface 3Cpn faces the flat surface of the workbench. In this state, the board holder 3C is positioned such that the opening of the opening portion 35C faces in an upward direction orthogonal to the flat surface of the workbench and the printed board mounting flat surface of the printed board mounting base portion 3Cb is parallel to the flat surface of the workbench, and the board holder 3C is locked on the flat surface of the workbench.

Next, before the pressure sensing parts 7C are housed within the hollow portion of the cylindrical body 34C forming the holder portion 3Ca through the opening portion 35C, the elastic member 712 formed by the coil spring is mounted such that the cylindrical shape portion 812 of the package 810 of the pressure sensing device 711 is housed within the winding portion of the elastic member 712. Next, the rod-shaped projecting portion 713c of the retaining member 713 is inserted into the communicating hole 815 in the cylindrical shape portion 812 of the package 810 of the pressure sensing device 711. In this state, the elastic member 712 applies an elastic biasing force in such a manner as to attempt to separate the pressure sensing device 711 and the retaining member 713 from each other in the axial direction.

Next, the pressure sensing device 711, the elastic member 712, and the retaining member 713 are sandwiched in the axial direction by a jig between the bottom surface side of the thin-plate shape portion 811 of the pressure sensing device 711 and the ring-shaped projecting portion 713b of the retaining member 713 in such a manner as to resist the elastic biasing force of the elastic member 712, whereby the pressure sensing device 711, the elastic member 712, and the retaining member 713 can be handled as a unit of parts. In this state, the pressure sensing device 711, the elastic member 712, and the retaining member 713 that can be handled as the unit of the parts are housed into the cylindrical body 34C forming the holder portion 3Ca through the opening portion 35C. The jig is removed. At this time, the pressure sensing device 711 is inserted through the opening portion 35C so that the pressure sensing device 711 is housed within the recessed groove 38C, and the projecting portion 817 on the bottom surface of the thin-plate shape portion 811 is fitted into the recessed portion of the wall portion 37C.

When the pressure sensing parts 7C are housed within the holder portion 3Ca, the ring-shaped projecting portion 713b of the retaining member 713 is housed within the ring-shaped locking portion 36C of the holder portion 3Ca and the ring-shaped swelling portion 713a abuts against the ring-shaped locking portion 36C due to the elastic biasing force in the axial direction of the elastic member 712. The retaining member 713 is thus prevented from moving in the direction of the core body 4 in the axial direction.

In this state, the elastic member 712 applies the biasing force in the axial direction to the plurality of parts as a whole forming the pressure sensing parts 7C, and the ring-shaped locking portion 36C of the cylindrical body 34C prevents the ring-shaped projecting portion 713b of the retaining member 713 from being displaced in the direction orthogonal to the axial direction. Therefore, the pressure sensing parts 7C as a whole are prevented from being displaced in the axial direction or from falling out through the opening portion 35C. That is, a locking mechanism for preventing the plurality of parts as a whole forming the pressure sensing parts 7C from being displaced in the direction orthogonal to the axial direction is formed by the engagement between the ring-shaped locking portion 36C of the cylindrical body 34C and the ring-shaped projecting portion 713b of the retaining member 713.

In a state in which the plurality of parts as a whole forming the pressure sensing parts 7C are housed and locked within the holder portion 3Ca formed by the cylindrical body 34C as described above, the first lead terminal 821 and the second lead terminal 822 of the pressure sensing device 711 are soldered to the printed board 8C. Then, in this state, with the elastic member 712 applying the biasing force in the axial direction to the plurality of parts as a whole forming the pressure sensing parts 7C, one end side in the axial direction of the pressure sensing parts 7C as a whole is locked by the locking mechanism formed by the ring-shaped projecting portion 713b of the retaining member 713 and the ring-shaped locking portion 36C of the cylindrical body 34C, and the first lead terminal 821 and the second lead terminal 822 of the pressure sensing device 711 at another end in the axial direction of the pressure sensing parts 7C as a whole are fixed by the soldering to the printed board 8C. Hence, in this state, the pressure sensing parts 7C as a whole will not fall out through the opening portion 35C.

After the pressure sensing parts 7C are housed within the cylindrical body 34C forming the holder portion 3Ca as described above, an anti-falling member 9 is press-fitted into the ring-shaped locking portion 36C of the cylindrical body 34C, as in the first embodiment and the second embodiment. Then, an end portion of a ferrite core 6 is press-fitted into the anti-falling member 9.

Next, in the state in which the ferrite core 6 is coupled to the holder portion 3Ca of the board holder 3C as described above, the core body main body 42 of the core body 4 is inserted into a through hole 6a of the ferrite core 6. Then, an end portion of the core body main body 42 of the core body 4 is press-fitted into the ring-shaped projecting portion 713b of the retaining member 713 housed in the holder portion 3Ca.

As described above, also in the fourth embodiment, the printed board 8C is mounted on the printed board mounting base portion 3Cb of the board holder 3C coupled to the case cap 2b, the pressure sensing parts 7C are housed in the holder portion 3Ca, and the ferrite core 6 and the core body 4 are coupled to the holder portion 3Ca, whereby a module part as shown in FIGS. 4B and 9B is formed.

Next, this module part is inserted into the hollow portion of the case main body 2a, so that a projecting member 41 of the core body 4 projects from a through hole 21 of the case main body 2a to the outside. Then, the case main body 2a and the case cap 2b are coupled to each other, whereby the position indicator 1C is completed.

In the position indicator 1C, when pressure is applied to the projecting member 41 of the core body 4, the core body 4 is displaced in a direction of the inside of the case main body 2a in the axial direction according to the pressure. Then, the displacement of the core body 4 displaces the retaining member 713 within the holder portion 3Ca, which retaining member 713 is coupled with the core body main body 42, toward the side of the pressure sensing device 711 against the elastic biasing force of the elastic member 712. Then, the rod-shaped projecting portion 713c of the retaining member 713 depresses the first electrode 801 of the pressure sensing chip 800 within the pressure sensing device 711. As a result, the capacitance between the first electrode 801 and the second electrode 802 of the pressure sensing chip 800 changes according to the pressure applied to the core body 4.

In this case, the rod-shaped projecting portion 713c as a pressing member does not directly depress the surface side of the pressure sensing chip 800, which surface side is subjected to the pressure, but the elastic member 813 is interposed between the rod-shaped projecting portion 713c and the surface side of the pressure sensing chip 800, which surface side is subjected to the pressure. Thus, resistance to the pressure on the surface side of the pressure sensing chip 800, which surface side is subjected to the pressure, is improved, and the surface side can be prevented from being damaged by the pressure.

In addition, the rod-shaped projecting portion 713c is positioned by being inserted into the communicating hole 815 provided in the package 810 of the pressure sensing chip 800, and the pressure applied by the rod-shaped projecting portion 713c is surely applied to the pressure sensing chip 800 via the elastic member 813.

The pressure sensing chip 800 in the present example is very small as described above, and thus facilitates the thinning of the position indicator. The fourth embodiment has another advantage of a very simple construction.

In addition, the fourth embodiment provides similar effects to those of the foregoing embodiments.

Incidentally, the circuit configurations shown in FIG. 5 described in the first embodiment can be used as a circuit configuration of the position indicator 1C according to the fourth embodiment and a circuit configuration of the position detecting device used in conjunction with the position indicator 1C.

Other Embodiments

The foregoing first to fourth embodiments use the construction of a board holder combining a pressure sensing part holder portion and a printed board mounting base portion. However, a printed board may be coupled and combined with a pressure sensing part holder portion.

Figure 16:
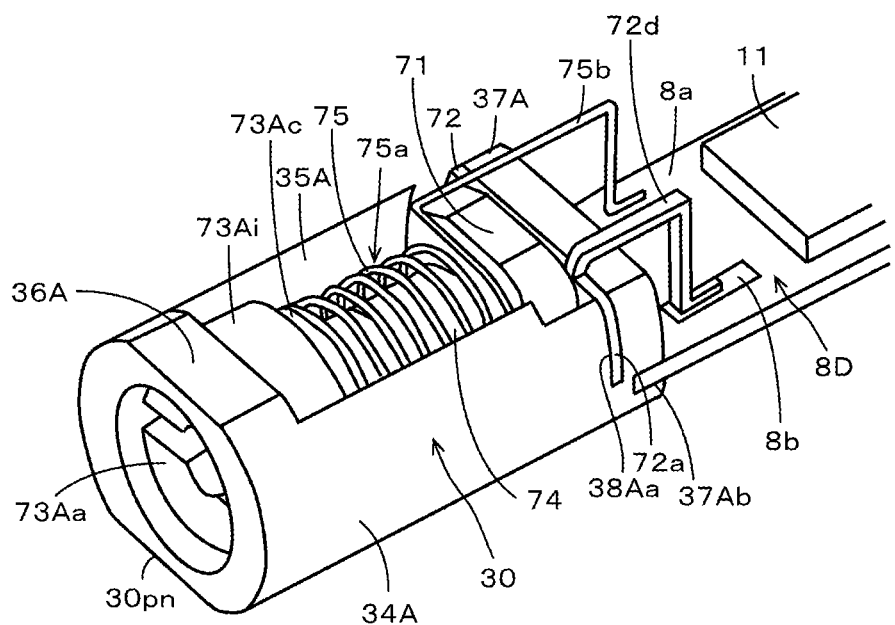
FIG. 16 is a diagram of assistance in explaining an example of construction of principal portions of another embodiment of the position indicator according to the present invention.

FIG. 16 is a diagram showing an example of such a construction formed in the second embodiment. Specifically, in the example of FIG. 16, only a pressure sensing part holder portion 30 of the board holder 3A described above is formed as an independent constituent part. In FIG. 16, for convenience, the same parts as in the holder portion 3Aa in the second embodiment are identified by the same reference numerals.

As shown in FIG. 16, the pressure sensing part holder portion 30 is formed in the same manner as the holder portion 3Aa described above. As described in the second embodiment, all of the pressure sensing parts 7A including the dielectric 71, the terminal member 72, the retaining member 73A, the conductive member 74, and the elastic member 75 are housed into the pressure sensing part holder portion 30 in the direction orthogonal to the axial direction through the opening portion 35A.

Also in the present example, a flat surface 30pn is formed along the axial direction in a portion of the side circumferential surface of the cylindrical body 34A forming the pressure sensing part holder portion 30, the portion of the side circumferential surface of the cylindrical body 34A being opposed to the opening portion 35A with the axial position interposed therebetween.

A fitting recessed groove 37Ab for fitting the printed board 8D is formed in the pressure sensing part holder portion 30. This fitting recessed groove 37Ab is formed in a direction along the board surface of the printed board 8D, with a width corresponding to the board thickness of the printed board 8D, so that one end portion in the longitudinal direction of the printed board 8D is fitted into the surface of the wall portion 37A, which surface is on an opposite side from the inner side of the cylindrical body 34A.

In the example of FIG. 16, the one end portion in the longitudinal direction of the printed board 8D is fitted into the fitting recessed groove 37Ab of the pressure sensing part holder portion 30, and coupled by bonding to the fitting recessed groove 37Ab as required. In the present example, the printed board mounting base portion in the foregoing examples is not used, and another end portion in the longitudinal direction of the printed board 8D is coupled and fixed to the case cap 2b, for example. Also in the present example, the width (length in a direction orthogonal to the longitudinal direction) of the printed board 8D is selected to be smaller than the inside diameter of the case main body 2a, so that the printed board 8D is not in contact with the inner wall surface of the case main body 2a.

In addition, in the foregoing first to fourth embodiments, as shown in FIG. 17A, the length dx in a direction orthogonal to the axial direction of the opening portions 35, 35A, 35B, and 35C of the pressure sensing part holder portions 3a, 3Aa, 3Ba, and 3Ca is such that the pressure sensing parts 7, 7A, 7B, and 7C can be housed, as they are, into the holder portions 3a, 3Aa, 3Ba, and 3Ca through the opening portions 35, 35A, 35B, and 35C. Therefore, in the foregoing first to fourth embodiments, a locking mechanism for preventing parts of the pressure sensing parts 7, 7A, 7B, and 7C from moving in a direction orthogonal to the axial direction is provided.

However, when a resin capable of elastic displacement is used as a member forming the holder portions 3a, 3Aa, 3Ba, and 3Ca, as shown in FIG. 17B, the length in the direction orthogonal to the axial direction of the opening portions 35, 35A, 35B, and 35C of the pressure sensing part holder portions 3a, 3Aa, 3Ba, and 3Ca may be dx', which is smaller than the length dx. Specifically, as shown in FIG. 17B, a distance between upper edge portions of a pair of wall portions 351 and 352 opposed to each other with the opening portions 35, 35A, 35B, and 35C interposed between the wall portions 351 and 352 in the direction orthogonal to the axial direction is set to be the length dx'.

In such a case, when the pressure sensing parts 7, 7A, 7B, and 7C are housed into the pressure sensing part holder portions 3a, 3Aa, 3Ba, and 3Ca through the opening portions 35, 35A, 35B, and 35C, at least a part of the pressure sensing parts 7, 7A, 7B, and 7C elastically displaces the upper edge portions of the wall portions 351 and 352, which upper edge portions are of the opening portions 35, 35A, 35B, and 35C, in the direction orthogonal to the axial direction, so that the length of the opening portions 35, 35A, 35B, and 35C in the direction orthogonal to the axial direction is increased. All of the pressure sensing parts 7, 7A, 7B, and 7C are thereby housed within the pressure sensing part holder portions 3a, 3Aa, 3Ba, and 3Ca.

After all of the pressure sensing parts 7, 7A, 7B, and 7C are housed within the pressure sensing part holder portions 3a, 3Aa, 3Ba, and 3Ca, the wall portions 351 and 352 are elastically restored, and the distance between the upper edge portions of the wall portions 351 and 352 of the opening portions 35, 35A, 35B, and 35C is restored to the original length dx'. The movement of at least a part of the pressure sensing parts 7, 7A, 7B, and 7C in the axial direction is thereby prevented. Thus, as in the foregoing embodiments, the pressure sensing parts 7, 7A, 7B, and 7C can be prevented from falling out through the opening portions 35, 35A, 35B, and 35C.

Modifications to Foregoing Embodiments

In the foregoing first to fourth embodiments, the pressure sensing parts in a state of being housed within the pressure sensing part holder portion are locked and prevented from falling out through the opening portion by the elastic biasing force in the axial direction of the elastic member forming a part of the pressure sensing parts and the locking portion of the holder portion (the ring-shaped locking portion or the core body locking portion). However, the locking mechanism for preventing the pressure sensing parts housed in the pressure sensing part holder portion from falling out through the opening portion is not only the combination of the elastic biasing force and the locking portion described above. The pressure sensing parts can also be locked within the pressure sensing part holder portion and prevented from falling out through the opening portion by covering the opening portion with a lid portion after the pressure sensing parts are housed in the pressure sensing part holder portion. Incidentally, it is needless to say that the lid portion alone may form the locking mechanism for preventing the pressure sensing parts from falling out through the opening portion.

Figure 18:
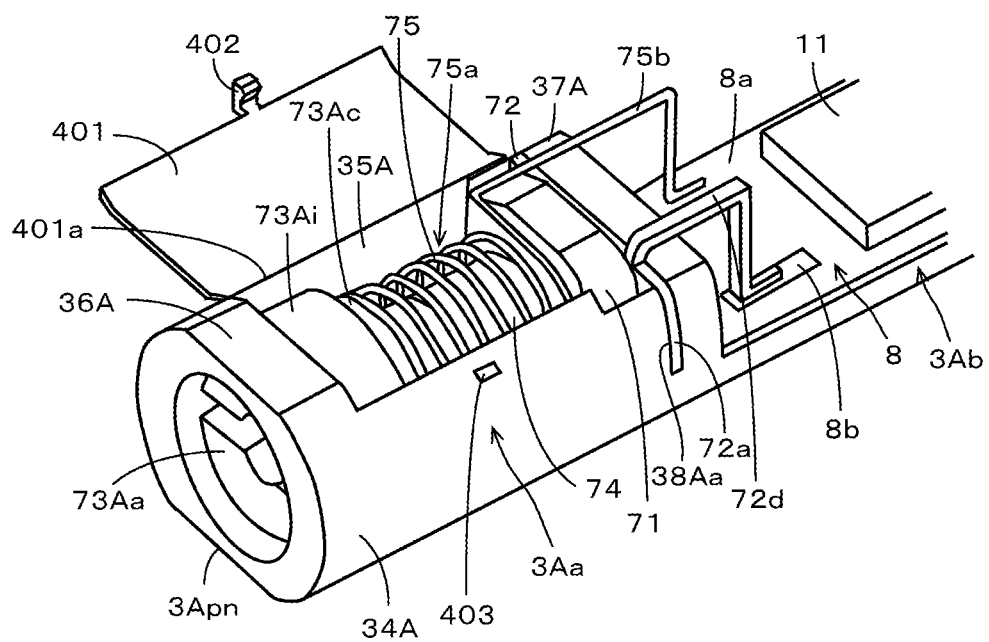
FIG. 18 is a diagram of assistance in explaining an example of construction of principal portions of another embodiment of the position indicator according to the present invention.

FIG. 18 is a diagram showing an example of a construction in a case where a lid portion 401 for the opening portion 35A is provided to the holder portion 3Aa in the second embodiment. In the present example, the lid portion 401 is formed on an upper edge side in a direction along the axial direction of the opening portion 35A so as to be rotatable on a hinge portion 401a with respect to the holder portion 3Aa with the hinge portion 401a at the position of an axis of rotation. The lid portion 401 has a locking projection 402 formed on a side opposed to the hinge portion 401a.

In the side circumferential surface of the cylindrical body 34A forming the holder portion 3Aa, a locking hole 403 is formed at a position to be engaged with the locking projection 402 of the lid portion 401 when the lid portion 401 is rotated with the hinge portion 401a at the position of the axis of rotation and the opening portion 35A is covered by the lid portion 401. The shape of the locking hole 403 corresponds to the shape of the locking projection 402. The lid portion 401 is locked to the holder portion 3Aa in a state of closing the opening portion 35A by fitting the locking projection 402 into the locking hole 403.

According to the present example, the pressure sensing parts 7A housed within the holder portion 3Aa are locked within the holder portion 3Aa by the lid portion 401 in addition to the elastic biasing force in the axial direction of the elastic member 75 forming a part of the pressure sensing parts and the ring-shaped locking portion 36A of the holder portion 3Aa. Thus, the pressure sensing parts 7A are more surely prevented from falling out through the opening portion 35A.

Incidentally, it is needless to say that also in the example of FIG. 16 and the example of FIGS. 17A and 17B, a lid portion for covering the opening portion of the pressure sensing part holder portion may be similarly provided. In addition, a lid portion may be provided as a locking mechanism for preventing the pressure sensing parts from falling out through the opening portion in place of the locking portions used in all of the foregoing embodiments.

Other Modifications

Incidentally, in the foregoing first embodiment and the foregoing second embodiment, the through hole is provided in the ferrite core, and the core body main body is inserted through the through hole and fitted into the retaining member of the pressure sensing parts. However, also in the first embodiment and the second embodiment, the projecting member of the core body may be coupled to one end portion of the ferrite core as in the third embodiment, and a pressing member to be fitted into the retaining member may be coupled to the other end portion of the ferrite core. In addition, the other end portion of the ferrite core may be shaped into the form of the pressing member. In that case, as in the third embodiment, the core body includes the projecting member, the ferrite core, and the pressing member.

In addition, the foregoing third embodiment has been described supposing that the silicon rubber 703 is provided to the end surface of the flange portion 6Ba of the ferrite core 6B, but is not limited to this. The silicon rubber 703 may be provided to the end surface of the ferrite chip 701, which end surface is opposed to the end surface of the ferrite core 6B.

In addition, the circuit of the position indicator and the circuit configuration of the position detecting device in the first embodiment are as shown in FIG. 5. However, the circuit configuration shown in FIG. 14 used in the third embodiment can be formed by connecting the capacitance of the variable capacitance capacitor in parallel with the coil 5 and using the capacitance of the variable capacitance capacitor as a part of the resonance circuit. The fourth embodiment may also similarly adopt the circuit configuration shown in FIG. 5 or the circuit configuration shown in FIG. 14.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A position indicator, comprising:
    a cylindrical casing;
    a core body disposed within the casing such that a tip of the core body projects from one opening end side of the casing;
    a printed board disposed within the casing, a circuit element for detecting pressing force applied to the tip of the core body being disposed on the printed board;
    a pen pressure detecting module formed by arranging a plurality of parts for detecting a displacement of the core body in an axial direction of the casing, the displacement corresponding to the pressing force applied to the tip in the axial direction of the casing, the plurality of parts being arranged within a hollow portion of a cylindrical holder portion housed within a hollow portion of the casing such that an axial direction of the cylindrical holder portion coincides with the axial direction of the casing,
    wherein the holder portion has an opening portion in a portion of an outermost side circumferential surface of the holder portion, the opening portion being opened in a direction perpendicular to the axial direction of the holder portion, and
    wherein at least one of the plurality of parts of the pen pressure detecting module is housed in the hollow portion of the cylindrical holder portion, a first dimension of the opening portion in the axial direction of the holder portion being larger than a first dimension of the at least one of the plurality of parts of the pen pressure detecting module in the axial direction of the holder portion, and a second dimension of the opening portion in a direction orthogonal to the axial direction of the holder portion being larger than a second dimension of the at least one of the plurality of parts of the pen pressure detecting module in the direction orthogonal to the axial direction of the holder portion, the at least one of the plurality of parts of the pen pressure detecting module being insertable from outside of the holder portion in the direction perpendicular to the axial direction of the holder portion through the opening portion into the hollow portion of the cylindrical holder portion; and
    a locking portion configured to prevent the at least one of the plurality of parts from falling out of the hollow portion of the cylindrical holder portion through the opening portion.

2. The position indicator according to claim 1, wherein the at least one of the plurality of the parts housed through the opening portion includes at least a part receiving the pressing force applied to the tip of the core body without being displaced by the pressing force when housed within the holder portion.

3. The position indicator according to claim 1, wherein at least one of the plurality of parts forming the pen pressure detecting module is inserted into the holder portion from a side of the core body in the axial direction of the holder portion.

4. The position indicator according to claim 1, wherein the plurality of parts forming the pen pressure detecting module include one or more first parts displaced in the axial direction of the casing according to the pressing force applied to the tip of the core body and a second part configured to always bias at least one of the first parts to a side of the tip of the core body by elastic biasing force.

5. The position indicator according to claim 4, wherein the locking portion of the holder portion includes a first locking portion configured to prevent a part disposed on a side of the core body among the plurality of parts, from being moved to the side of the core body in the axial direction of the holder portion by the biasing force of the second part.

6. The position indicator according to claim 5, wherein the part disposed on the side of the core body among the plurality of parts is inserted into the cylindrical holder portion from the side of the core body in the axial direction of the holder portion, and the first locking portion is formed in the side circumferential surface of the cylindrical holder portion to elastically engage with a corresponding engaging portion provided on said part disposed on the side of the core body.

7. The position indicator according to claim 5, wherein the locking portion of the holder portion includes, in addition to the first locking portion, a second locking portion engageable with at least one of the plurality of parts being moved to the side of the core body within the hollow portion of the holder portion by the biasing force of the second part, so as to prevent said at least one part from moving in the axial direction of the holder portion.

8. The position indicator according to claim 5, wherein the part engageable with the first locking portion of the holder portion has a first step portion in the axial direction of the holder portion, and the first locking portion of the holder portion has a second step portion in the axial direction of the holder portion, the second step portion being engageable with the first step portion.

9. The position indicator according to claim 4, wherein the second part is a spring member disposed such that a direction of elastic biasing of the spring member is the axial direction of the holder portion.

10. The position indicator according to claim 1, wherein the locking portion of the holder portion includes a pair of edge portions of the opening portion along the axial direction of the holder portion, which are opposed to each other, the pair of edge portions being elastically deformable such that at least one of the plurality of parts increases a distance between the pair of edge portions when the plurality of parts are housed into the cylindrical holder portion in the direction perpendicular to the axial direction of the holder portion through the opening portion, and the distance between the pair of edge portions is elastically restored to an original state when the plurality of parts are housed within the cylindrical holder portion, whereby the locking portion of the holder portion prevents the plurality of parts from falling out through the opening portion.

11. The position indicator according to claim 1, wherein the plurality of parts include:
a first conductor having elasticity, the first conductor being movably displaced in the axial direction of the casing within the hollow portion of the holder portion according to the displacement of the core body in the axial direction of the casing, the displacement corresponding to the pressing force applied to the tip;
a dielectric opposed to the first conductor on an opposite side from a side of the tip of the core body and not moving in the axial direction of the casing within the hollow portion of the holder portion;
a second conductor opposed to the first conductor with the dielectric interposed between the first conductor and the second conductor and not moving in the axial direction of the casing within the hollow portion of the holder portion; and
a spring member disposed between the dielectric and the first conductor so as to always bias the first conductor to the side of the tip of the core body;
wherein the circuit element disposed on the printed board detects the pressing force applied to the tip of the core body by detecting a capacitance between the first conductor and the second conductor, the capacitance changing when the first conductor is displaced in the axial direction of the casing to overcome the biasing force of the spring member according to the pressing force applied to the tip of the core body.

12. The position indicator according to claim 11, wherein the holder portion and the printed board are arranged in the axial direction of the casing within the hollow portion of the casing, and an opening direction of the opening portion of the holder portion and a direction perpendicular to a board surface of the printed board are the same, and a first electrode connected to the first conductor and a second electrode connected to the second conductor are led out from the holder portion to a side of the printed board, and the first electrode and the second electrode are soldered on the board surface of the printed board so as to be connected to the circuit element.

13. The position indicator according to claim 12, wherein the spring member has conductivity, and the spring member is electrically connected to the first conductor to also serve as the first electrode connected to the first conductor.

14. The position indicator according to claim 13, wherein an electrode is led out from the holder portion to a side of the printed board, and the electrode is soldered on the board surface of the printed board so as to be connected to the circuit element.

15. The position indicator according to claim 1, further comprising:
a coil wound around a first magnetic substance, wherein the plurality of parts of the pen pressure detecting module include a second magnetic substance disposed away from the first magnetic substance along a center line direction of the first magnetic substance;
a spring member for separating the second magnetic substance from the first magnetic substance by a determined distance along the center line direction of the first magnetic sub stance;
an elastic body disposed between the first magnetic substance and the second magnetic substance along the center line direction of the first magnetic substance; and
wherein the circuit element disposed on the printed board detects the pressing force applied to the tip of the core body by detecting an inductance that changes when the first magnetic substance or the second magnetic substance is displaced along the center line direction to overcome the biasing force of the spring member according to the pressing force applied to the core body.

16. The position indicator according to claim 1, wherein a mounting portion for mounting the printed board is formed integrally with the holder portion so as to extend in the axial direction of the holder portion, and the printed board is mounted on the mounting portion, such that a longitudinal direction of the printed board is the axial direction of the holder portion, and is housed within the hollow portion of the casing.

17. The position indicator according to claim 1, wherein an engaging portion for coupling the printed board such that a longitudinal direction of the printed board is the axial direction of the holder portion is formed in the holder portion, and the printed board is coupled at the engaging portion of the holder portion, such that the longitudinal direction of the printed board is the axial direction of the holder portion, and is housed within the hollow portion of the casing.

18. The position indicator according to claim 1, wherein the pen pressure detecting module includes, as one of the plurality of parts, a semiconductor pressure sensing device configured to change its capacitance when receiving the pressing force applied to the tip of the core body.

19. The position indicator according to claim 1, wherein a flat surface is formed along the axial direction of the holder portion in a portion of the side circumferential surface of the holder portion, the portion of the side circumferential surface of the holder portion being opposed to the opening portion with an axial position interposed between the portion of the side circumferential surface of the holder portion and the opening portion.

20. The position indicator according to claim 1, wherein the holder portion includes the locking portion.

* * * * *